US012692815B2

(12) United States Patent
Miller et al.

(10) Patent No.: US 12,692,815 B2
(45) Date of Patent: *Jul. 28, 2026

(54) GAS TURBINE ENGINE HAVING COOLING SYSTEMS

(71) Applicant: General Electric Company, Evendale, OH (US)

(72) Inventors: Brandon Wayne Miller, Middletown, OH (US); Jeffrey Douglas Rambo, Mason, OH (US); Efren Souza Chavez, Queretaro (MX)

(73) Assignee: General Electric Company, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/280,257

(22) Filed: Jul. 25, 2025

(65) Prior Publication Data

US 2025/0354518 A1      Nov. 20, 2025

Related U.S. Application Data

(63) Continuation of application No. 18/644,320, filed on Apr. 24, 2024, now Pat. No. 12,372,029.

(51) Int. Cl.
*F02C 7/18*          (2006.01)
*F02C 6/08*          (2006.01)
*F02C 9/18*          (2006.01)

(52) U.S. Cl.
CPC ................. *F02C 7/18* (2013.01); *F02C 6/08* (2013.01); *F02C 9/18* (2013.01); *F05D 2220/36* (2013.01); *F05D 2260/213* (2013.01)

(58) Field of Classification Search
CPC ...... F02C 7/18; F02C 9/52; F02C 9/18; F02C 6/08; B64D 13/06; F05D 2260/213
See application file for complete search history.

(56) References Cited

U.S. PATENT DOCUMENTS

| | | | |
|---|---|---|---|
| 5,137,230 A | 8/1992 | Coffinberry |
| 5,448,881 A | 9/1995 | Patterson et al. |
| 5,685,158 A | 11/1997 | Lenahan et al. |
| 6,561,760 B2 | 5/2003 | Wadia et al. |
| 8,307,662 B2 | 11/2012 | Turco |
| 9,109,514 B2 | 8/2015 | Cheong |
| 9,422,063 B2 | 8/2016 | Diaz |
| 9,764,846 B2 | 9/2017 | Bizzarro |

(Continued)

*Primary Examiner* — Rodolphe Andre Chabreyrie
(74) *Attorney, Agent, or Firm* — Dority & Manning, P.A.

(57)                ABSTRACT

A gas turbine engine is provided, having: a bifurcation; and a turbomachine further including a cooled cooling air (CCA) system, the CCA system having: a cold side bleed assembly defining an inlet positioned to be in fluid communication with an airflow over the bifurcation; a CCA heat exchanger in thermal communication with the cold side bleed assembly downstream of the inlet of the cold side bleed assembly; and a hot side bleed assembly defining an inlet in fluid communication with a working gas flowpath through a compressor section, at a compressor discharge cavity, or both, the hot side bleed assembly in thermal communication with the CCA heat exchanger to cool an airflow through the hot side bleed assembly, the hot side bleed assembly further in thermal communication with a hot component of the turbomachine to cool the hot component of the turbomachine.

19 Claims, 38 Drawing Sheets

(56) References Cited

U.S. PATENT DOCUMENTS

| | | | |
|---|---|---|---|
| 9,932,905 B2 | 4/2018 | Suciu et al. | |
| 10,208,668 B2 | 2/2019 | Clegg et al. | |
| 10,364,750 B2 | 7/2019 | Rambo | |
| 10,494,949 B2* | 12/2019 | Rambo | F01D 25/14 |
| 10,794,288 B2 | 10/2020 | Schwarz et al. | |
| 10,989,411 B2 | 4/2021 | Sampath et al. | |
| 11,073,090 B2 | 7/2021 | Nestico et al. | |
| 11,136,921 B2 | 10/2021 | Medda et al. | |
| 11,365,688 B2 | 6/2022 | Molesini et al. | |
| 11,466,624 B1 | 10/2022 | Piazza et al. | |
| 11,486,262 B2 | 11/2022 | Wickersham et al. | |
| 11,486,310 B2 | 11/2022 | Tomescu | |
| 11,512,651 B2 | 11/2022 | Merry et al. | |
| 11,655,767 B2 | 5/2023 | Hrubec et al. | |
| 11,788,470 B2 | 10/2023 | Rambo et al. | |
| 2006/0005546 A1 | 1/2006 | Orlando et al. | |
| 2011/0259546 A1 | 10/2011 | DeFrancesco et al. | |
| 2013/0236299 A1* | 9/2013 | Kington | B22F 10/28 |
| | | | 415/177 |
| 2015/0330236 A1 | 11/2015 | Beecroft et al. | |
| 2017/0114721 A1 | 4/2017 | Miller et al. | |
| 2018/0340468 A1 | 11/2018 | Takamura et al. | |
| 2019/0063324 A1* | 2/2019 | Gould | F02C 7/185 |
| 2019/0145316 A1 | 5/2019 | Schwarz et al. | |
| 2019/0383220 A1 | 12/2019 | Mackin | |
| 2020/0291854 A1 | 9/2020 | Medda et al. | |
| 2020/0300164 A1* | 9/2020 | Muldoon | F02C 7/185 |
| 2022/0145796 A1 | 5/2022 | Hallisey et al. | |
| 2022/0213802 A1 | 7/2022 | Johnson et al. | |
| 2022/0235706 A1 | 7/2022 | Millhaem et al. | |
| 2022/0252008 A1 | 8/2022 | Sibbach et al. | |
| 2023/0235700 A1 | 7/2023 | Smout et al. | |
| 2023/0250755 A1 | 8/2023 | Sibbach et al. | |
| 2023/0323819 A1 | 10/2023 | Piazza et al. | |
| 2024/0110510 A1 | 4/2024 | Minelli | |
| 2024/0191661 A1 | 6/2024 | Bemment | |

* cited by examiner

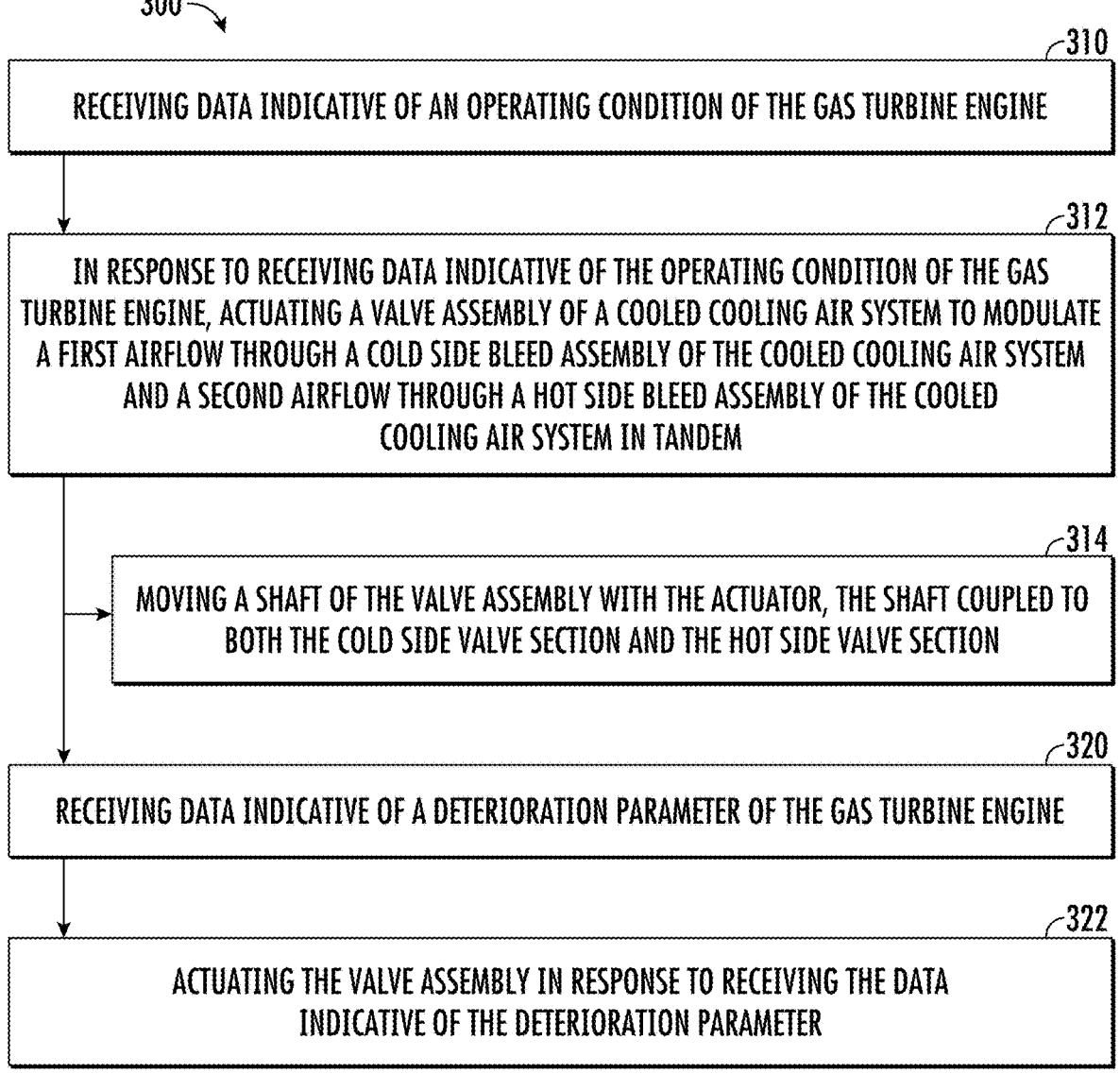

300

310

RECEIVING DATA INDICATIVE OF AN OPERATING CONDITION OF THE GAS TURBINE ENGINE

312

IN RESPONSE TO RECEIVING DATA INDICATIVE OF THE OPERATING CONDITION OF THE GAS TURBINE ENGINE, ACTUATING A VALVE ASSEMBLY OF A COOLED COOLING AIR SYSTEM TO MODULATE A FIRST AIRFLOW THROUGH A COLD SIDE BLEED ASSEMBLY OF THE COOLED COOLING AIR SYSTEM AND A SECOND AIRFLOW THROUGH A HOT SIDE BLEED ASSEMBLY OF THE COOLED COOLING AIR SYSTEM IN TANDEM

314

MOVING A SHAFT OF THE VALVE ASSEMBLY WITH THE ACTUATOR, THE SHAFT COUPLED TO BOTH THE COLD SIDE VALVE SECTION AND THE HOT SIDE VALVE SECTION

320

RECEIVING DATA INDICATIVE OF A DETERIORATION PARAMETER OF THE GAS TURBINE ENGINE

322

ACTUATING THE VALVE ASSEMBLY IN RESPONSE TO RECEIVING THE DATA INDICATIVE OF THE DETERIORATION PARAMETER

FIG. 25

GAS TURBINE ENGINE HAVING COOLING SYSTEMS

CROSS-REFERENCE TO RELATED APPLICATIONS

This application is a continuation of U.S. application Ser. No. 18/644,320, filed Apr. 24, 2024, which is hereby incorporated by reference in its entirety.

FIELD

The present disclosure relates to a gas turbine engine, and more particularly to a gas turbine engine having one or more cooling systems.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. As gas turbine engines are driven to higher efficiencies and performance metrics, certain temperatures in the gas turbine engines can be pushed higher and higher. The materials forming components exposed to these temperatures can be strained by these increases. Accordingly, cooling these components can become important for modern gas turbine engines.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 25 is a method of operating a valve assembly for a gas turbine engine in accordance with an exemplary aspect of the present disclosure.

DETAILED DESCRIPTION

Figure 1:
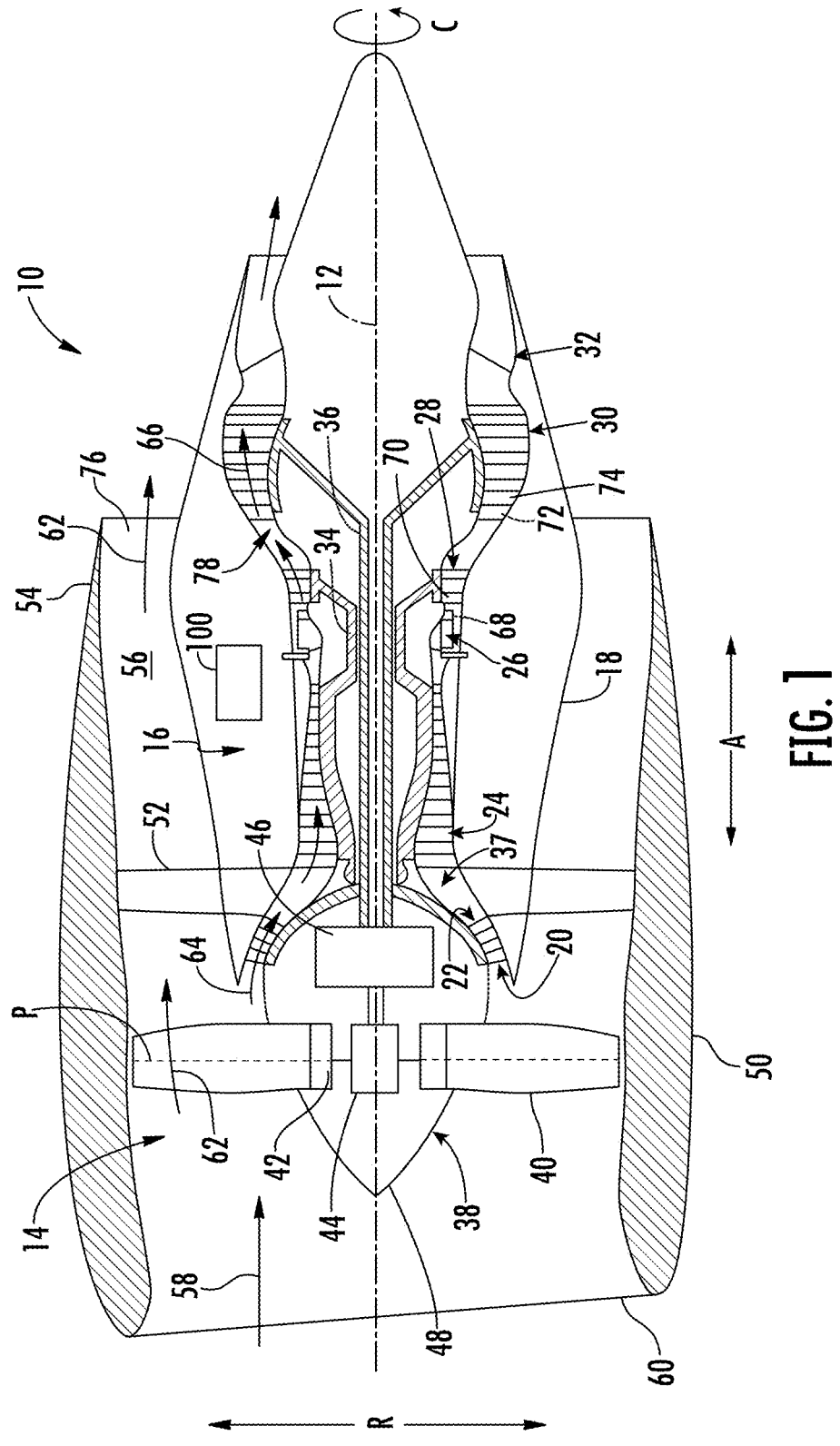
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The phrases "from X to Y" and "between X and Y" each refers to a range of values inclusive of the endpoints (e.g., refers to a range of values that includes both X and Y).

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "rated speed" with reference to a gas turbine engine refers to a maximum rotational speed that the gas turbine engine may achieve while operating properly. For example, the gas turbine engine may be operating at the rated speed during maximum load operations, such as during takeoff operations.

The term "standard day operating condition" refers to ambient conditions of sea level altitude, 59 degrees Fahrenheit, and 60 percent relative humidity.

As used herein, the term "fan pressure ratio" as it relates to a plurality of fan blades of a fan, refers to a ratio of an air pressure immediately downstream of the fan blades during operation of the fan to an air pressure immediately upstream of the fan blades of the fan during operation of the fan.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the term "cruising speed" refers to operation of a turbine engine utilized to power an aircraft that may operate at a cruising speed when the aircraft levels after climbing to a specified altitude. A turbine engine may operate at a cruising speed that is from 50% to 90% of a rated speed, such as from 70% to 80% of the rated speed. In some embodiments, a cruising speed may be achieved at about 80% of full throttle, such as from about 50% to about 90% of full throttle, such as from about 70% to about 80% full throttle.

As used herein, the term "cruise condition" refers to a phase of flight in which an aircraft levels in altitude after a climb phase and prior to descending to an approach phase. In various examples, cruise condition may take place at a cruise altitude up to about 65,000 feet (ft). In certain examples, cruise altitude is between about 28,000 ft. and about 45,000 ft. In yet other examples, cruise altitude is expressed in flight levels (FL) based on a standard air pressure at sea level, in which cruise condition is between FL280 and FL650. In another example, cruise condition is between FL280 and FL450. In still certain examples, cruise altitude is defined based at least on a barometric pressure, in which cruise altitude is between about 4.85 pounds per square inch absolute (psia) and about 0.82 psia based on a sea-level pressure of about 14.70 psia and sea-level temperature at about 59 degrees Fahrenheit. In another example, cruise altitude is between about 4.85 psia and about 2.14 psia. It should be appreciated that, in certain examples, the ranges of cruise altitude defined by pressure may be adjusted based on a different reference sea-level pressure and/or sea-level temperature.

The present disclosure is generally related to a gas turbine engine having a cooled cooling air system for cooling one or more hot components of the gas turbine engine. In particular, as gas turbine engines are driven to higher efficiencies and performance metrics, certain temperatures in the gas turbine engines can be pushed higher and higher. The materials forming components exposed to these temperatures can be strained by these increases. Accordingly, cooling these components can become important for modern gas turbine engines.

Certain attempts at cooling these components have used pressurized airflows from the compressor section and directed these pressurized airflows to the hot components. However, the inventors of the present disclosure have found that these pressurized airflows are either too hot to prove useful, or do not have sufficient pressure to allow the airflows to flow through, e.g., a stage 1 high pressure turbine rotor blade, and an environmental pressure is too high.

The present disclosure addresses these issues by utilizing a low pressure airflow from a cold location of the gas turbine engine to cool a high pressure airflow from, e.g., a compressor discharge cavity of the gas turbine engine through a cooled cooling air heat exchanger. The low pressure airflow, after having accepted hear from the high pressure airflow may be exhausted through a under-cowl area of the gas turbine engine in a way to avoid harming components of the turbomachine, avoid counteracting other systems of the turbomachine, etc.

In particular, the present disclosure provides a gas turbine engine having a turbomachine, the turbomachine including a compressor section having a low pressure compressor and a high pressure compressor, a combustion section defining a compressor discharge cavity, and a turbine section. The turbomachine defines a working gas flowpath and further includes a cooled cooling air (CCA) system, the CCA system includes: a cold side bleed assembly defining an inlet in fluid communication with a cold location of the gas turbine engine; a CCA heat exchanger in thermal communication with the cold side bleed assembly downstream of the inlet of the cold side bleed assembly; and a hot side bleed assembly defining an inlet in fluid communication with the working gas flowpath at the compressor discharge cavity. The hot side bleed assembly is in thermal communication with the CCA heat exchanger to cool an airflow through the hot side bleed assembly. The hot side bleed assembly is further in thermal communication with a hot component of the turbomachine to cool the hot component of the turbomachine.

Such a configuration may allow for the gas turbine engine to operate more efficiently and/or achieve improved performance metrics.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer cowl 18 that defines an annular inlet 20. The outer cowl 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Inclusion of the power gear box 46 may allow for the fan 38 to define a relatively low fan pressure ratio, e.g., when the engine is operated at a cruise condition. For example, the fan 38 may define a fan pressure ratio less than or equal to 1.6 when the gas turbine engine 10 is operated at a cruise condition.

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass passage 56 and a second portion of air 64 as indicated by the arrow is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66. Notably, for the embodiment depicted, the gas turbine engine 10 is configured to define a relatively high overall pressure ratio when operated at a rated speed during standard day operating conditions. In particular, the gas turbine engine 10 is configured to define an overall pressure ratio greater than or equal to 50:1, and less than or equal to 70:1 when operated at a rated speed during standard day operating conditions.

The combustion gases 66 are routed through the HP turbine 28 where a portion of thermal and/or kinetic energy from the combustion gases 66 is extracted via sequential stages of HP turbine stator vanes 68 that are coupled to the outer cowl 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer cowl 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Substantially simultaneously, the pressure of the first portion of air 62 is increased as the first portion of air 62 is routed through the bypass passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

For the exemplary embodiment depicted, the gas turbine engine further includes a cooled cooling air system to provide a cooling airflow that may accept heat from a hot airflow of the gas turbine engine subsequently provided to a hot component of the gas turbine engine. Various exemplary embodiments of the cooled cooling air system are described in more detail below.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (e.g., including the outer nacelle 50), in other embodiments, the gas turbine engine 10 may be an unducted gas turbine engine (such that the fan 38 is an unducted fan, and the outlet guide vanes 52 are cantilevered from the outer cowl 18). Additionally, or alternatively, although the gas turbine engine 10 depicted is configured as a geared gas turbine engine (e.g., including the power gear box 46) and a variable pitch gas turbine engine (e.g., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
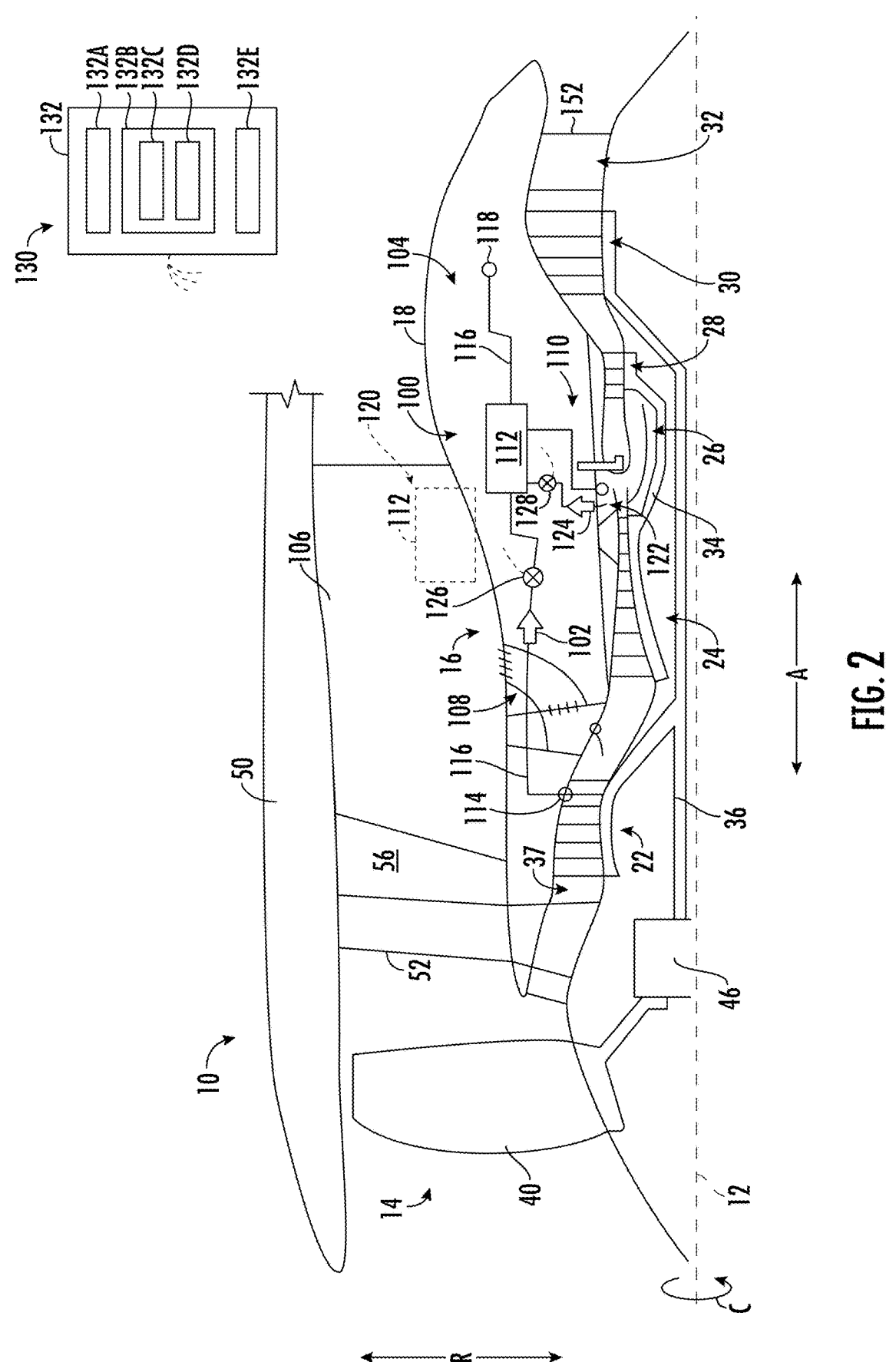
FIG. 2 is a more detailed cross-sectional view of the exemplary gas turbine engine of FIG. 1.

Referring now to FIG. 2, a close-up, schematic view of a gas turbine engine 10 in accordance with an exemplary embodiment of the present disclosure is provided. The exemplary gas turbine engine 10 of FIG. 2 may be configured in a similar manner as the exemplary gas turbine engine 10 described above with reference FIG. 1. Accordingly, the same or similar numbers may refer to the same or similar parts.

For example, the exemplary gas turbine engine 10 of FIG. 2 generally includes a fan section 14 and a turbomachine 16. The turbomachine 16 includes a compressor section having an LP compressor 22 and an HP compressor 24, a combustion section 26, and a turbine section having an HP turbine 28 and an LP turbine 30. The turbomachine 16, and more specifically, the compressor section, the combustion section 26, and the turbine section, at least in part define a working gas flowpath 37 therethrough. Further, the turbomachine 16 includes an outer casing, also referred to as an outer cowl 18, enclosing the compressor section, the combustion section 26, and the turbine section, and defining an under-cowl cavity 104 along a radial direction R between the working gas flowpath 37 and the outer cowl 18.

The exemplary gas turbine engine 10 of FIG. 2 further includes a bifurcation extending from the turbomachine 16. In particular, the bifurcation extends between the turbomachine 16 and an outer nacelle 50 of the gas turbine engine 10. In certain exemplary embodiments, such as the exemplary embodiment depicted, the bifurcation may more specifically be configured as an upper bifurcation 106 of the gas turbine engine 10.

It will be appreciated, that as used herein, the term "bifurcation" refers generally to an airfoil that extends from the turbomachine 16, through an airflow over the turbomachine 16. In certain exemplary embodiments, the bifurcation may be a structural pylon extending from the turbomachine 16. In certain embodiments, the bifurcation may be the upper bifurcation 106, as noted above, or alternatively may be a lower bifurcation.

Moreover, the exemplary gas turbine engine 10 of FIG. 2 further includes a CCA system 100. The CCA system 100 includes a cold side bleed assembly 108, a hot side bleed assembly 110, and a CCA heat exchanger 112.

The cold side bleed assembly 108 defines an inlet 114 in fluid communication with a cold location of the gas turbine engine 10 to receive a cooling airflow 102 from the cold location of the gas turbine engine 10. As used herein, the term "cold location" refers to any location where a fluid may be extracted at a temperature lower than the airflow through the hot side bleed assembly 110. In particular, for the embodiment shown, the cold location is a working gas flowpath 37 through the compressor section at a location through the LP compressor 22, between the LP compressor 22 and the HP compressor 24, or both. In such manner, the inlet 114 of the cold side bleed assembly 108 is in fluid communication with the working gas flowpath 37 at such a location.

More specifically, for the embodiment depicted, the inlet 114 of the cold side bleed assembly 108 is in direct fluid communication with the working gas flowpath 37, and more specifically, still, is in direct fluid communication with the working gas flowpath 37 through the LP compressor 22, at a location downstream of an inlet to the LP compressor 22 and upstream of an outlet of the LP compressor 22. Briefly, as used herein, the term "direct fluid communication" refers to receiving an airflow directly, except for any intervening accessory systems that directly support such fluid communication (as compared to the embodiment of FIG. 6, discussed below).

Inclusion of the inlet 114 of the cold side bleed assembly 108 at such a location may allow for the cold side bleed assembly 108 to receive relatively cool airflow with a sufficient pressure to drive the airflow through the cold side bleed assembly 108, allowing for a relatively high pressure drop within the CCA heat exchanger 112 to effectuate efficient heat transfer.

As will be discussed in more detail below, the cold side bleed assembly 108 generally includes one or more ducts 116 to provide the cooling airflow 102 from the inlet 114, to the CCA heat exchanger 112, and from the CCA heat exchanger 112. The duct(s) 116 may be standalone ducts (e.g., pipes, conduits, or the like), may be flow passages defined with structure of the turbomachine 16, or a combination thereof.

Briefly, the cold side bleed assembly 108 further defines an outlet 118 at a location downstream of the CCA heat exchanger 112. In such a manner, it will be appreciated that the CCA heat exchanger 112 is in thermal communication with the cold side bleed assembly 108 downstream of the inlet 114 of the cold side bleed assembly 108 and upstream of the outlet 118 of the cold side bleed assembly 108.

Referring still to the embodiment of FIG. 2, the CCA heat exchanger 112 is located in the under-cowl cavity 104 of the turbomachine 16. In such a manner, an amount of ductwork and piping required for the cold side bleed assembly 108 (e.g., the duct(s) 116) and the hot side bleed assembly 110 may be relatively small.

Notably, however, in other exemplary embodiments, the CCA heat exchanger 112 may alternatively be positioned at other suitable locations. For example, the upper bifurcation 106 may define a bifurcation cavity 120. In certain exemplary embodiments, the CCA heat exchanger 112 may be located in the bifurcation cavity 120, or in both of the bifurcation cavity 120 and the under-cowl cavity 104 (as is depicted in phantom in FIG. 2).

The hot side bleed assembly 110 similarly defines an inlet 122 (see FIG. 3) in fluid communication with the working gas flowpath 37 to receive an airflow from the working gas flowpath 37. The hot side bleed assembly 110 is further in thermal communication with the CCA heat exchanger 112. The CCA heat exchanger 112 is configured to cool the airflow through the hot side bleed assembly 110, transferring heat from the airflow to the cooling airflow 102. In such a manner, the airflow through the hot side bleed assembly 110 may be referred to herein as a cooled airflow 124.

The hot side bleed assembly 110 is further in thermal communication with a hot component of the turbomachine 16 to cool the hot component of the turbomachine 16 (e.g., configured to provide cooled airflow 124 onto, into, or otherwise to a location in thermal communication with the hot component). The flow of cooled airflow 124 to the hot component will be described in more detail below with reference to FIG. 3.

Referring still to FIG. 2, the CCA system 100 further includes a first flow control valve 126 in operable communication with the cold side bleed assembly 108, and a second flow control valve 128 in operable communication with the hot side bleed assembly 110. The first flow control valve 126 and the second flow control valve 128 may each modulate an amount of airflow through the respective system. In particular, the first flow control valve 126 may modulate an amount of cooling airflow 102 through the cold side bleed assembly 108, and the second flow control valve 128 may modulate an amount of cooling airflow 102 through the hot side bleed assembly 110 in the embodiment of FIG. 2, the first flow control valve 126 is located upstream of the CCA heat exchanger 112 and the second flow control valve 128 is similarly located upstream of the CCA heat exchanger 112.

Notably, for the embodiment depicted, the gas turbine engine 10 further includes a controller 130. The controller 130 is in operable communication with the first flow control valve 126 and the second flow control valve 128 to, e.g., control operation of the first flow control valve 126 and the second flow control valve 128 in response to, e.g., data received indicative of an operating condition of the gas turbine engine 10.

In such a manner, the controller 130 may modulate the amount of cooling airflow 102 through the cold side bleed assembly 108 and the amount of cooled airflow 124 through the hot side bleed assembly 110 between 0% and 100% of their respective maximum airflows, or to one or more intermediate flow levels. Notably, in certain exemplary embodiments, the CCA system 100 may be configured to receive an amount of cooling airflow 102 greater than or equal to 0.3% and less than or equal to 13.5% of a core mass flow of an air entering the compressor section (referred to as W25) during an operating condition of the gas turbine engine 10.

As noted, the exemplary controller 130 depicted in FIG. 2 is configured to receive the data sensed from the one or more sensors and, e.g., may make control decisions for the CCA system 100 based on the received data.

In one or more exemplary embodiments, the controller 130 depicted in FIG. 2 may be a stand-alone controller 130 for the CCA system 100, or alternatively, may be integrated into one or more of a controller for the gas turbine engine 10 with which the CCA system 100 is integrated, a controller for an aircraft including the gas turbine engine 10 with which the CCA system 100 is integrated, etc.

Referring particularly to the operation of the controller 130, in at least certain embodiments, the controller 130 can include one or more computing device(s) 132. The computing device(s) 132 can include one or more processor(s) 132A and one or more memory device(s) 132B. The one or more processor(s) 132A can include any suitable processing device, such as a microprocessor, microcontroller, integrated circuit, logic device, and/or other suitable processing device. The one or more memory device(s) 132B can include one or more computer-readable media, including, but not limited to, non-transitory computer-readable media, RAM, ROM, hard drives, flash drives, and/or other memory devices.

The one or more memory device(s) 132B can store information accessible by the one or more processor(s) 132A, including computer-readable instructions 132C that can be executed by the one or more processor(s) 132A. The instructions 132C can be any set of instructions that when executed by the one or more processor(s) 132A, cause the one or more processor(s) 132A to perform operations. In some embodiments, the instructions 132C can be executed by the one or more processor(s) 132A to cause the one or more processor(s) 132A to perform operations, such as any of the operations and functions for which the controller 130 and/or the computing device(s) 132 are configured, the operations for operating a CCA system 100 (e.g., method 300, 600), as described herein, and/or any other operations or functions of the one or more computing device(s) 132. The instructions 132C can be software written in any suitable programming language or can be implemented in hardware. Additionally, and/or alternatively, the instructions 132C can be executed in logically and/or virtually separate threads on the one or more processor(s) 132A. The one or more memory device(s) 132B can further store data 132D that can be accessed by the one or more processor(s) 132A.

For example, the data 132D can include data indicative of engine/aircraft operating conditions, and/or any other data and/or information described herein.

The computing device(s) 132 can also include a network interface 132E used to communicate, for example, with the other components of the CCA system 100 (e.g., valves 126, 128), the gas turbine engine incorporating the CCA system 100, the aircraft incorporating the gas turbine engine, etc. For example, in the embodiment depicted, as noted above, the gas turbine engine and/or CCA system 100 includes one or more sensors for sensing data indicative of one or more parameters of the gas turbine engine, the CCA system 100, or both. The controller 130 the CCA system 100 is operably coupled to the one or more sensors through, e.g., the network interface, such that the controller 130 may receive data indicative of various operating parameters sensed by the one or more sensors during operation. Further, for the embodiment shown the controller 130 is operably coupled to, e.g., the first flow control valve 126 and the second flow control valve 128. In such a manner, the controller 130 may be configured to modulate the amount of cooling airflow 102 through the cold side bleed assembly 108 and the amount of cooled airflow 124 through the hot side bleed assembly 110 in response to, e.g., the data sensed by the one or more sensors.

The network interface 132E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 3:
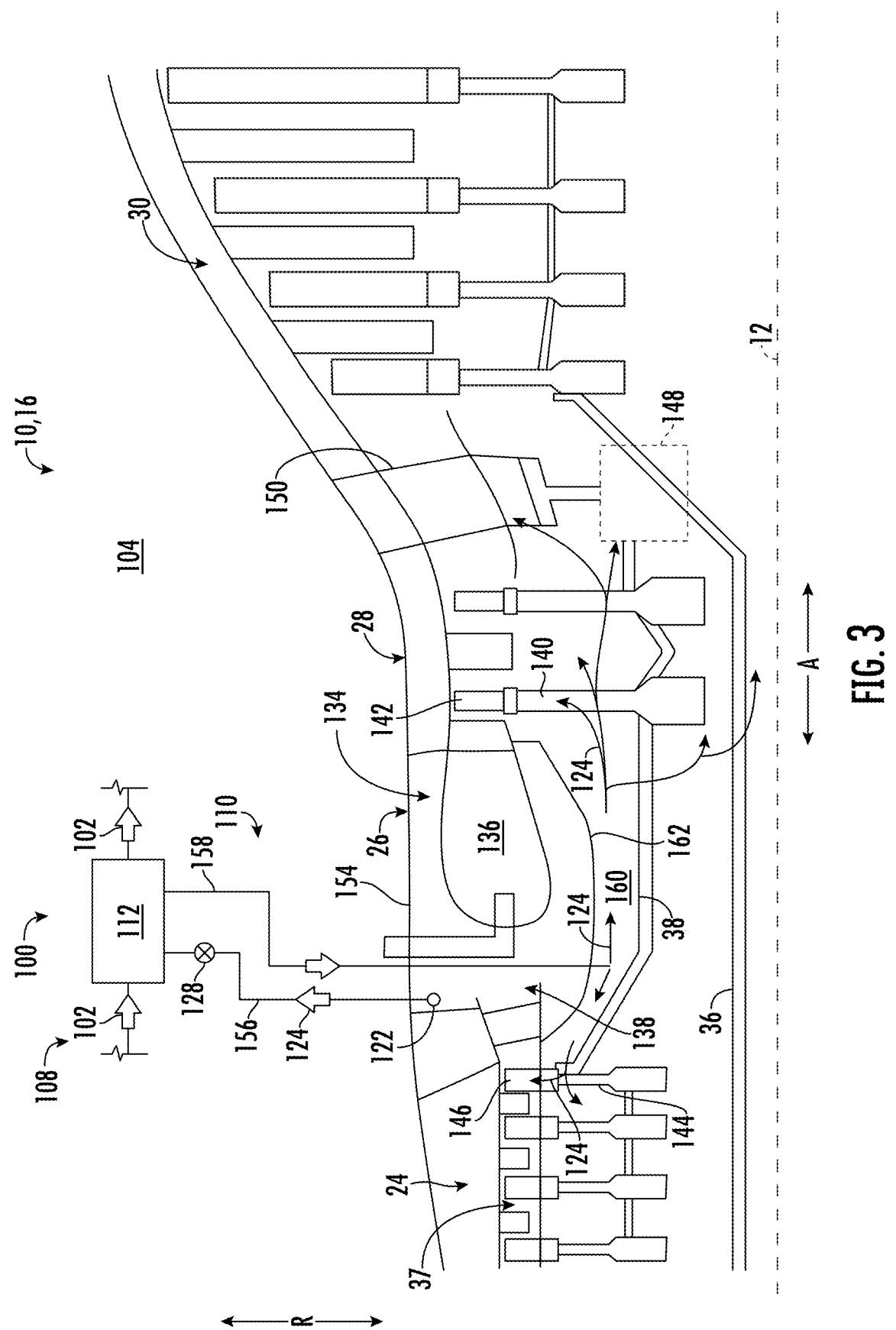
FIG. 3 is a more detailed cross-sectional view of the exemplary gas turbine engine of FIG. 2.

Referring now to FIG. 3, a close-up, schematic view of the gas turbine engine 10 of FIG. 2 is provided. As noted above, the inlet 122 of the hot side bleed assembly 110 is in fluid communication with the working gas flowpath 37 of the turbomachine 16. More specifically, the combustion section 26 includes a combustor 134 defining a combustion chamber 136 and further defines a compressor discharge cavity 138 downstream of the compressor section (e.g., downstream of the HP compressor 24) and upstream of the combustion chamber 136. The inlet 122 of the hot side bleed assembly 110 is in fluid communication with the compressor discharge cavity 138 to receive the cooled airflow 124 from the compressor discharge cavity 138. In such a manner, the hot side bleed assembly 110 may receive relatively high pressure airflow, allowing the high pressure airflow to be provided to a variety of hot components of the turbomachine 16.

It will be appreciated, however, that in other exemplary embodiments, the inlet 122 may additionally or alternatively be in fluid communication with the working gas flowpath 37 through the compressor section, such as through the HP compressor 24. For example, in other exemplary embodiments, the inlet 122 may additionally or alternatively be in fluid communication with the working gas flowpath 37 through a downstream half of the HP compressor 24 (see, e.g., the inlet 242 of the transient bleed assembly 238 discussed below with reference to FIG. 14; compressor bleed plenum 506 discussed below with reference to FIG. 31).

In at least certain exemplary embodiments, the hot component can be a rotor bore of a turbine of the turbine section (such as an HP turbine rotor bore 140 of the HP turbine 28), an airfoil of the turbine (such as an HP turbine rotor blade 142 of the HP turbine 28), an HP compressor rotor bore 144 of the HP compressor 24, an HP compressor rotor blade 146 of the HP compressor 24, a sump 148 within the turbine section (depicted in phantom), an engine frame (e.g., a turbine mid-frame 150 as shown in FIG. 3, a turbine rear frame 152 (see FIG. 2)), or a combination thereof.

For example, in the embodiment depicted, the hot component can be the HP turbine 28, such as the HP turbine rotor bore 140, the HP turbine rotor blade 142, or both. Although not depicted, in certain exemplary embodiments, the cooled airflow 124 may flow through one or more passages in the HP turbine rotor bore 140 to the HP turbine rotor blades 142, where the cooled airflow 124 flows through the HP turbine rotor blades 142 and exits the HP turbine rotor blades 142 as a film cooling fluid.

Additionally, or alternatively, in the embodiment depicted, the hot component can be an aft stage (such as an last or second to last stage) of the HP compressor 24 (e.g., one or more of the HP compressor rotor blades 146, as is shown, HP compressor stator vanes, HP compressor inter-stage seals, etc.).

Briefly, it will be appreciated that the combustion section 26 further includes a combustor casing 154. The hot side bleed assembly 110 includes a receiving portion 156 and a delivery portion 158. The receiving portion 156 extends from the inlet 122 to the CCA heat exchanger 112 and the delivery portion 158 extends from the CCA heat exchanger 112 towards the hot component. The inlet 122 of the hot side bleed assembly 110 is located at (e.g., defined in) or inward of the combustor casing 154. The delivery portion 158 of the hot side bleed assembly 110 extends through the combustor casing 154 and through the compressor discharge cavity 138. The delivery portion 158 may define an outlet for providing the cooled airflow 124 to a duct or other airflow delivery path inward of the compressor discharge cavity 138. For example, in the embodiment shown an inner duct 160 is defined between the HP shaft 34 and an inner combustor casing 162 of the combustion section 26. The delivery portion 158 may define an outlet opening into the inner duct 160.

Such a configuration may allow for the delivery of the cooling airflow 102 at a desired temperature.

Figure 4:
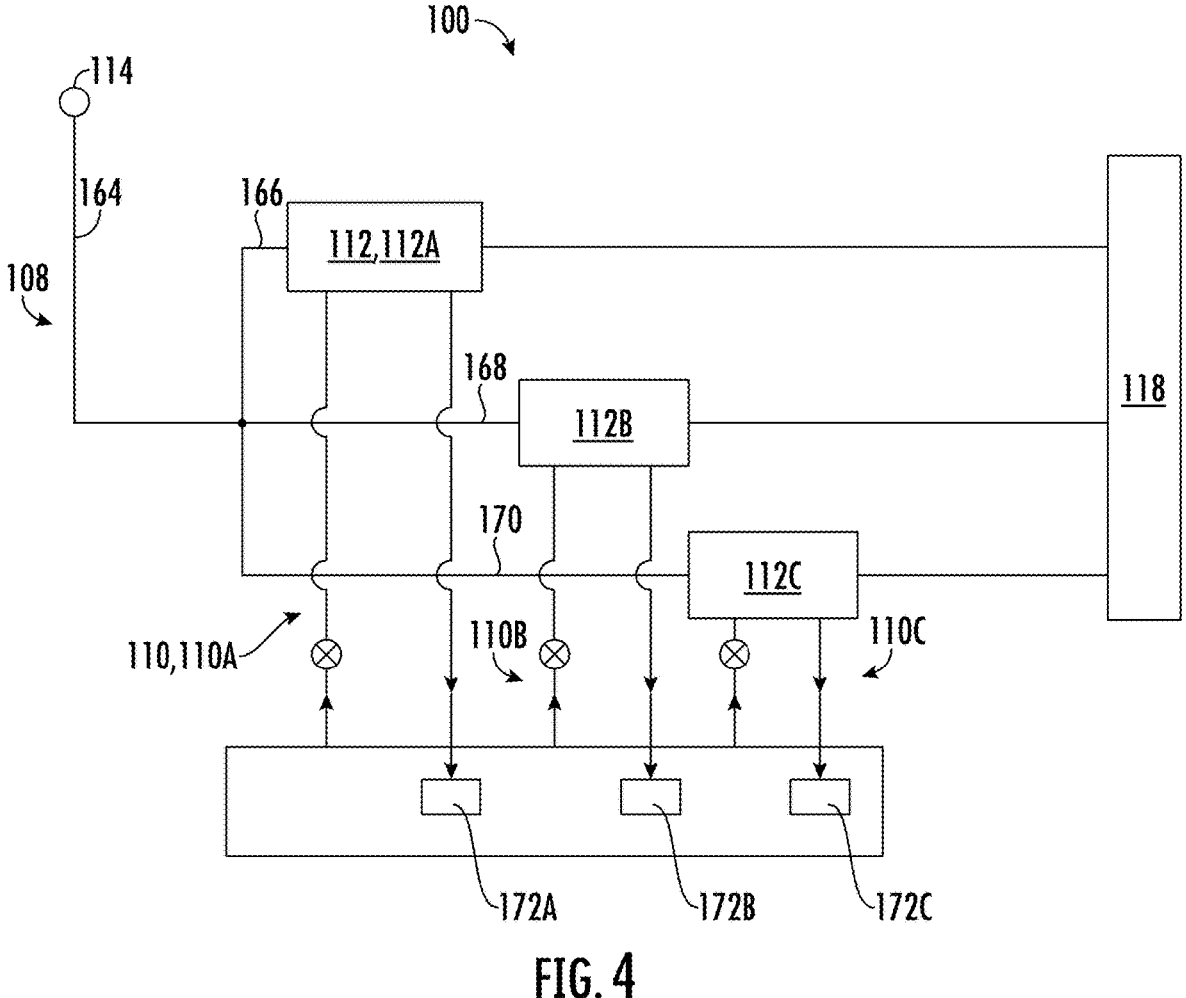
FIG. 4 is a schematic view of a CCA system in accordance with an exemplary aspect of the present disclosure.

Referring now to FIG. 4, a schematic view is provided of a CCA system 100 in accordance with an exemplary embodiment of the present disclosure. The exemplary CCA system 100 of FIG. 4 may be configured in a similar manner as exemplary CCA system 100 of FIG. 3. In particular, the exemplary CCA system 100 of FIG. 4 generally includes a cold side bleed assembly 108, a hot side bleed assembly 110, and a CCA heat exchanger 112. Notably, however, for the embodiment depicted, the CCA heat exchanger 112 is a first CCA heat exchanger 112A, and the CCA system 100 further includes a plurality of CCA heat exchangers 112.

In particular, the CCA system 100 further includes a second CCA heat exchanger 112B and a third CCA heat exchanger 112C. The cold side bleed assembly 108 includes a main portion 164 and a plurality of branches located downstream from the main portion 164 and arranged in parallel flow. In particular, in addition to the main portion 164, the cold side bleed assembly 108 includes a first portion 166 in thermal communication with the first CCA heat exchanger 112A, a second portion 168 in thermal communication with the second CCA heat exchanger 112B, and a third portion 170 in thermal communication with the third CCA heat exchanger 112C. The first portion 166, the second portion 168, and the third portion 170 are arranged in parallel flow.

Further, the hot side bleed assembly 110 is a first hot side bleed assembly 110A, and the CCA system 100 of FIG. 4 further includes a second hot side bleed assembly 110B, and a third hot side bleed assembly 110C. The first hot side bleed assembly 110A is in thermal communication with the first CCA heat exchanger 112A, the second hot side bleed assembly 110B is in thermal communication with the second CCA heat exchanger 112B and the third hot side bleed assembly 110C is in thermal communication with the third CCA heat exchanger 112C. The first hot side bleed assembly 110A, second hot side bleed assembly 110B, and third hot side bleed assembly 110C are each fluidly isolated from another.

In certain exemplary embodiments, the first hot side bleed assembly 110A, second hot side bleed assembly 110B, and third hot side bleed assembly 110C may be operable to deliver cooled airflow 124 to one or more hot components of the turbomachine 16 incorporating the CCA system 100. For example, in one exemplary embodiment, the first hot side bleed assembly 110A may be in thermal communication with a first hot component 172A of the turbomachine 16 to cool the first hot component 172A; the second hot side bleed assembly 110B may be in thermal communication with a second hot component 172B of the turbomachine 16 to cool the second hot component 172B; and the third hot side bleed assembly 110C may be in thermal medication with a third hot component 172C of the turbomachine 16 to cool the third hot component 172C.

For example, in one exemplary embodiment, the first hot side bleed assembly 110A and the second hot side bleed assembly 110B may be in thermal communication with the HP turbine 28 for providing cooled airflow 124 to an HP turbine rotor bore 140 of an HP turbine 28, a plurality of HP turbine rotor blades 142 of a first stage of the HP turbine 28, or both (see FIG. 3). The third hot side bleed assembly 110C may be in thermal indications with a downstream end of an HP compressor 24 for providing cooled airflow 124 to the downstream end of the HP compressor 24.

Figure 5:
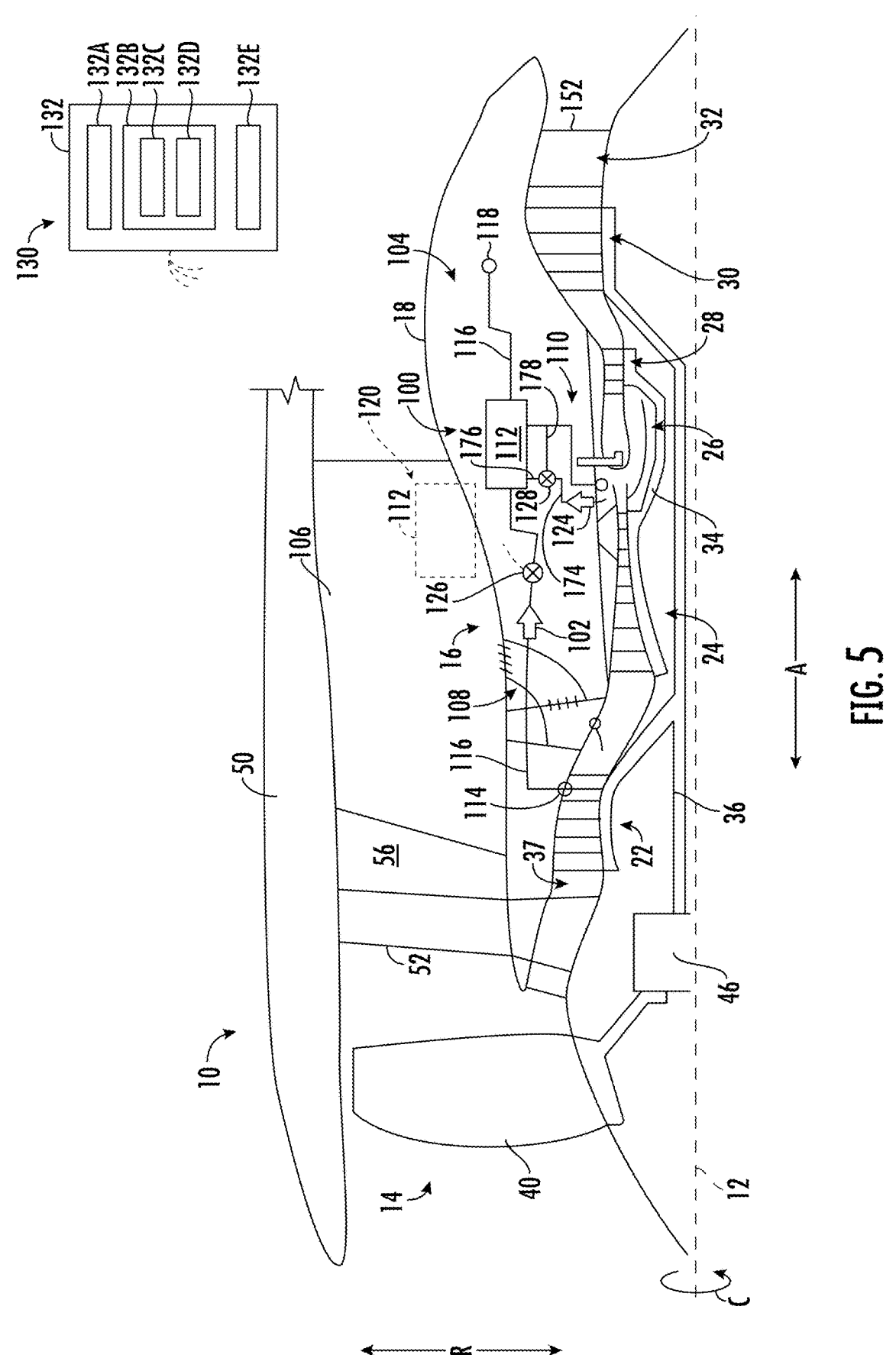
FIG. 5 is a cross-sectional view of a gas turbine engine in accordance with another exemplary aspect of the present disclosure.

Referring now to FIG. 5, a gas turbine engine 10 and CCA system 100 in accordance with another exemplary embodiment of the present disclosure is provided. The exemplary gas turbine engine 10 and CCA system 100 of FIG. 5 may be configured in a similar manner as exemplary gas turbine engine 10 and CCA system 100 of FIG. 2, discussed above. Accordingly, the same or similar numbers may refer to the same or similar parts.

For example, the exemplary CCA system 100 of FIG. 5 includes a cold side bleed assembly 108, a hot side bleed assembly 110, and a CCA heat exchanger 112 in thermal communication with both the cold side bleed assembly 108 and the hot side bleed assembly 110 to cool an airflow through the hot side bleed assembly 110 (e.g., a cooled airflow 124). Further, the CCA system 100 includes a first flow control valve 126 in operable communication with the cold side bleed assembly 108 and a second flow control valve 128 in operable communication with the hot side bleed assembly 110. Notably, however, for the embodiment shown, the hot side bleed assembly 110 further includes an upstream portion 174 defining the inlet 122, a first portion 176 in thermal communication with the CCA heat exchanger 112 and a bypass portion 178 bypassing the CCA heat exchanger 112. The second flow control valve 128 is located at a juncture between the upstream portion 174, the first portion 176, and the bypass portion 178. In such a manner, the second flow control valve 128 may modulate an amount of cooled airflow 124 through the hot side bleed assembly 110 that bypasses the CCA heat exchanger 112.

In at least certain exemplary embodiments, the bypass arrangement of FIG. 5 may be incorporated into other embodiments the present disclosure, such as one or more of the hot side bleed assemblies 110 described above with reference to the embodiment of FIGS. 2, 4, or both.

Figure 6:
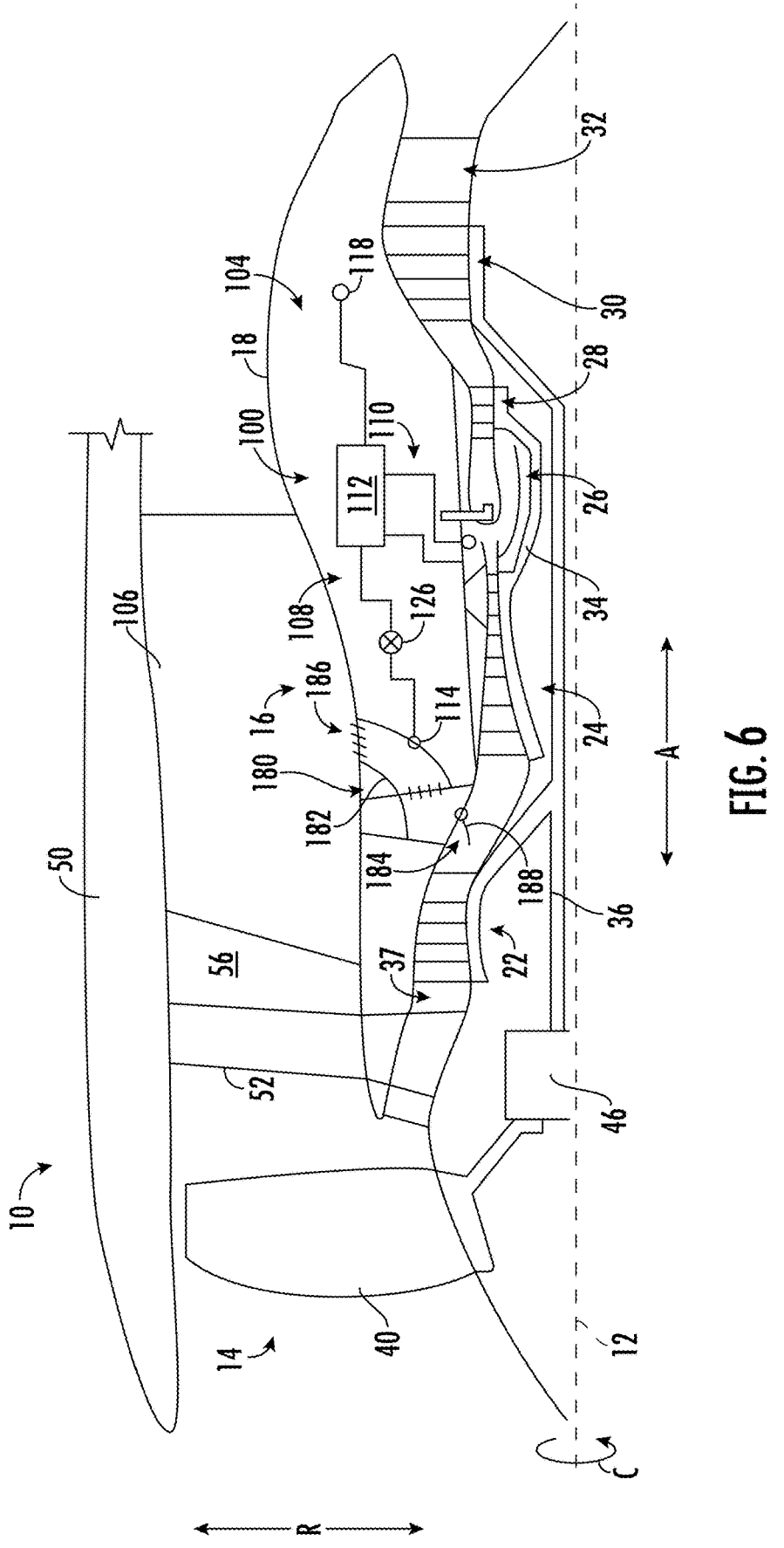
FIG. 6 is a cross-sectional view of a gas turbine engine in accordance with another exemplary aspect of the present disclosure.

Further, referring now to FIG. 6, a gas turbine engine 10 and CCA system 100 in accordance with another exemplary embodiment of the present disclosure is provided. The exemplary gas turbine engine 10 and CCA system 100 of FIG. 6 may also be configured in a similar manner as the exemplary gas turbine engine 10 and CCA system 100 of FIG. 2, discussed above. Accordingly, the same or similar numbers may refer to the same or similar parts.

For example, the exemplary CCA system 100 of FIG. 6 includes a cold side bleed assembly 108, a hot side bleed assembly 110, and a CCA heat exchanger 112 in thermal communication with both the cold side bleed assembly 108 and the hot side bleed assembly 110 to cool an airflow through the hot side bleed assembly 110. The cold side bleed assembly 108 defines an inlet 114 in fluid communication with the working gas flowpath 37 through the compressor section at a location through an LP compressor 22, between the LP compressor 22 and an HP compressor 24, or both. In particular, for the embodiment of FIG. 6, the turbomachine 16 includes an operability bleed assembly 180 having an operability bleed duct 182 extending between an inlet 184 in fluid communication with the working gas flowpath 37 and an outlet 186 in fluid communication with a bypass passage 56 of the gas turbine engine 10. In particular, the inlet 184 of the operability bleed duct 182 is in fluid communication with the working gas flowpath 37 at a location between the LP compressor 22 and the HP compressor 24. The inlet 114 of the cold side bleed assembly 108 is in fluid communication with the operability bleed duct 182. In such a manner, the inlet 114 of the cold side bleed assembly 108 is indirectly in fluid communication with the working gas flowpath 37 at a location between the LP compressor 22 and the HP compressor 24.

Notably, the operability bleed assembly 180 further includes a variable bleed valve 188 at the inlet 184 of the operability bleed duct 182, and in communication with the operability bleed duct 182. The variable bleed valve 188 is located upstream of where the inlet 114 of the cold side bleed assembly 108 meets the operability bleed duct 182. In such a manner, the variable bleed valve 188 may control a cooling airflow 102 through the cold side bleed assembly 108 of the CCA system 100. The variable bleed valve 188 may be in operable communication with a controller, such as the exemplary controller 130 of FIG. 2

Figure 7:
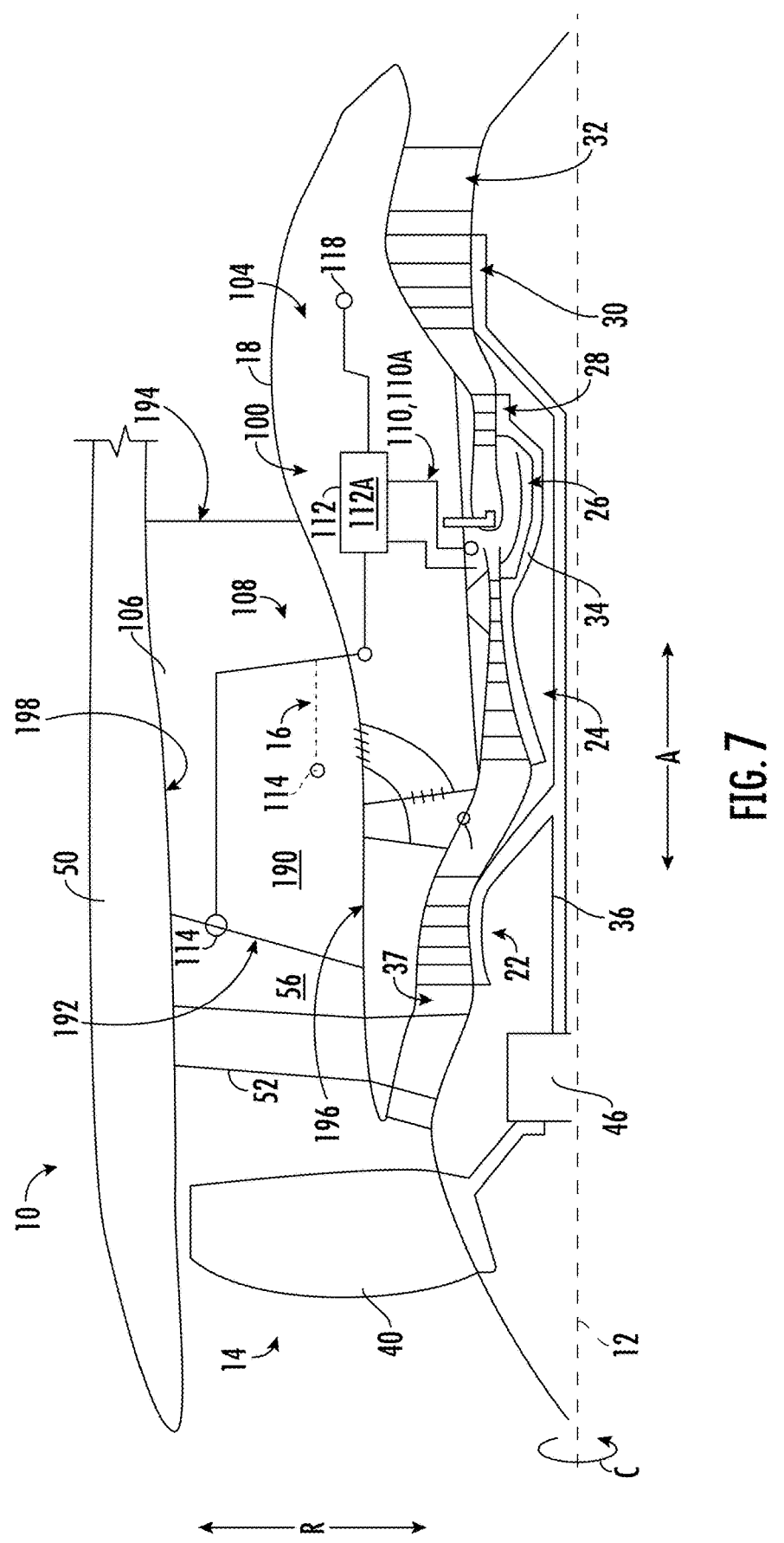
FIG. 7 is a cross-sectional view of a gas turbine engine in accordance with yet another exemplary aspect of the present disclosure.
Figure 8:
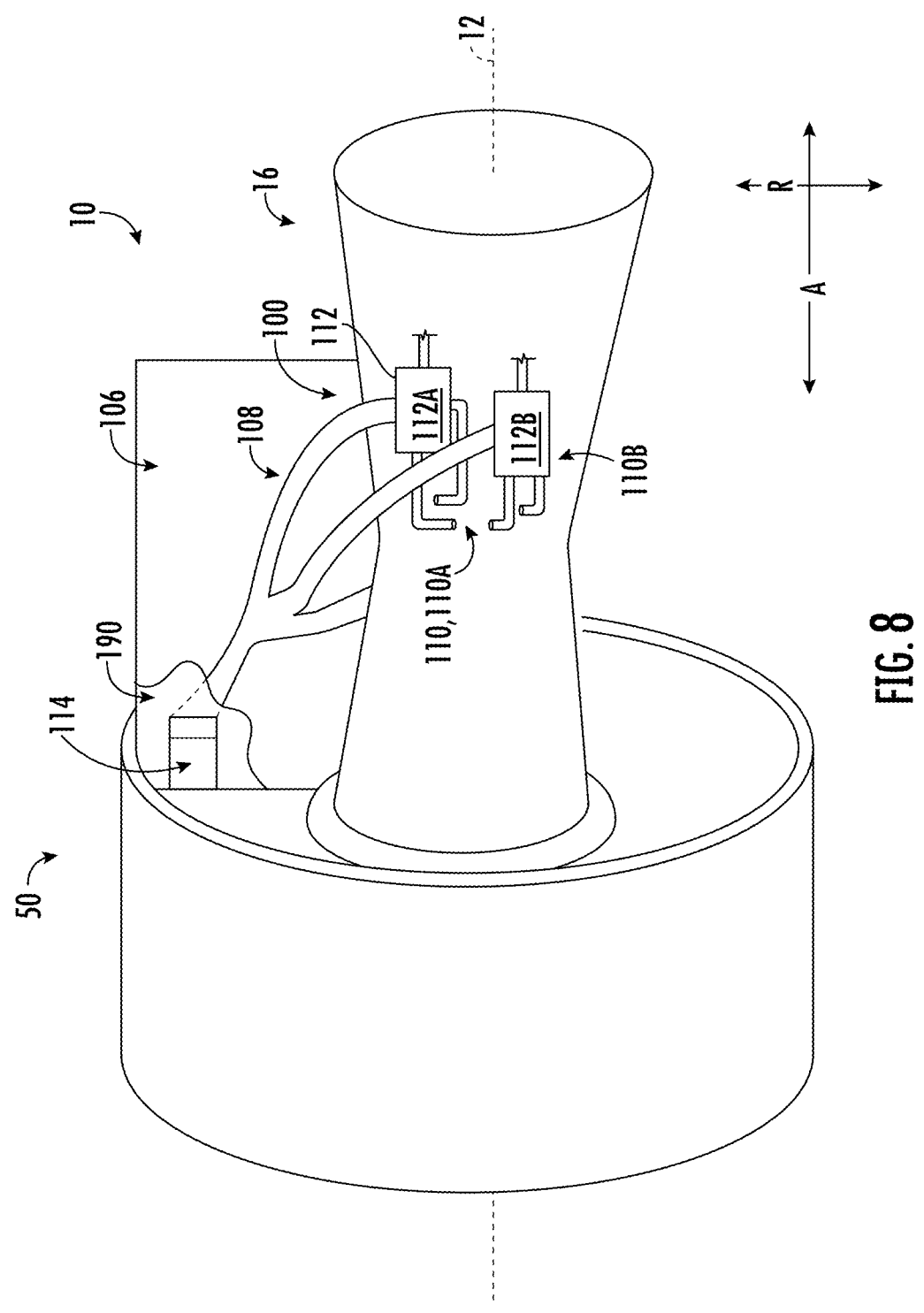
FIG. 8 is a perspective, schematic view of the exemplary gas turbine engine of FIG. 7.

Referring now to FIGS. 7 and 8, a gas turbine engine 10 in accordance with another exemplary embodiment is depicted. FIG. 7 provides a schematic, cross-sectional view of the exemplary gas turbine engine 10, and FIG. 8 provides a perspective view of the exemplary gas turbine engine 10 with certain components removed for clarity. The exemplary gas turbine engine 10 of FIGS. 7 and 8 may be configured in substantially the same manner as one or more of the exemplary gas turbine engines 10 described above with reference to FIGS. 1 through 6. Accordingly, the same or similar numbers may refer to the same or similar parts.

For example, the exemplary gas turbine engine 10 of FIGS. 7 and 8 includes a turbomachine 16 having an outer cowl 18 (removed in FIG. 8 for clarity), and outer nacelle 50 at least partially surrounding the turbomachine 16 (all but a forward case of which removed in FIG. 8 for clarity), and an extension coupled to the turbomachine 16 and extending outwardly from the turbomachine 16. More specifically, for the embodiment depicted, the extension is a bifurcation extending between the turbomachine 16 and the outer nacelle 50. More specifically, still, for the embodiment shown, the bifurcation is an upper bifurcation 106 in the embodiment of FIGS. 7 and 8 (with a majority of one wall removed in FIG. 8 for clarity).

The exemplary gas turbine engine 10 further includes a CCA system 100. The exemplary CCA system 100 includes a cold side bleed assembly 108, a hot side bleed assembly 110, and a CCA heat exchanger 112 in thermal communication with both the cold side bleed assembly 108 and the hot side bleed assembly 110 to cool an airflow through the hot side bleed assembly 110. More specifically, for the embodiment shown, the CCA system 100 includes a plurality of CCA heat exchangers 112 and a respective plurality of hot side bleed assemblies 110 in thermal medication with a respective one of the plurality of CCA heat exchangers 112 (see FIG. 8). Such a configuration may be similar to the exemplary arrangement described above with reference to FIG. 4. Notably, only a first CCA heat exchanger 112A and a first hot side bleed assembly 110A of the CCA system 100 is depicted in FIG. 7.

For the exemplary embodiment depicted in FIGS. 7 and 8, the cold side bleed assembly 108 defines an inlet 114. However, for the embodiment shown, the inlet 114 is positioned to be in fluid communication with an airflow over the extension, and more specifically over the bifurcation, and more specifically, still, over the upper bifurcation 106.

More specifically, the upper bifurcation 106 includes a flowpath surface 190. The term "flowpath surface," in the context of the upper bifurcation 106, refers to a surface that is exposed to the airflow through a bypass passage 56 during operation of the gas turbine engine 10. In the embodiment depicted, the inlet 114 is positioned on the flowpath surface 190 of the upper bifurcation 106. In such a manner, the inlet 114 is configured to receive airflow through the bypass passage 56 flowing over the upper bifurcation 106. Such configuration may result in cooler air provided to the CCA system 100, and in particular to the one or more CCA heat exchangers 112 of the CCA system 100.

Notably, in the embodiment depicted, the upper bifurcation 106 includes a leading edge 192 and a trailing edge 194, as well as a radially inner end 196 and a radially outer end 198. In the embodiment depicted, the inlet 114 is located on the flowpath surface 190 at the leading edge 192 of the upper bifurcation 106, and proximate to the radially outer end 198 of the upper bifurcation 106 (e.g., closer to the radially outer end 198 than to the radially inner end 196). Such a configuration may maximize a pressure of the cooling airflow 102 received by the cold side bleed assembly 108. In particular, such a configuration may allow for the cold side bleed assembly 108 to receive substantially freestream airflow, as compared to a boundary layer airflow at other locations.

It will be appreciated, however, that in other exemplary embodiments, the inlet 114 may be located on the flowpath surface 190 of the bifurcation, or rather the upper bifurcation 106, at other suitable locations. For example, as is depicted in phantom in FIG. 7, in other exemplary embodiments, the inlet 114 may be positioned proximate the radially inner end 196, and between the leading edge 192 and the trailing edge 194. Such a configuration may reduce an amount of ductwork required for the cold side bleed assembly 108, while still providing airflow to the cold side bleed assembly 108 with a reduced amount of boundary layer airflow as compared to other locations exposed to the bypass passage 56.

Figure 9:
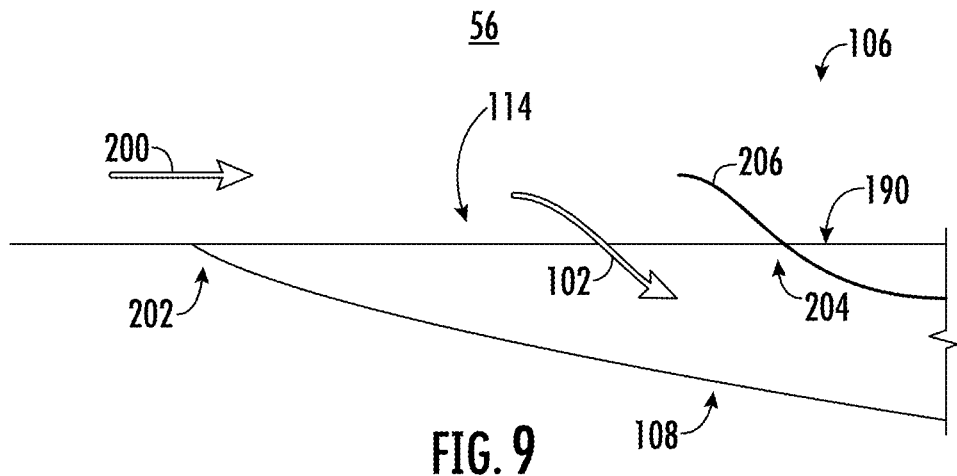
FIG. 9 is a close up view of an inlet to a cold side bleed assembly of a CCA system in accordance with an exemplary aspect of the present disclosure.

Referring now to FIG. 9, a close-up, cross-sectional, top-down view of an inlet 114 to a cold side bleed assembly 108 of a CCA system 100 in accordance with an exemplary embodiment of the present disclosure is provided. The inlet 114 depicted in FIG. 9 may be positioned on a flowpath surface 190 of an upper bifurcation 106 of the gas turbine engine 10, similar to the exemplary embodiment depicted in FIGS. 7 and 8.

As shown, an airflow 200 over the bifurcation defines an airflow direction, and the inlet 114 defines an upstream end 202 and a downstream end 204. In the embodiment depicted, the cold side bleed assembly 108 includes a scoop 206 at the inlet 114 to increase an amount of the airflow 200 received through the inlet 114 and into the cold side bleed assembly 108 as a cooling airflow 102. In particular, in the embodiment shown, the scoop 206 is positioned at the downstream end 204 of the inlet 114 facing into the airflow direction. Such a configuration may allow for desired amount of airflow to be received as the cooling airflow 102.

Figure 10:
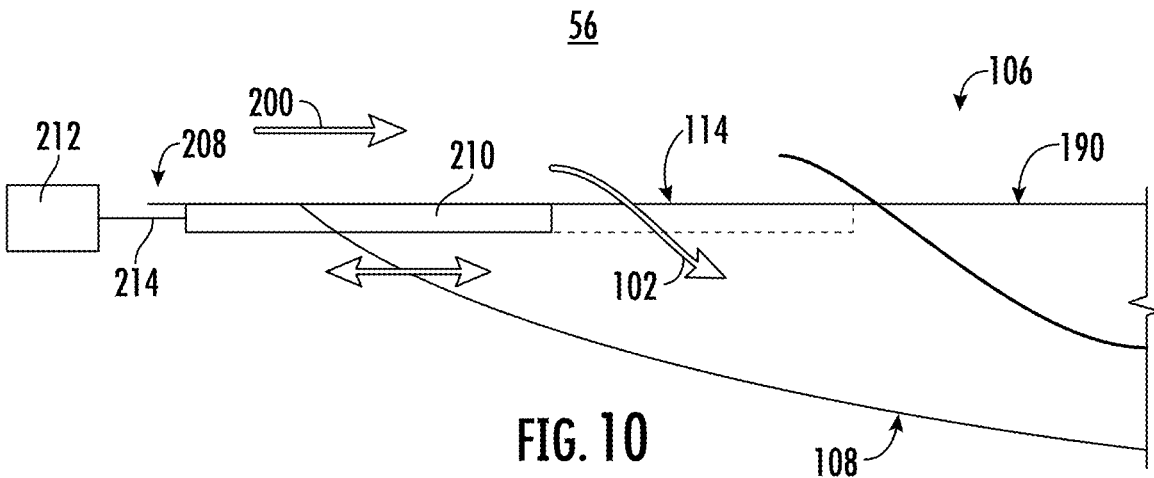
FIG. 10 is a close up view of an inlet to a cold side bleed assembly of a CCA system in accordance with another exemplary aspect of the present disclosure.

It will be appreciated, however, that in other exemplary embodiments, other suitable arrangements may be provided. For example, referring now to FIG. 10, another close-up, cross-sectional, top-down view of an inlet 114 to a cold side bleed assembly 108 of a CCA system 100 in accordance with an exemplary embodiment of the present disclosure is provided. The exemplary inlet 114 of FIG. 10 may be configured in substantially the same manner as the exemplary inlet 114 of FIG. 9. However, for the exemplary embodiment of FIG. 10, the cold side bleed assembly 108 further includes a variable geometry component 208 at the inlet 114. In particular, for the embodiment shown the variable geometry component 208 includes a door 210, an actuator 212, and an extension 214. The actuator 212 is a linear actuator operable with the door 210 through the extension 214. The door 210 is movable in an airflow direction of an airflow 200 between an open position, a closed position (depicted in phantom), and one or more intermediate positions (shown) by the actuator 212. In such a manner, it will be appreciated that the variable geometry component 208 may control a mass flowrate of the cooling airflow 102 through the cold side bleed assembly 108. Accordingly, the variable geometry component may be referred to as a flow control valve for the cold side bleed assembly 108 (see, e.g., valve 126 in FIG. 2).

Although not depicted, in certain exemplary embodiments, the actuator 212 of the variable geometry component 208 may be operably coupled to a controller, such as the exemplary controller 130 of FIG. 2.

It will further be appreciated that in other exemplary embodiments, any other suitable variable geometry component may be provided. For example, in other exemplary embodiments, the variable geometry component 208 may include a plurality of sequentially arranged vane, slats, louvers, or doors (e.g., one or more hinged doors), each rotatable about a respective pivot axis between an open position, a closed position, and one or more intermediate positions.

Figure 11:
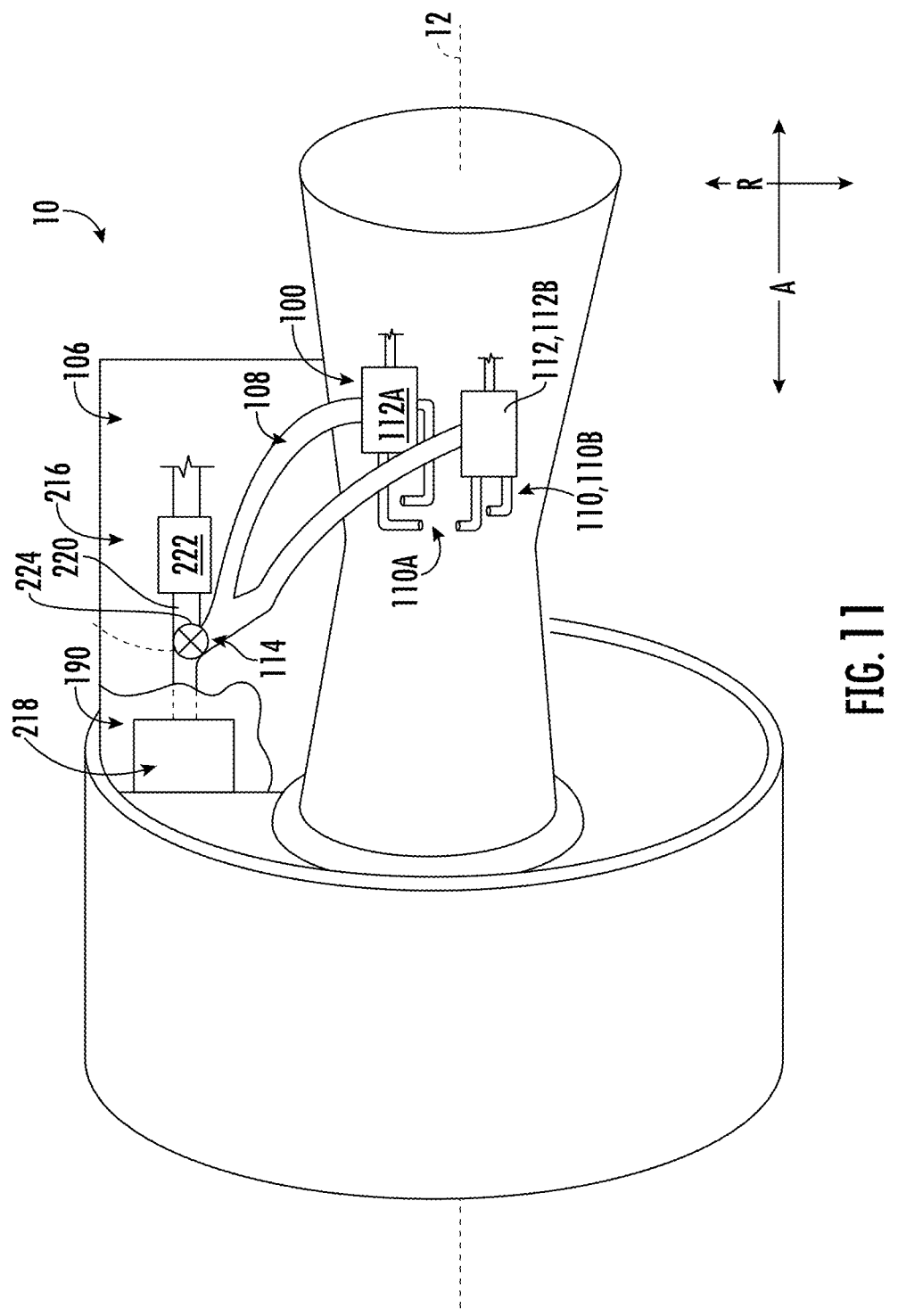
FIG. 11 is a perspective, schematic view of a gas turbine engine in accordance with still another exemplary aspect of the present disclosure.

Referring now to FIG. 11, a partial, perspective view of a gas turbine engine 10 and CCA system 100 in accordance with another exemplary embodiment of the present disclosure is provided. The exemplary gas turbine engine 10 and CCA system 100 of FIG. 11 may be configured in substantially the same manner as the exemplary gas turbine engine 10 and CCA system 100 described above with reference to FIGS. 7 and 8.

For example, the exemplary CCA system 100 of FIG. 11 includes a cold side bleed assembly 108 defining an inlet 114 position to be in fluid communication with an airflow over a bifurcation of the gas turbine engine 10. Notably, however, for the exemplary embodiment of FIG. 11, the inlet 114 is not positioned on a flowpath surface 190 of the bifurcation. Instead, the inlet 114 is positioned to indirectly receive a portion of the airflow over the bifurcation.

More specifically, the exemplary gas turbine engine 10 further includes an accessory system cooling system 216 having a cooling system inlet 218 on the bifurcation and a duct 220 in fluid communication with the cooling system inlet 218. The cooling system inlet 218 of the accessory system cooling system 216 is positioned on the flowpath surface 190 of the bifurcation. The inlet 114 of the cold side bleed assembly 108 is in fluid communication with the duct 220 of the accessory system cooling system 216 at a location downstream of the cooling system inlet 114.

In certain exemplary embodiments, the accessory system cooling system 216 may be an environmental control system, e.g., for an aircraft including the gas turbine engine 10. Notably, for the embodiment shown, the accessory system cooling system 216 further includes a dedicated heat exchanger 222, such as an environmental control system pre-cooler, configured to cool an airflow through the duct 220 of the accessory system cooling system 216.

Moreover, for the embodiment shown, the CCA system 100 includes a flow control valve 224 located at the inlet 114 to the cold side bleed assembly 108. For the embodiment shown, the flow control valve 224 is further operable with the airflow through the duct 220 of the accessory system cooling system 216 to control an airflow split between the duct 220 of the accessory system cooling system 216 and the cold side bleed assembly 108 of the CCA system 100. The flow control valve may be operably coupled to a controller (such as the exemplary controller 130 described above with reference to FIG. 2).

In such a manner, a number of individual openings on the flowpath surface 190 of the bifurcation of the gas turbine engine 10 may be reduced, and an amount of ductwork for the gas turbine engine 10 as a whole may be reduced.

It will be appreciated, however, that in other exemplary embodiments, the cold side bleed assembly 108 may define an inlet 114 positioned to be in fluid communication with an airflow over another extension. For example, in other embodiments, the extension may additionally or alternatively be configured as a pylon, a lower bifurcation, an outlet guide vane, a structure for an embedded gas turbine engine, or the like.

The present disclosure is generally related to a gas turbine engine having a cooled cooling air system for cooling one or more hot components of the gas turbine engine. In particular, as gas turbine engines are driven to higher efficiencies and performance metrics, certain temperatures in the gas turbine engines can be pushed higher and higher. The materials forming components exposed to these temperatures can be strained by these increases. Accordingly, cooling these components can become important for modern gas turbine engines.

Certain attempts at cooling these components have used pressurized airflows from the compressor section and directed these pressurized airflows to the hot components.

However, the inventors of the present disclosure have found that these pressurized airflows are either too hot to prove useful, or do not have sufficient pressure to allow the airflows to flow through, e.g., a stage 1 high pressure turbine rotor blade, and an environmental pressure is too high.

The present disclosure addresses these issues by utilizing a low pressure airflow from a cold location of the gas turbine engine to cool a high pressure airflow from, e.g., a compressor discharge cavity of the gas turbine engine through a cooled cooling air heat exchanger. The low pressure airflow, after having accepted hear from the high pressure airflow may be exhausted through a under-cowl area of the gas turbine engine in a way to avoid harming components of the turbomachine, avoid counteracting other systems of the turbomachine, etc.

In particular, certain aspects of the present disclosure are directed to a gas turbine engine including a turbomachine having a compressor section, a combustion section defining a compressor discharge cavity, and a turbine section. The turbomachine defines a working gas flowpath and further includes a CCA system. The CCA system includes a hot side bleed assembly, a CCA heat exchanger in thermal communication with the hot side bleed assembly; and a cold side bleed assembly. The cold side bleed assembly defines an inlet in fluid communication with a cold location of the gas turbine engine and an outlet. The outlet of the cold side bleed assembly is in fluid communication with the working gas flowpath at a location downstream of the turbine section, with a core cowl vent of the turbomachine, a passage over the turbomachine, or a combination thereof.

Figure 12:
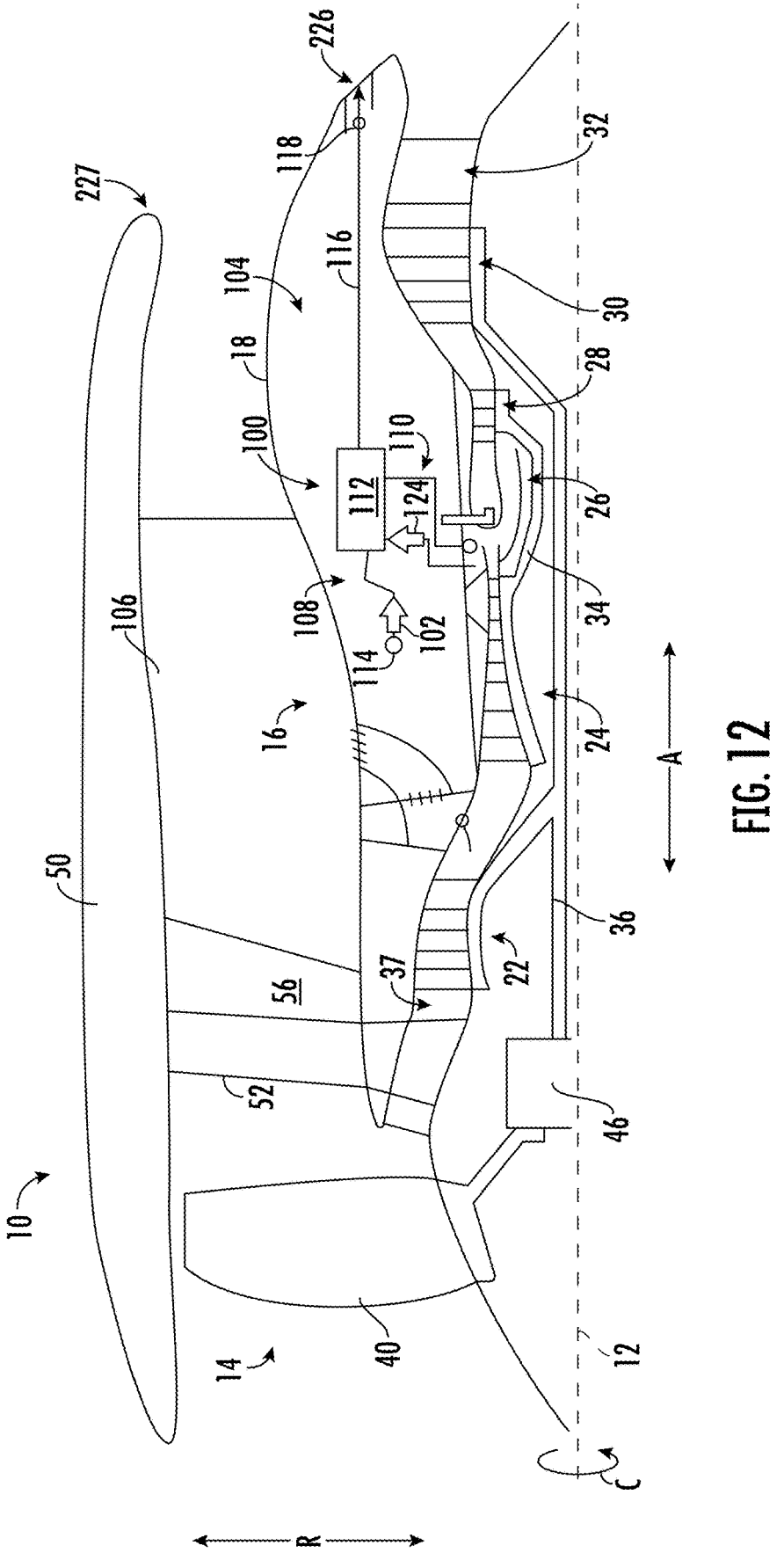
FIG. 12 is a cross-sectional view of a gas turbine engine in accordance with still another exemplary aspect of the present disclosure.

Referring now to FIG. 12, a gas turbine engine 10 in accordance with another exemplary embodiment of the present disclosure is provided. The gas turbine engine 10 of FIG. 12 may be configured in a similar manner as one or more of the exemplary gas turbine engines 10 described above with reference to FIGS. 1 through 11.

For example, the exemplary gas turbine engine 10 generally includes a turbomachine 16 having a compressor section, combustion section 26, and a turbine section collectively defining at least in part a working gas flowpath 37. The turbomachine 16 further includes a CCA system 100. The CCA system 100 includes a hot side bleed assembly 110, a cold side bleed assembly 108, and a CCA heat exchanger 112 in thermal communication with the hot side bleed assembly 110 and the cold side bleed assembly 108. The cold side bleed assembly 108 defines an inlet 114 in fluid communication with a cold location of the gas turbine engine 10 and an outlet 118. The cold location may be one or more of the locations discussed above with respect to the embodiments of FIGS. 2 through 11. Additionally, or alternatively, the cold location may be one or more other locations, such as an outer cowl 18 of the turbomachine 16 (see, e.g., inlet 402 of active clearance control ("ACC") system 400, discussed below with reference to, e.g., FIG. 26).

Further, for the embodiment shown, the outlet 118 of the cold side bleed assembly 108 is in fluid communication with the working gas flowpath 37 at a location downstream of the turbine section, with a core cowl vent 226 of the turbomachine 16, with a passage over the turbomachine 16, or a combination thereof.

In particular, the exemplary turbomachine 16 depicted includes an outer cowl 18 surrounding a compressor section, the combustion section 26, and the turbine section. The outer cowl 18 includes a core cowl vent 226 at an aft end. In particular, the core cowl vent 226 is located aft of a downstream end 227 of the outer nacelle 50 and outward along a radial direction R from the working gas flowpath 37 through a jet exhaust nozzle section 32. The outlet 118 of the cold side bleed assembly 108 is in fluid communication with the core cowl vent 226 of the turbomachine 16.

In particular, the cold side bleed assembly 108 includes one or more ducts 116 extending from the CCA heat exchanger 112 towards the core cowl vent 226 and to a location aft of an LP turbine 30 of the turbine section. In such a manner, a cooling airflow 102 through the cold side bleed assembly 108 (which may be heated by virtue of its thermal communication with a cooled airflow 124 through the hot side bleed assembly 110) may not contact an outer case surrounding the LP turbine 30, or an outer case surrounding an HP turbine 28 of the turbine section, such that, e.g., clearances within the LP turbine 30 are not affected (and operation of an active clearance control system is not affected; discussed below). In particular, for the embodiment depicted, the one or more ducts 116 of the cold side bleed assembly 108 extends to the core cowl vent 226 such that the cooling airflow 102 through the cold side bleed assembly 108 exhausts directly through the core cowl vent 226.

Figure 13:
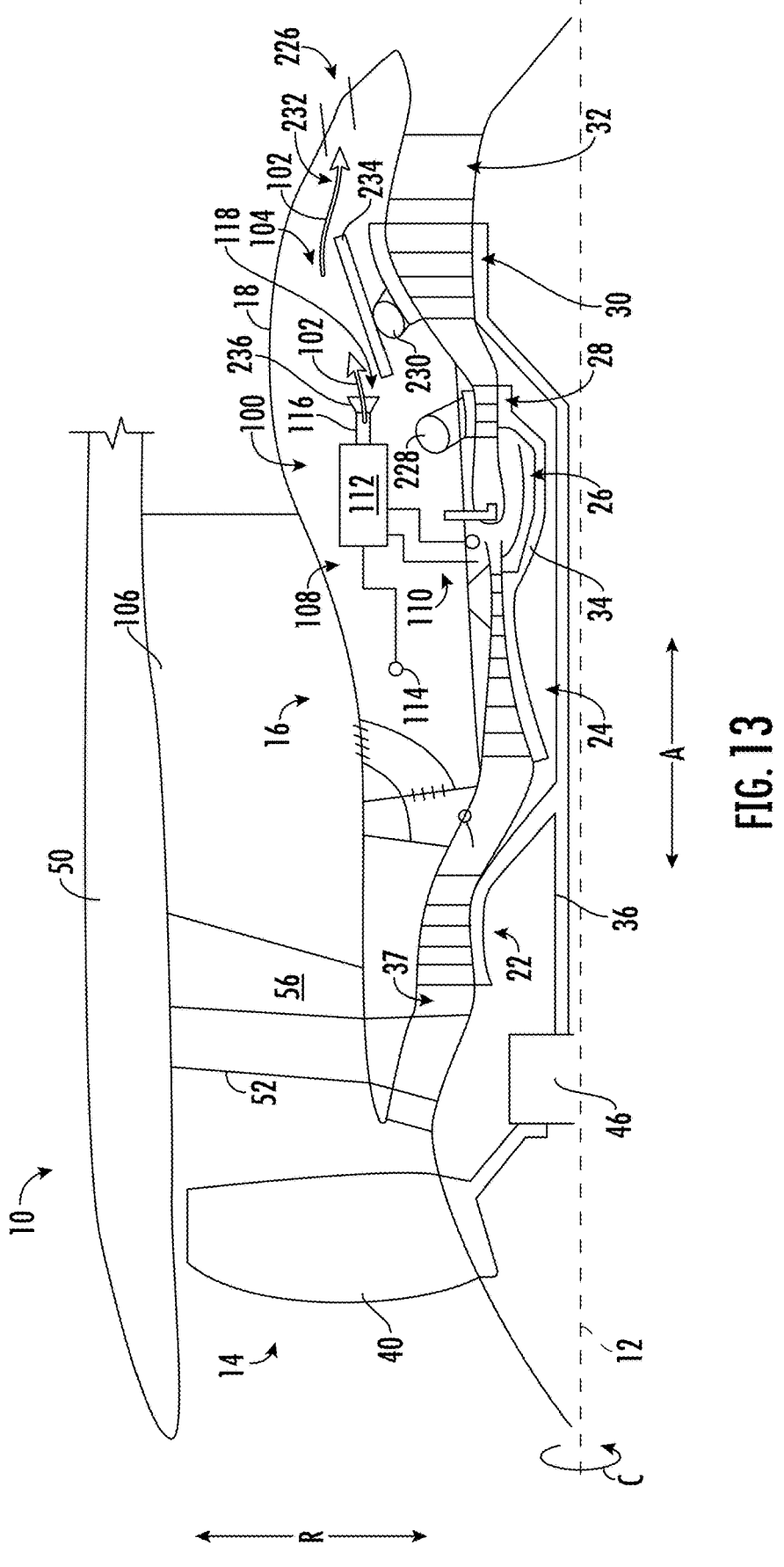
FIG. 13 is a cross-sectional view of a gas turbine engine in accordance with still another exemplary aspect of the present disclosure.

It will be appreciated, however, that in other exemplary embodiments, any other suitable configuration may be provided. For example, referring now to FIG. 13, a gas turbine engine 10 and a CCA system 100 in accordance with another exemplary embodiment of the present disclosure is provided. The exemplary CCA system 100 of FIG. 13 may be configured in a similar manner as the exemplary CCA system 100 FIG. 12. For example, the CCA system 100 of FIG. 13 generally includes a cold side bleed assembly 108 defining an inlet 114 in airflow indication of a cold location and an outlet 118 in fluid communication with a core cowl vent 226 of the turbomachine 16. However, for the embodiment depicted, the outlet 118 of the cold side bleed assembly 108 is located forward of an aft end of the LP turbine 30 of the turbine section.

In particular, it will be appreciated that the turbomachine 16 further includes an HP turbine active clearance control ("ACC") system 228 and an LP turbine ACC system 230. The HP turbine ACC system 228 is located around an HP turbine 28 of the turbine section and the LP turbine ACC system 230 is located around the LP turbine 30 of the turbine section. The exemplary turbomachine 16 depicted further defines an under-cowl flowpath 232 for transporting a cooling airflow 102 through the outlet 118 of the cold side bleed assembly 108 to the core cowl vent 226. The under-cowl flowpath 232 extends at least from the outlet 118 to the core cowl vent 226 and over at least a portion of the LP turbine 30.

In order to avoid the temperatures of the cooling airflow 102 exhausted from the outlet 118 of the cold side bleed assembly 108 affecting operation of, e.g., the LP turbine ACC system 230, the turbomachine 16 further includes a heat shield 234 positioned between the under-cowl flowpath 232 and the LP turbine 30 of the turbine section. More specifically, the heat shield 234 extends along an axial direction A of the gas turbine engine 10 between at least the outlet 118 of the cold side bleed assembly 108 and a downstream end of the LP turbine 30.

Briefly, it will be appreciated that the heat shield 234 may additionally or alternatively prevent the temperatures of the cooling airflow 102 exhausted from the outlet 118 of the cold side bleed assembly 108 from affecting operation of other systems, including, but not limited to, pumps, valves, controllers, fuel system components, environmental control systems, electrical systems such as generators or power converters, and lubrication system components.

Moreover, the cold side bleed assembly 108 further includes a diffuser 236 located at the outlet 118. The diffuser 236 is configured to defuse the cooling airflow 102 through the outlet 118 of the cold side bleed assembly 108 to avoid undesirable impingement heating on one or more components within the turbomachine 16. The diffuser 236 may be a simple area change diffuser defining an area ratio between a downstream end and an upstream end greater than or equal to 1.5:1 and less than or equal to 10:1. Alternatively, more complex diffusers may be utilized.

Further, in still other exemplary embodiments, other suitable configurations may be utilized. For example, referring now to FIG. 14, a gas turbine engine 10 and CCA system 100 in accordance with another exemplary embodiment of the present disclosure is provided. The exemplary CCA system 100 of FIG. 14 may be configured in a similar manner as exemplary CCA system 100 FIG. 12. For example, the CCA system 100 of FIG. 14 generally includes a cold side bleed assembly 108 defining an inlet 114 in fluid communication with a cold location and an outlet 118. However, in the embodiment depicted, the outlet 118 of the cold side bleed assembly 108 is in fluid communication with the working gas flowpath 37 at a location downstream of the turbine section.

In particular, the exemplary turbomachine 16 of the gas turbine engine 10 depicted further includes a transient bleed assembly 238 including a transient bleed duct 240 extending between an inlet 242 and an outlet 244. The inlet 242 of the transient bleed duct is in fluid communication with the working gas flowpath 37 at an HP compressor 24 of the compressor section, with a compressor discharge cavity 138 of the combustion section 26 of the turbomachine 16, or both. The outlet 244 of the transient bleed duct is in fluid communication with the working gas flowpath 37 downstream of the LP turbine 30.

For the embodiment depicted, the outlet 118 of the cold side bleed assembly 108 is in fluid communication with the transient bleed duct 240 at a location between the inlet 242 of the transient bleed duct 240 and the outlet 244 of the transient bleed duct 240. In such a manner, a cooling airflow 102 through the cold side bleed assembly 108 may be exhausted into the transient bleed duct 240 and merged with an airflow through the transient bleed duct 240 before being provided into the working gas flowpath 37 at the location downstream of the LP turbine 30 through the outlet 244.

Figure 14:
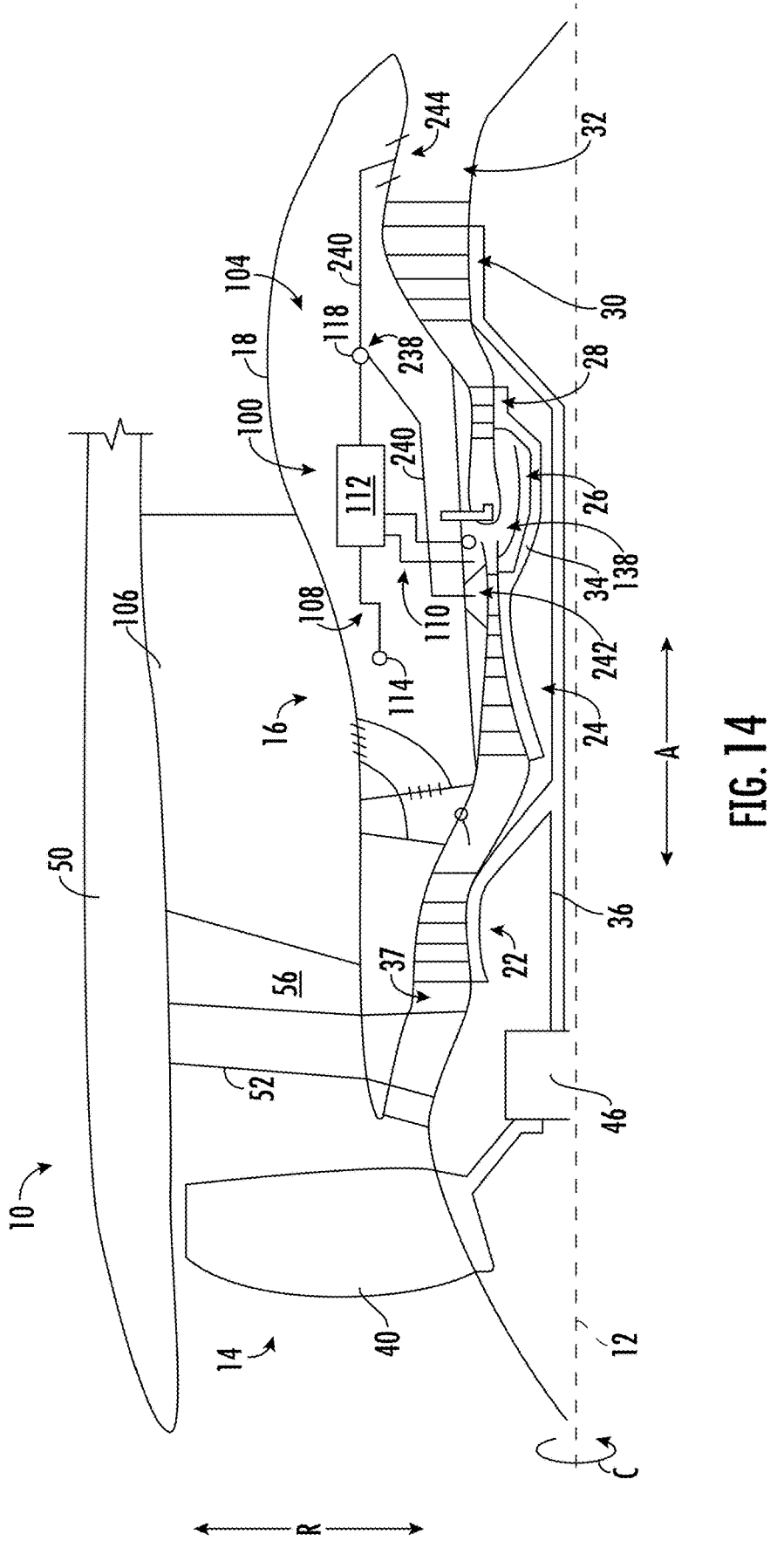
FIG. 14 is a cross-sectional view of a gas turbine engine in accordance with still another exemplary aspect of the present disclosure.
Figure 15:
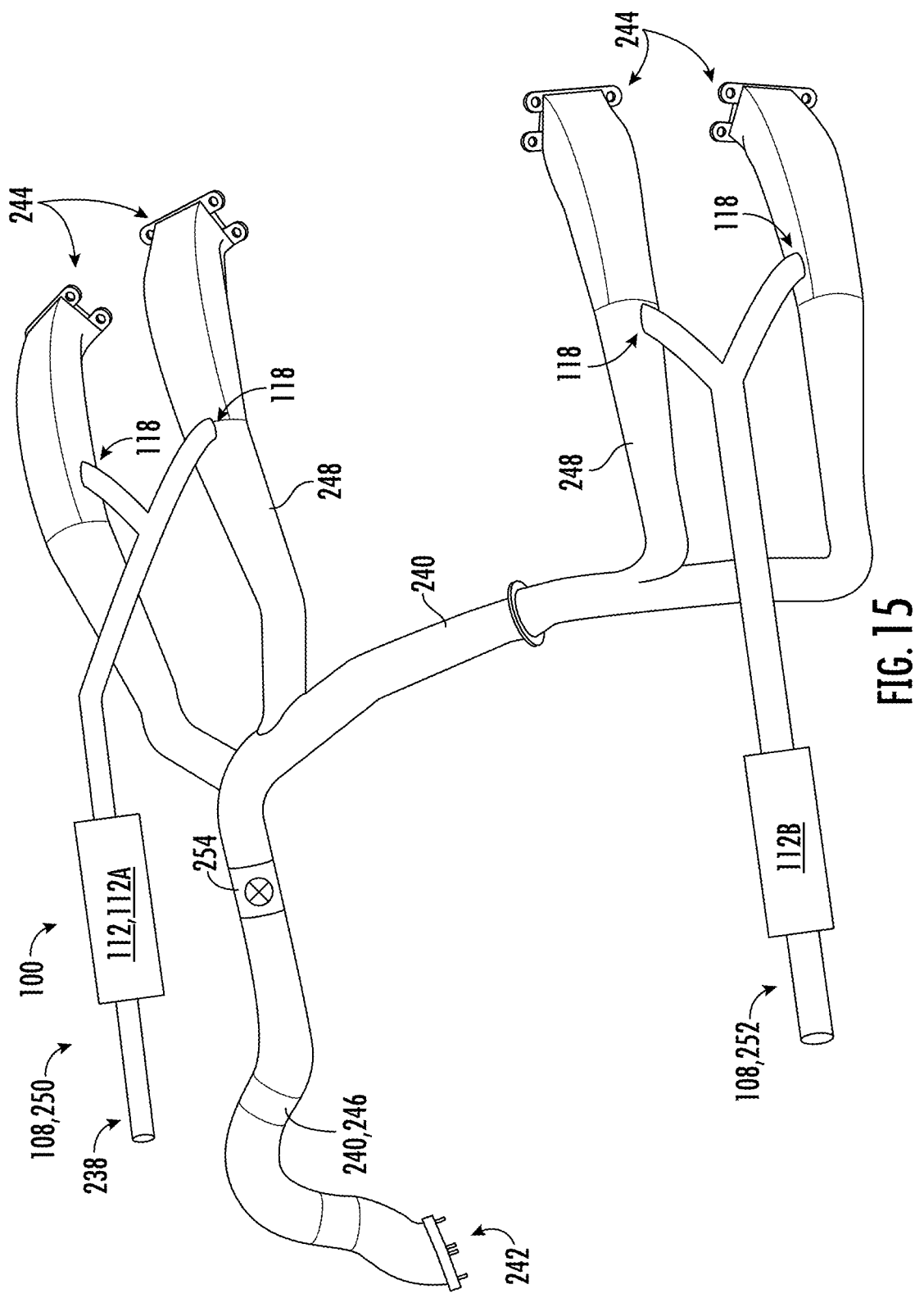
FIG. 15 is schematic view of a CCA system and transient bleed system of FIG. 14 in accordance with an exemplary aspect of the present disclosure.

Referring now to FIG. 15, a perspective view of the transient bleed assembly 238 of FIG. 14 and the CCA system 100 of FIG. 14 is provided. As will be appreciated, the transient bleed duct 240 includes a primary duct 246 extending from the inlet 114 and the plurality of branches 248. The outlet 244 of the transient bleed duct 240 is one of a plurality of outlets 244, and the plurality of branches 248 extend between the primary duct 246 and one of the respective plurality of outlets 244. Moreover, in the embodiment depicted, the CCA heat exchanger 112 is a first CCA heat exchanger 112A and the CCA system 100 further includes a second CCA heat exchanger 112B. Further, the cold side bleed assembly 108 includes a first portion 250 and a second portion 252, with the first portion 250 being in thermal communication with the first CCA heat exchanger 112A and the second portion 252 being in thermal communication with the second CCA heat exchanger 112B. The first portion 250 of the cold side bleed assembly 108 and the second portion 252 of the cold side bleed assembly 108 each define one or more outlets 118 opening into a respective branch 248 of the plurality of branches 248 of the transient bleed duct 240.

Notably, the exemplary transient bleed assembly 238 further includes a transient bleed valve 254 operable with the transient bleed duct 240, and more specifically operable with the primary duct 246 of the transient bleed duct 240. The transient bleed valve 254 may modulate an amount of bleed airflow through the transient bleed duct 240. The transient bleed valve 254 may be in operable communication with a controller, such as the exemplary controller 130 of FIG. 2 to control operations of the transient bleed assembly 238.

Although not depicted, the cold side bleed assembly 108 may include one or more flow control valves to modulate a cooling airflow 102 through the cold side bleed assembly 108, located upstream of the CCA heat exchanger 112 or downstream of the CCA heat exchanger 112.

The configuration of FIGS. 14 and 15 may reduce an overall amount of ductwork within the turbomachine 16, while further providing an exhaust location for the cooling airflow 102 through the cold side bleed assembly 108 of the CCA system 100 (e.g., without risk of damaging other components or affecting an operation of other systems).

Figure 16:
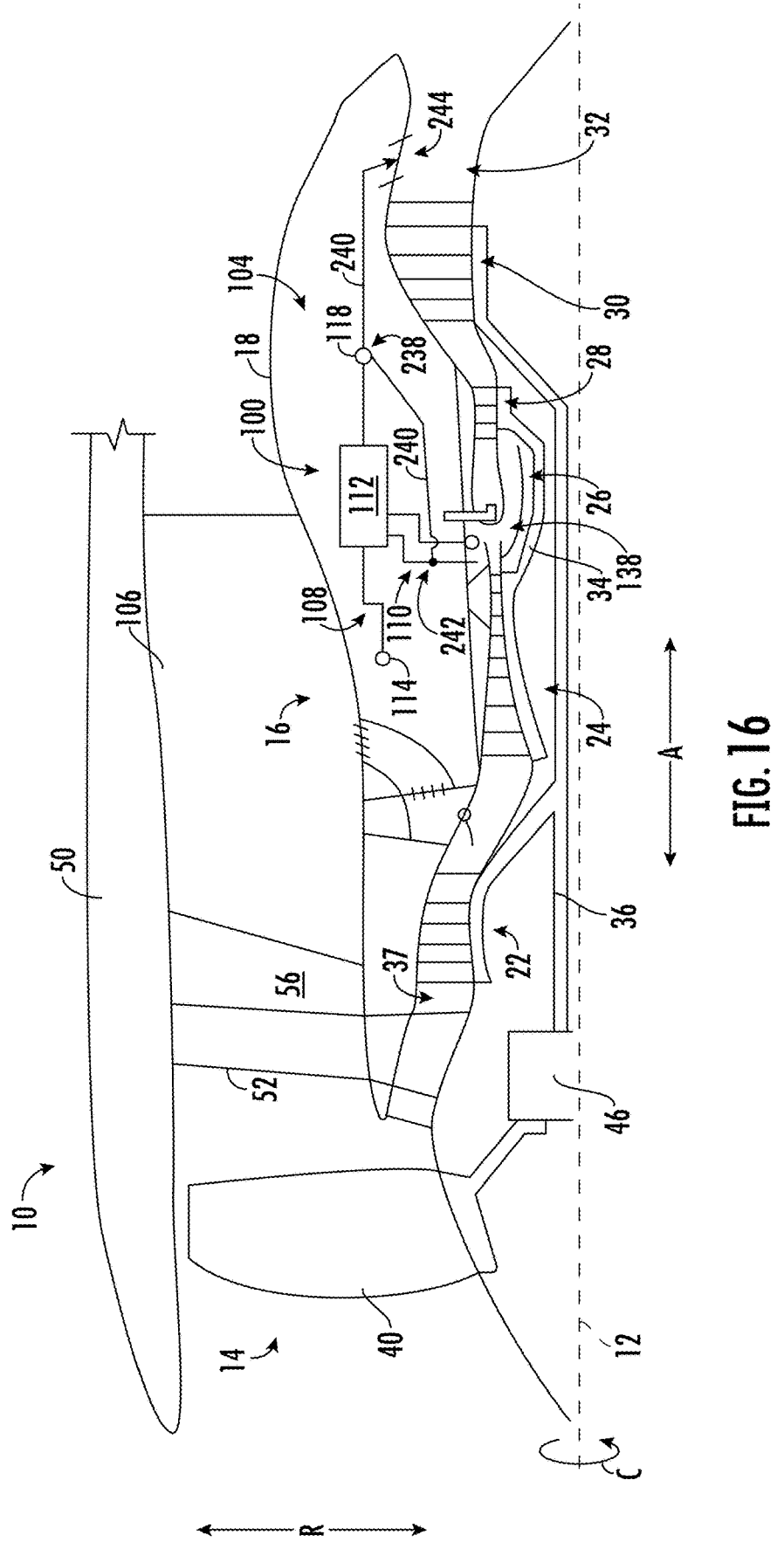
FIG. 16 is a cross-sectional view of a gas turbine engine in accordance with still another exemplary aspect of the present disclosure.
Figure 17:
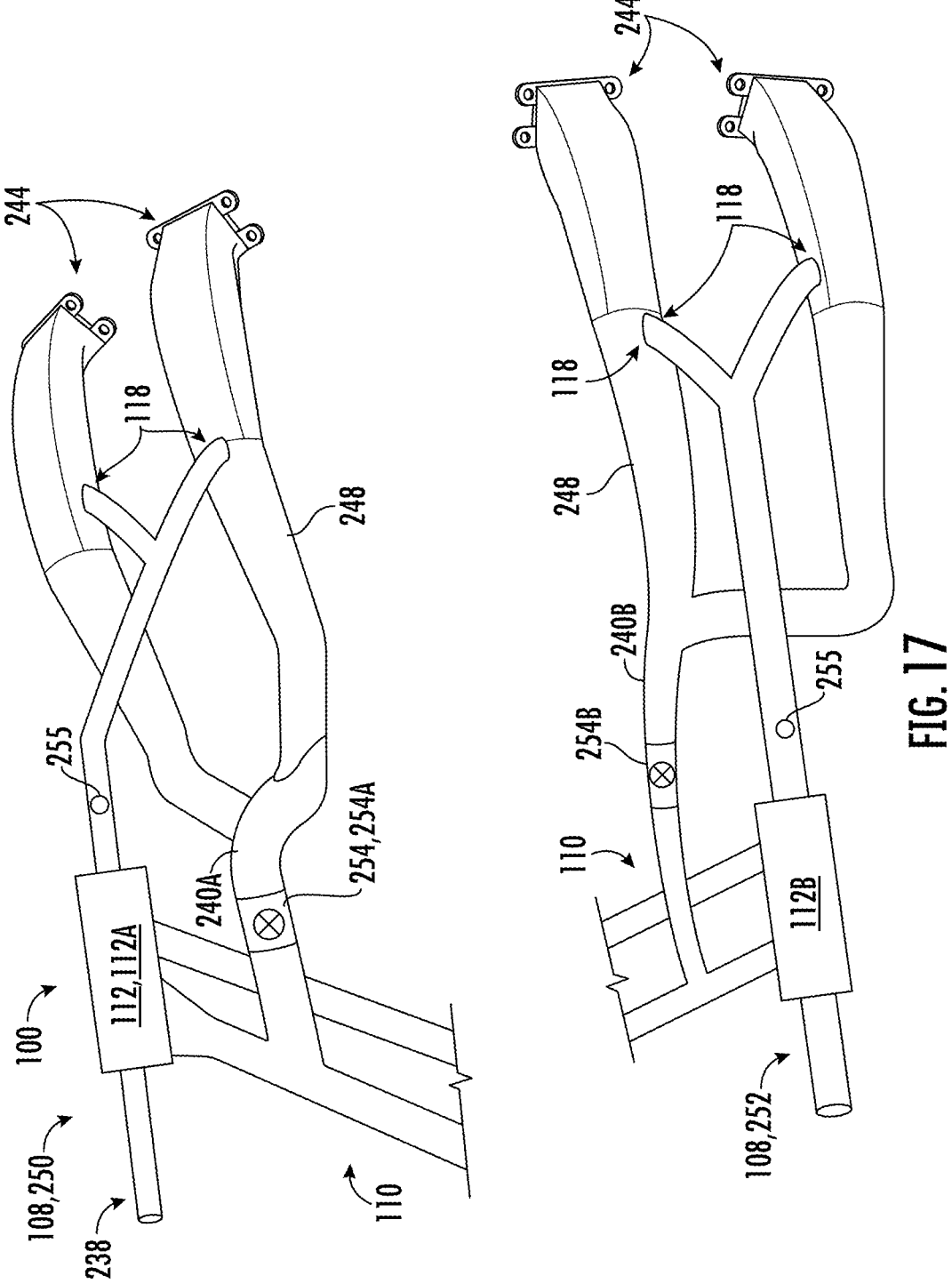
FIG. 17 is schematic view of a CCA system and transient bleed system of FIG. 16 in accordance with an exemplary aspect of the present disclosure.

Briefly, referring now to FIGS. 16 and 17, a gas turbine engine 10 and a CCA system 100 in accordance with another exemplary embodiment of the present disclosure is provided. The gas turbine engine 10 and a CCA system 100 of FIGS. 16 and 17 may be configured in a similar manner as the exemplary gas turbine engine 10 and CCA system of FIGS. 14 and 15. For example, the CCA system 100 of FIGS. 16 and 17 generally includes a cold side bleed assembly 108 and a hot side bleed assembly 110. Further, the exemplary turbomachine 16 of the gas turbine engine 10 depicted further includes a transient bleed assembly 238 including a transient bleed duct 240 extending between an inlet 242 and an outlet 244. The outlet 244 of the transient bleed duct is in fluid communication with the working gas flowpath 37 downstream of the LP turbine 30. However, for the embodiment depicted, inlet 242 of the transient bleed duct is in fluid communication with the hot side bleed assembly 110, and more specifically is in fluid communication with the hot side bleed assembly 110 at a location upstream of the CCA heat exchanger 112. In such a manner, the transient bleed assembly 238 does not need a separate bleed from the working gas flowpath 37, from the compressor discharge cavity 138, or both. Instead, the hot side bleed assembly 110 may extract enough airflow to accomplish the goals of both the CCA system 100 and the transient bleed assembly 238. As will be appreciated, the CCA system 100 and transient bleed assembly 238 generally operate at different operating conditions of the gas turbine engine 10, such that the inlet of the hot side bleed assembly 110 may not need to be increased to be capable of accepting an amount of air equal to a maximum bleed requirement for the hot side bleed assembly 110 and the maximum bleed requirements for the transient bleed assembly 238 (and in some cases may not be capable of accepting said amount of airflow).

Briefly referring specifically to FIG. 17, in the embodiment depicted, the exemplary transient bleed assembly 238 further includes a transient bleed valve 254 operable with the transient bleed duct 240. More specifically, the transient bleed duct 240 includes a first transient bleed duct 240A in fluid communication with a first hot side bleed assembly 110A, and the transient bleed duct 240 further includes a second transient bleed duct 240B in fluid communication with a second hot side bleed assembly 110B (each at a location upstream of a respective CCA heat exchanger 112A, 112B). With such an exemplary embodiment, the transient bleed valve 254 is a first transient bleed valve 254A operable with the first transient bleed duct 240A, and the exemplary transient bleed assembly 238 further includes a second transient bleed valve 254B operable with the second transient bleed duct 240B. The first and second transient bleed valves 254A, 254B may be in operable communication with a controller (see, e.g., the controller 130 in FIG. 2), e.g., to control an amount of bleed airflow through the transient bleed assembly 238.

Notably, as is depicted schematically, the CCA system 100 may further include a check valve 255 in the cold side bleed assembly 108 downstream of the CCA heat exchanger 112 to prevent air from the transient bleed assembly 238 from traveling from the transient bleed duct 240 through the cold side bleed assembly 108 towards the CCA heat exchanger 112.

Although two transient bleed ducts 240A, 240B are shown in FIG. 16, in other embodiments, other configurations may be provided.

Figure 18:
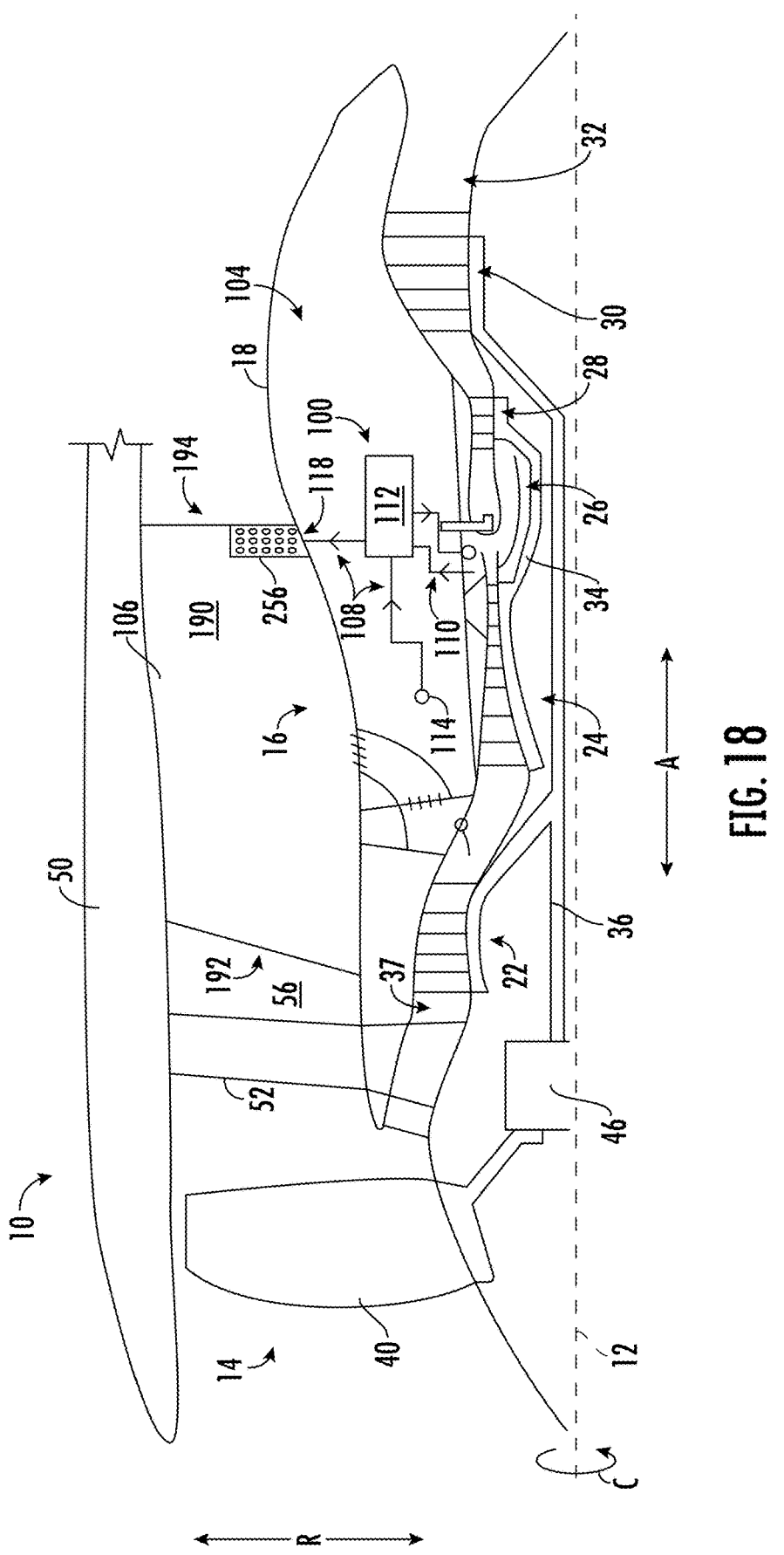
FIG. 18 is a cross-sectional view of a gas turbine engine in accordance with still another exemplary aspect of the present disclosure.

It will be appreciated, however, that in still other exemplary embodiments, the CCA system 100 and gas turbine engine 10 may have still other suitable configurations. For example, referring now to FIG. 18, a gas turbine engine 10 and a CCA system 100 in accordance with another exemplary embodiment of the present disclosure is provided. The exemplary CCA system 100 of FIG. 18 may be configured in a similar manner as exemplary CCA system 100 of FIG. 12. For example, the CCA system 100 of FIG. 18 generally includes a cold side bleed assembly 108 defining an inlet 114 in fluid communication with a cold location of the gas turbine engine 10 and an outlet 118. However, for the embodiment depicted, the outlet 118 of the cold side bleed assembly 108 instead in fluid communication with a passage over the turbomachine 16.

In particular, for the embodiment depicted, the outlet 118 of the cold side bleed assembly 108 is in fluid communication with a bypass passage 56 of the gas turbine engine 10 defined between an outer nacelle 50 of the gas turbine engine 10 and the turbomachine 16 of the gas turbine engine 10. In particular, the gas turbine engine 10 depicted includes a bifurcation connected to the turbomachine 16, and extending between the turbomachine 16 and the outer nacelle 50. The outlet 118 of the cold side bleed assembly 108 is in fluid communication with an opening in a flowpath surface 190 of the bifurcation. More specifically, the bifurcation extends between a leading edge 192 and a trailing edge 194, and the opening in the flowpath surface 190 is positioned at the trailing edge 194 of the bifurcation. More specifically, still, from embodiment depicted, the CCA system 100 includes a diffusion apparatus 256 integrated into the bifurcation at the trailing edge 194 of the bifurcation. The diffusion apparatus 256 defines a plurality of openings (not labeled), and the outlet 118 of the cold side bleed assembly 108 is in fluid communication with the plurality of openings of the diffusion apparatus 256 to allow a cooling airflow 102 through the cold side bleed assembly 108 to effectively merge with an airflow through the bypass passage 56.

It will be appreciated that such configuration may limit an amount of ductwork necessary for the CCA system 100, while further allowing for heated cooling airflow 102 through the cold side bleed assembly 108 to be reintroduced into a flow stream of the gas turbine engine 10 that can create useful work for the gas turbine engine.

As discussed herein above, aspects of the present disclosure relate to a gas turbine engine having a cooled cooling air system for cooling one or more hot components of the gas turbine engine. In particular, the CCA system includes: a cold side bleed assembly defining an inlet in fluid communication with a cold location of the gas turbine engine; a hot side bleed assembly defining an inlet in fluid communication with the working gas flowpath at the compressor discharge cavity (or, e.g., through the compressor section), and a CCA heat exchanger in thermal communication with both the cold side bleed assembly and the hot side bleed assembly to transfer heat to a cooling airflow through the cold side bleed assembly from a cooled airflow through the hot side bleed assembly. The hot side bleed assembly is further in thermal communication with a hot component of the turbomachine to cool the hot component of the turbomachine.

As will further be appreciated, certain embodiments of the CCA system include a first flow control valve to control a flowrate of the cooling airflow through the cold side bleed assembly and a second flow control valve to control a flowrate of the cooled airflow through the hot side bleed assembly. Aspects of the present disclosure discussed hereinbelow provide for a system for modulating the cooling airflow and the cooled airflow in tandem, allowing for more efficient use of the cooling and cooled airflows (e.g., ensuring only the amount of cooling airflow is extracted as is needed to cool the amount of cooled airflow), while also reducing complexity and cost of the system by combining features of the first and second flow control valves.

Figure 19:
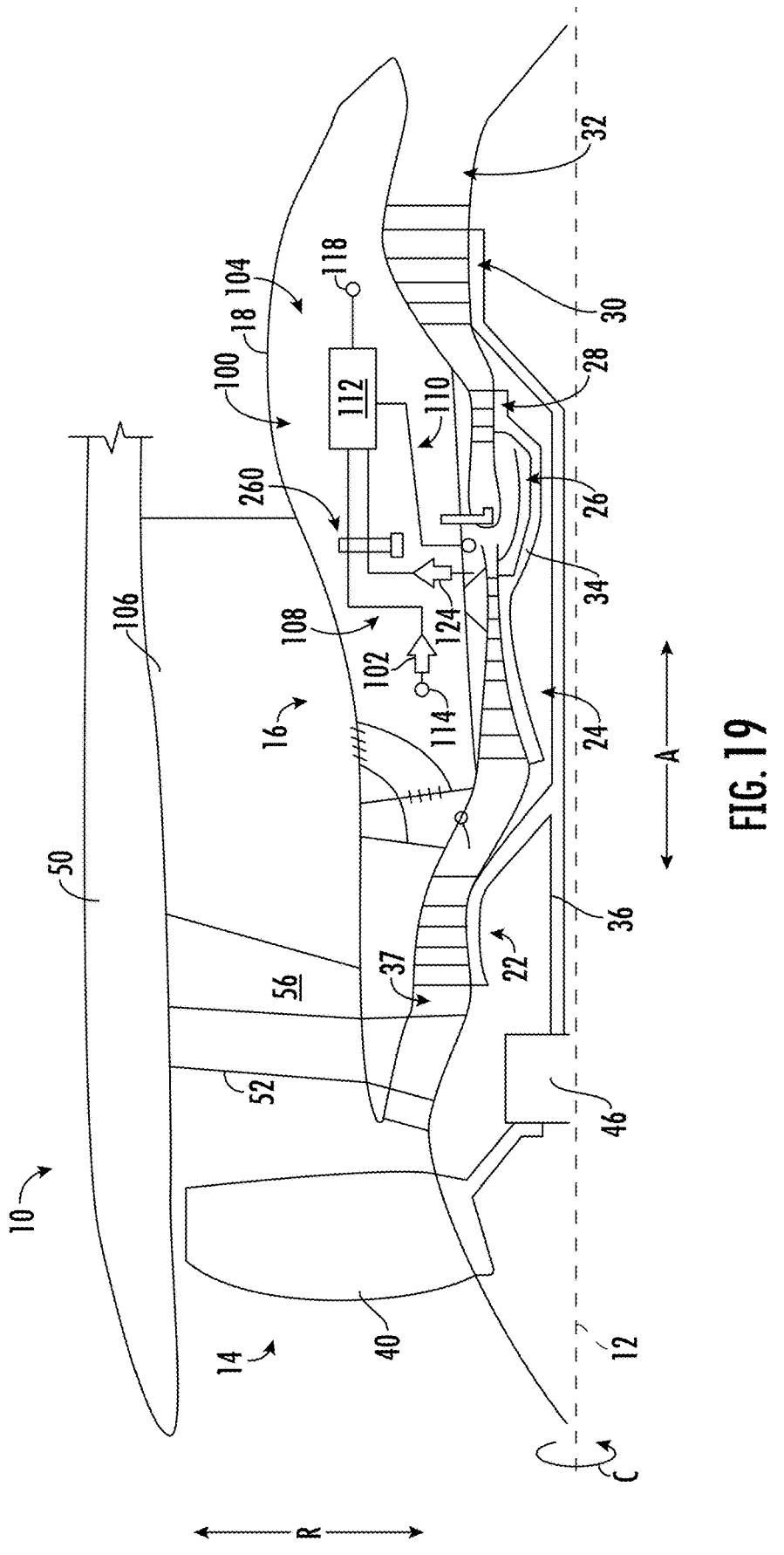
FIG. 19 is a cross-sectional view of a gas turbine engine in accordance with still another exemplary aspect of the present disclosure.

More specifically, referring now to FIG. 19, a schematic, cross-sectional view is provided of a gas turbine engine 10 having a CCA system 100 in accordance with another exemplary embodiment of the present disclosure. The exemplary gas turbine engine 10 and CCA system 100 of FIG. 19 may be configured in a similar manner as one or more of the exemplary gas turbine engines 10 and CCA systems 100 described above with reference to FIGS. 1 through 18.

For example, the exemplary gas turbine engine 10 of FIG. 19 generally includes a fan section 14 and a turbomachine 16, with the turbomachine 16 including a CCA system 100. The CCA system 100 includes a cold side bleed assembly 108 defining an inlet 114 in fluid communication with a cold location of the gas turbine engine 10 and an outlet 118. The hot side bleed assembly 110 defines an inlet 122 in fluid communication with a working gas flowpath 37 through the turbomachine 16, and is further in thermal communication with a hot component of the turbomachine 16 to cool the hot component of the turbomachine 16. During operation, a cooling airflow 102 is provided through the cold side bleed assembly 108 and a cooled airflow 124 is provided through the hot side bleed assembly 110.

However, for the embodiment of FIG. 19, the gas turbine engine 10, and more specifically, the turbomachine 16 of the gas turbine engine 10, includes a valve assembly 260 operable with the cold side bleed assembly 108 and with the hot side bleed assembly 110. The valve assembly 260 is structured to modulate airflows through the cold side bleed assembly 108 and through the hot side bleed assembly 110 in tandem. In particular, the valve assembly 260 is structured to modulate the cooling airflow 102 through the cold side bleed assembly 108 and the cooled airflow 124 through the hot side bleed assembly 110 in tandem.

As used herein, the term "in tandem" with reference to the modulation of two airflows, refers to an arrangement where modulation of one airflow necessarily modulates the other airflow. The relative modulations may be the same (e.g., a 10% increase in one airflow means a 10% increase in the other airflow), or the relative modulations may be different (e.g., a 10% increase in one airflow means a 20% increase in the other airflow).

Figure 20:
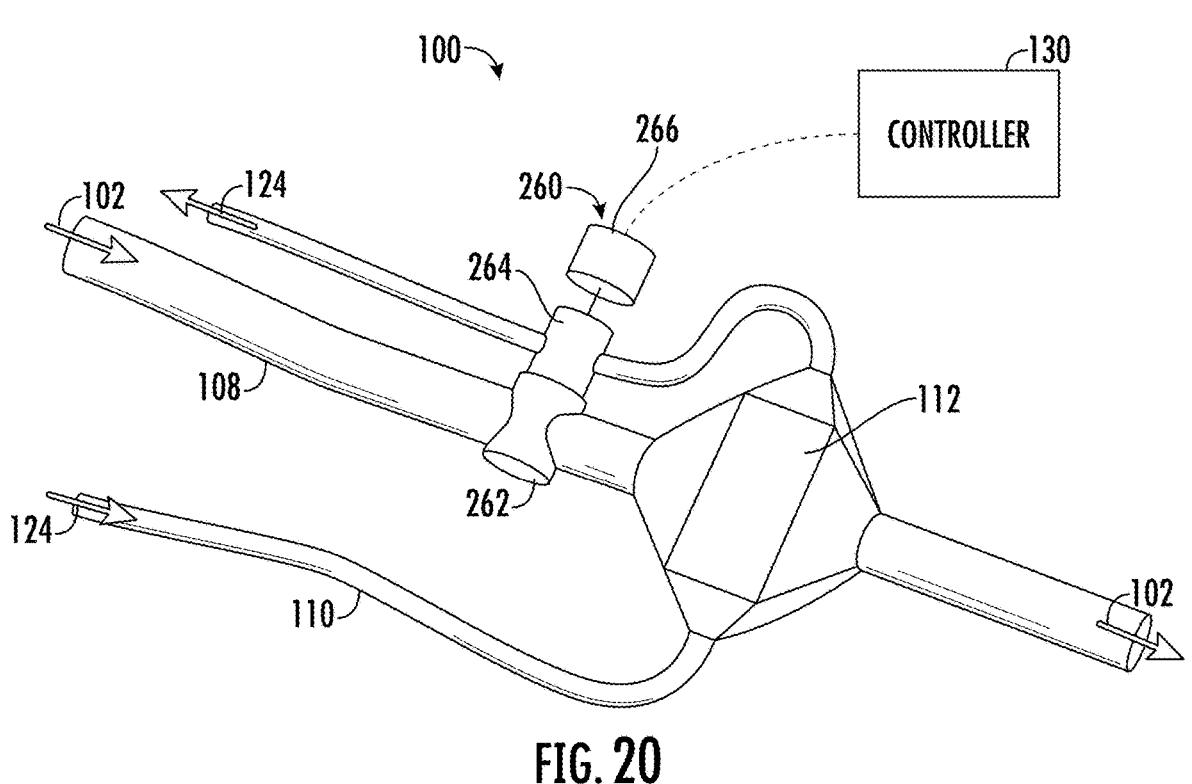
FIG. 20 is a perspective view of a valve assembly for a CCA system in accordance with an exemplary aspect of the present disclosure.

In particular, referring now to FIG. 20, a perspective view is provided of a portion of the CCA system 100 of FIG. 19, showing the exemplary valve assembly 260. As will be appreciated, the valve assembly 260 includes a cold side valve section 262 operable with the cold side bleed assembly 108 and a hot side valve section 264 operable with the hot side bleed assembly 110. Additionally, the valve assembly 260 includes an actuator 266 coupled to both the cold side valve section 262 and the hot side valve section 264. The cold side valve section 262 and the hot side valve section 264 are each operable to vary the cooling airflow 102 and cooled airflow 124, respectively, in response to movement by the actuator 266.

Figure 21:
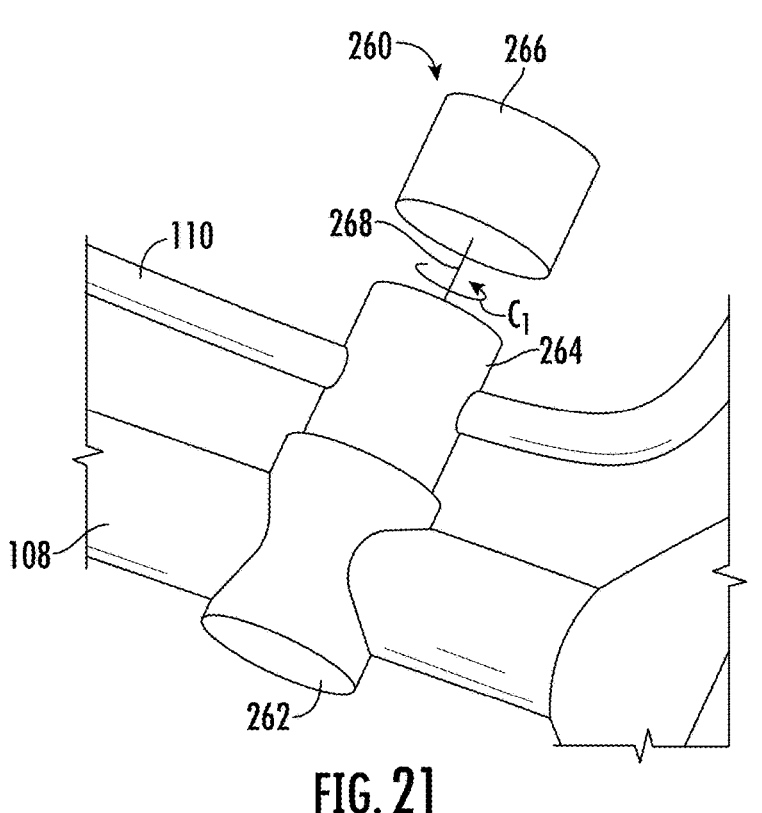
FIG. 21 is a close-up view of the valve assembly of FIG. 20.

More specifically, referring now to FIG. 21, providing a close-up view of the valve assembly 260 of FIG. 20, the valve assembly 260 further includes a shaft 268 movable by the actuator 266. The actuator 266 is coupled to both the cold side valve section 262 and the hot side valve section 264 through the shaft 268. The actuator 266 is, in the embodiment depicted, configured to rotate the shaft 268 in a circumferential direction C1 about an axis of the shaft 268. In such a manner, will be appreciated that the cold side valve section 262 and the hot side valve section 264 are each configured to modulate the cooling airflow 102 and cooled airflow 124, respectively, in response to the circumferential movement of the shaft 268 by the actuator 266.

Figure 22:
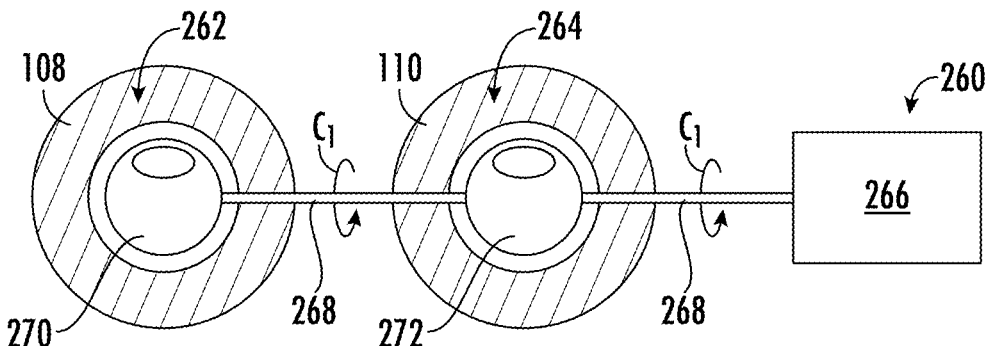
FIG. 22 is a cross-sectional view of the valve assembly of FIG. 20.

More specifically, still, referring now to FIG. 22, a schematic, cross-sectional view is provided of the valve assembly 260 of FIG. 21. It will be appreciated that for the embodiment depicted, the cold side valve section 262 includes a first ball valve portion 270 and the hot side valve section 264 includes a second ball valve portion 272. The first ball valve portion 270 is positioned within the cold side bleed assembly 108, and more specifically, within a duct of the cold side bleed assembly 108, and the second ball valve portion 272 is positioned within the hot side bleed assembly 110, and more specifically, within a duct of the hot side bleed assembly 110. The first ball valve portion 270 and the second ball valve portion 272 are each coupled to the shaft 268, such that rotation of the shaft 268 correspondingly rotates the first ball valve portion 270 and the second ball valve portion 272 in unison, modulating the airflows therethrough in tandem.

In such a manner, it will be appreciated that the valve assembly 260 is configured to modulate the cooling airflow 102 through the cold side bleed assembly 108 and the cooled airflow 124 for the hot side bleed assembly 110 in tandem, such that the amount of cooling airflow 102 provided through the CCA heat exchanger 112 matches an amount of cooling needed for the amount of cooled airflow 124 provided through the CCA heat exchanger 112.

Notably, in the embodiments depicted above with reference to FIGS. 20 and 21, the cold side valve section 262 is located upstream of the CCA heat exchanger 112 (and downstream of the inlet 114 to the cold side bleed assembly 108) and the hot side valve section 264 is located downstream of the CCA heat exchanger 112. In such a manner the hot side valve section 264 may be exposed to lesser temperatures during operation.

It will further be appreciated, that as is depicted in phantom in FIG. 20, the actuator 266 of the valve assembly 260 may be operably coupled to a controller 130 of, e.g., the gas turbine engine 10, such that the actuator 266 may be controlled in response to data received indicative of an operating condition of the gas turbine engine 10, or other suitable parameter. The actuator 266 may be wirelessly coupled, as is shown in phantom in FIG. 20, or alternatively may be operably coupled through a wired connection.

In other exemplary embodiments of the present disclosure, other suitable configurations may be provided. For example, in other embodiments, any other suitable flow control valves may be utilized as the cold side valve section 262, as the hot side valve section 264, or both. For example, in other exemplary embodiments, the valve assembly 260 may utilize one or more butterfly valves, gate valves, globe valves, or the like.

Moreover, although the actuator 266 of the valve assembly 260 described above is a rotary actuator 266, in other exemplary embodiments, the actuator 266 may be a linear actuator 266 operable to move the shaft 268 along the axis of the shaft 268. For example, referring now to FIGS. 23 and 24, perspective views of two additional valve assemblies in accordance with exemplary embodiments of the present disclosure are provided.

Figure 23:
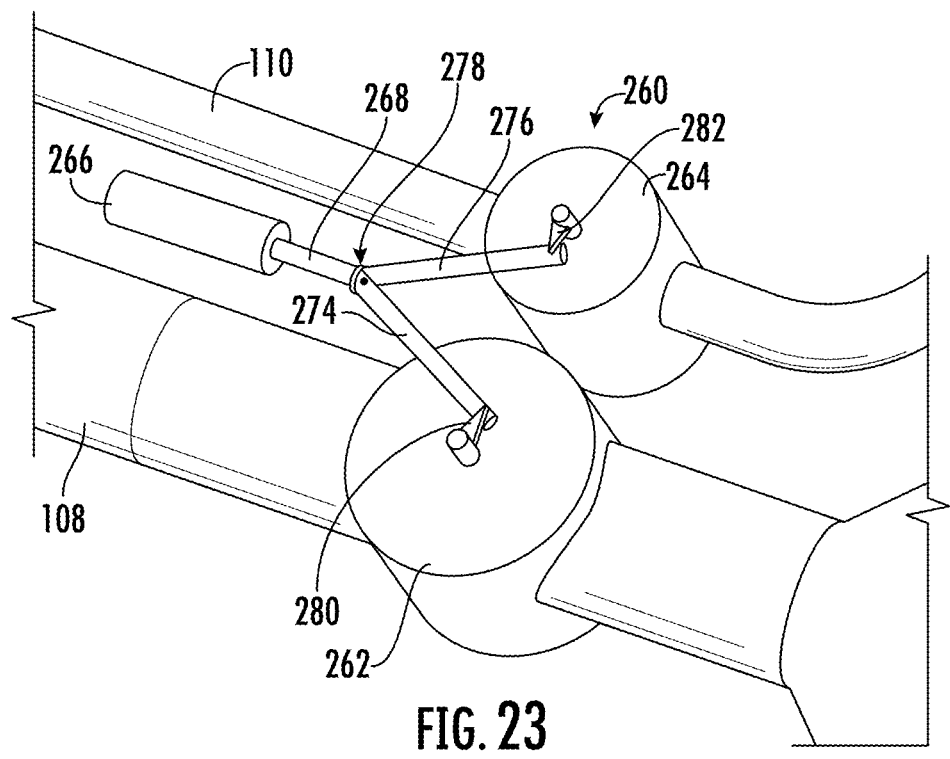
FIG. 23 is a perspective view of a valve assembly for a CCA system in accordance with another exemplary aspect of the present disclosure.
Figure 24:
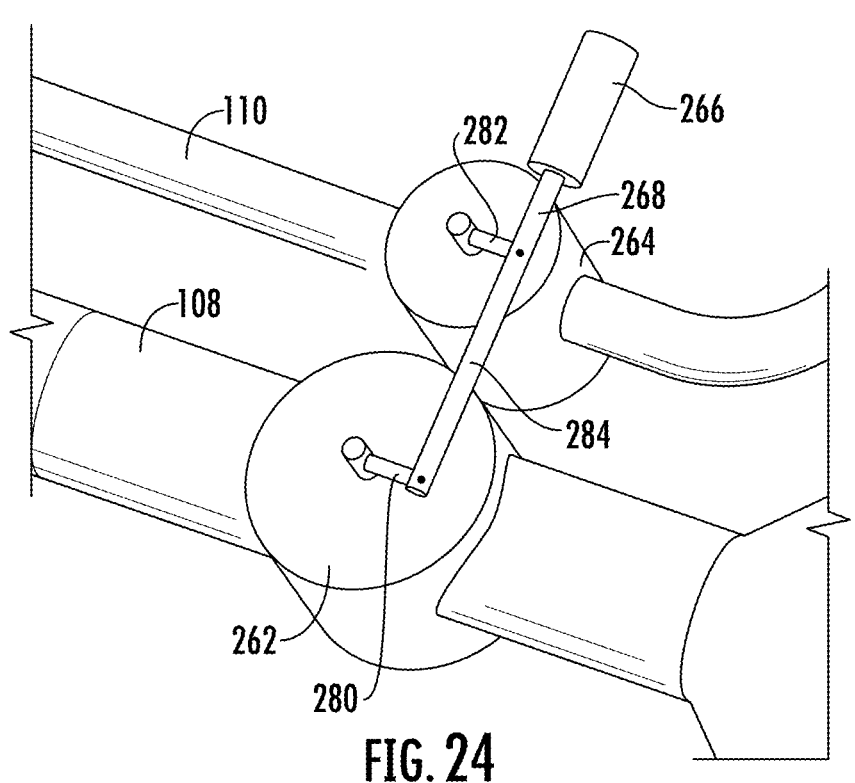
FIG. 24 is a perspective view of a valve assembly for a CCA system in accordance with another exemplary aspect of the present disclosure.

The exemplary valve assemblies of FIGS. 23 and 24 each generally include a cold side valve section 262 operable with a cold side bleed assembly 108 and a hot side valve section 264 operable with a hot side bleed assembly 110. In addition, the valve assembly 260 includes actuator 266 coupled to both the respective cold side valve section 262 and hot side valve section 264 through a respective shaft 268 of the valve assembly 260.

Referring particular to FIG. 23, the valve assembly 260 further includes a first rod 274 and a second rod 276. The actuator 266 is coupled to the shaft 268, and the first rod 274 and second rod 276 are each rotatably coupled to an end of the shaft 268 opposite the actuator 266 at a first connection point 278. The first rod 274 is coupled to the cold side valve section 262 and the second rod 276 is coupled to the hot side valve section 264. The cold side valve section 262 more specifically includes a first lever 280 and the hot side valve section 264 more specifically includes a second lever 282. Movement of the shaft 268 linearly along the axis of the shaft 268 by the actuator 266 moves the first rod 274 and the second rod 276, which in turn, rotates the first lever 280 of the cold side valve section 262 and the second lever 282 of the hot side valve section 264, actuating the cold side valve section 262 and the hot side valve section 264 in tandem.

Similarly, referring now to FIG. 24, the shaft 268 of the valve assembly 260 is coupled to a connector rod 284 of the valve assembly 260, with the connector rod 284 in turn pivotably coupled to a first lever 280 of the cold side valve section 262 and a second lever 282 of the hot side valve section 264. Movement of the connector rod by the shaft 268 and actuator 266 of the valve assembly 260 in FIG. 24 correspondingly actuates the cold side valve section 262 and the hot side valve section 264 in tandem.

Referring now to FIG. 25, a method 300 of operating a valve assembly for a gas turbine engine in accordance with an exemplary aspect of the present disclosure is provided. The method 300 may be utilized with one or more of the exemplary embodiments of FIGS. 19 through 22 discussed above.

The method 300 generally includes at (310) receiving data indicative of an operating condition of the gas turbine engine, and in response to receiving data indicative of the operating condition of the gas turbine engine, at (312) actuating a valve assembly of a cooled cooling air system to modulate a first airflow through a cold side bleed assembly of the cooled cooling air system and a second airflow through a hot side bleed assembly of the cooled cooling air system in tandem.

In certain exemplary aspects, the data indicative of the operating condition may be data indicative of a power level of the gas turbine engine. For example, the data may be indicative of a rotational speed of the gas turbine engine, a fuel flow to the gas turbine engine, a power lever position, or the like.

In certain exemplary aspects, the valve assembly may include a cold side valve section operable with the cold side bleed assembly, a hot side valve section operable the hot side bleed assembly and actuator coupled to both the hot side valve section in the cold side valve section. In such an exemplary aspect, actuating the valve assembly at (312) includes at (314) moving a shaft of the valve assembly with the actuator, the shaft coupled to both the cold side valve section and the hot side valve section.

Moreover, for the exemplary aspect depicted, the method 300 further includes at (320) receiving data indicative of a deterioration parameter of the gas turbine engine, and at (322) actuating the valve assembly in response to receiving the data indicative of the deterioration parameter. For example, the deterioration parameter may be any data indicative of a deterioration level for the gas turbine engine. For example, the data indicative of the deterioration level may be data indicative of an operating life span of the gas turbine engine, a fuel flow rate of the gas turbine engine necessary to achieve a certain power level, or the like.

With such an exemplary aspect, the method 300 may allow for the amount of cooling airflow and cooled airflow to vary based on how deteriorated the engine is, to compensate for such deterioration, while further allowing for greater efficiencies for less deteriorated inches.

As discussed herein above, aspects of the present disclosure relate to a gas turbine engine having a cooled cooling air system for cooling one or more hot components of the gas turbine engine. In particular, the CCA system includes: a cold side bleed assembly defining an inlet in fluid communication with a cold location of the gas turbine engine; a hot side bleed assembly defining an inlet in fluid communication with the working gas flowpath at the compressor discharge cavity (or, e.g., through the compressor section), and a CCA heat exchanger in thermal communication with both the cold side bleed assembly and the hot side bleed assembly to transfer heat to a cooling airflow through the cold side bleed assembly from a cooled airflow through the hot side bleed assembly. The hot side bleed assembly is further in thermal communication with a hot component of the turbomachine to cool the hot component of the turbomachine.

As will further be appreciated, it is useful to include an active clearance control (ACC) system within a turbine section of the gas turbine engine to maintain a desired clearance between turbine rotor blades and an outer casing of a turbine of the turbine section. ACC systems can operate by providing an airflow onto the outer casing of the turbine to control a thermal growth of the outer casing relative tot eh turbine rotor blades.

Certain ACC systems use a low pressure airflow, such as a bypass airflow given the relatively low temperature of the airflow. However, depending on, e.g., how complex the ACC system is, a higher pressure airflow may be needed to drive the airflow through a manifold of the ACC system. Accordingly, a blower (e.g., a pump) may be provided to urge the airflow through the ACC system.

Surprisingly, the inventors of the present disclosure found that by pressurizing the low pressure air for the ACC system, the same airflow (or rather a portion of the same airflow) could also be used as an airflow source for the CCA system. In particular, the inventors found that by including such a blower with the CCA system, a sufficient amount of pressurized air may be generated from the low pressure air source for both the CCA system and ACC system.

Such an arrangement can allow for greater overall engine efficiency by reducing or eliminating the extraction of airflow from a working gas flowpath of the engine downstream of one or more compression stages.

Figure 26:
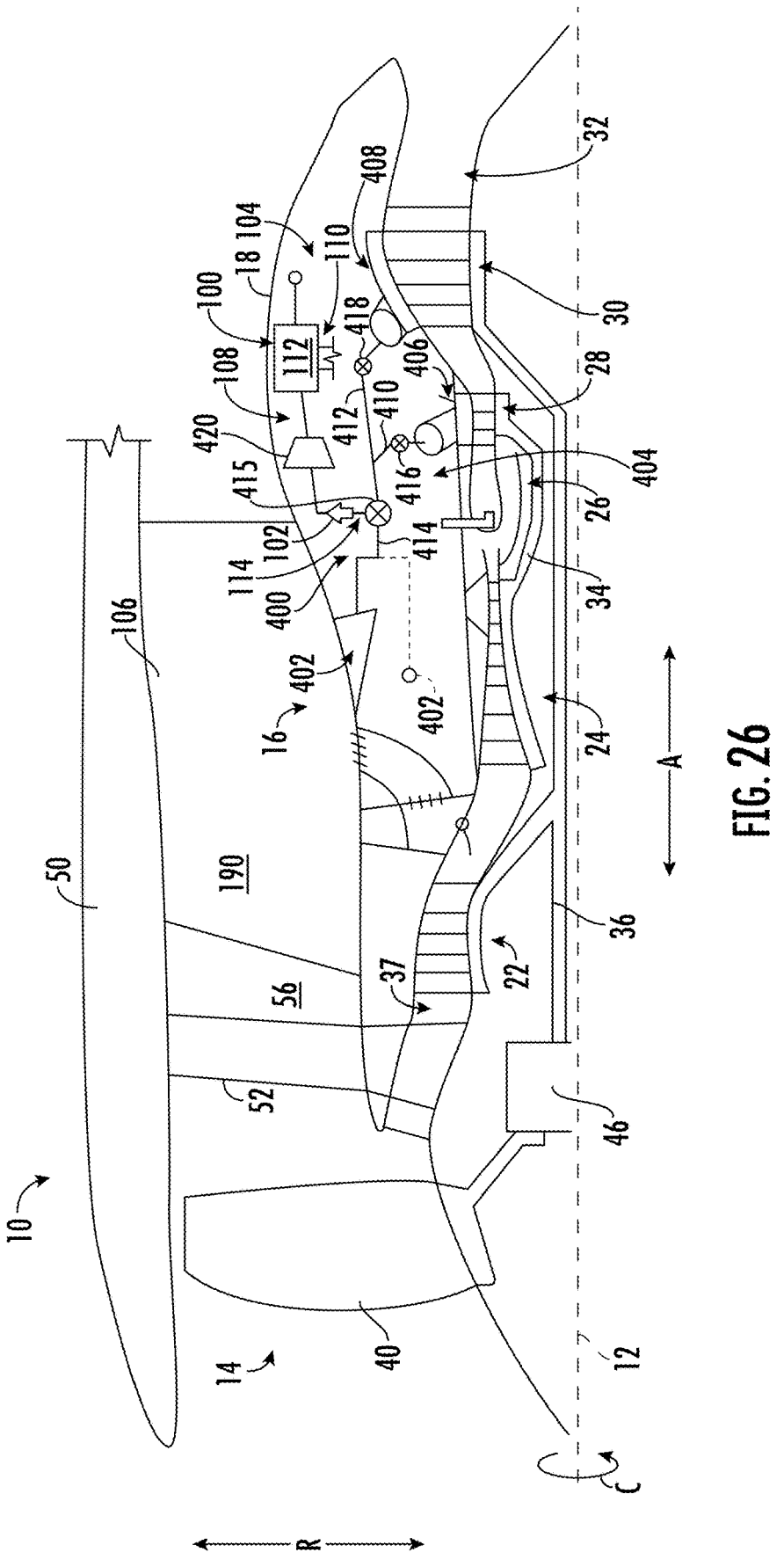
FIG. 26 is a cross-sectional view of a gas turbine engine in accordance with still another exemplary aspect of the present disclosure.

In particular, referring now to FIG. 26, a schematic, cross-sectional view is provided of a gas turbine engine 10 having a CCA system 100 in accordance with another exemplary embodiment of the present disclosure. The exemplary gas turbine engine 10 and CCA system 100 of FIG. 26 may be configured in a similar manner as one or more of the exemplary gas turbine engines 10 and CCA systems 100 described above with reference to FIGS. 1 through 25.

For example, the exemplary gas turbine engine 10 of FIG. 26 generally includes a fan section 14 and a turbomachine 16, with the turbomachine 16 including a compressor section, a combustion section 26, and a turbine section collectively defining at least in part a working gas flowpath 37. The turbine section includes a first turbine and a second turbine, and more specifically includes an LP turbine 30 and an HP turbine 28. The turbomachine 16 further includes a CCA system 100. The CCA system 100 includes a cold side bleed assembly 108 defining an inlet 114 in fluid communication with a cold location of the gas turbine engine 10 and an outlet 118. The hot side bleed assembly 110 defines an inlet 122 in fluid communication with the working gas flowpath 37 through the turbomachine 16, and is further in thermal communication with a hot component of the turbomachine 16 to cool the hot component of the turbomachine 16. During operation, a cooling airflow 102 is provided through the cold side bleed assembly 108 and a cooled airflow 124 is provided through the hot side bleed assembly 110. Further, the CCA system 100 includes a CCA heat exchanger 112 in thermal communication with the cold side bleed assembly 108 and the hot side bleed assembly 110, and more specifically in thermal communication with the cooling airflow 102 through the cold side bleed assembly 108 and the cooled airflow 124 through the hot side bleed assembly 110.

Further, for the embodiment of FIG. 26, the gas turbine engine 10, and more specifically, the turbomachine 16 of the gas turbine engine 10 includes an active clearance control (ACC) system 400. The ACC system 400 includes an inlet 402, a heat transfer assembly arranged around a turbine of the turbine section, and an ACC duct assembly 404 extending from the inlet 402 to the heat transfer assembly.

In particular, for the embodiment depicted, the turbine is the first turbine, or rather the HP turbine 28, of the turbine section, and the turbine section further includes a second turbine, or rather the LP turbine 30. With this example embodiment, the heat transfer assembly is a first heat transfer assembly 406 and the ACC system 400 further includes a second heat transfer assembly 408 arranged around the LP turbine 30. The ACC duct assembly 404 extends to both the first heat transfer assembly 406 and the second heat transfer assembly 408. In particular, for the embodiment shown, the ACC duct assembly 404 includes a first portion 410 that extends to the first heat transfer assembly 406, a second portion 412 that extends to the second heat transfer assembly 408, and an upstream portion 414 that extends from the inlet 402 of the ACC system 400 to both the first portion 410 and the second portion 412.

Referring still to the embodiment of FIG. 26, it will be appreciated that the inlet 402 of the ACC duct assembly 404 is in fluid communication with a bypass passage 56 defined over the turbomachine 16. In particular, the exemplary gas turbine engine 10 of FIG. 26 includes an outer nacelle 50 and defines the bypass passage 56 between the outer nacelle 50 and an outer cowl 18 of the turbomachine 16. The inlet 402 to the ACC system 400 is defined in the outer cowl 18, such that the ACC system 400, and more specifically, the ACC duct assembly 404, receives an airflow from the bypass passage 56 through the inlet 402 to the ACC system 400 during operation.

Notably, in other exemplary embodiments, the inlet 402 to the ACC system 400 may be at any other suitable location to receive airflow from, e.g., a cold location of the gas turbine engine 10. For example, in other exemplary embodiments, the inlet 402 may be configured to receive an airflow through the working gas flowpath 37 of the gas turbine engine 10 at a location through an LP compressor 22 of the compressor section, between the LP compressor 22 and an HP compressor 24 the compressor section, or both. Additionally, or alternatively, the inlet 402 may be positioned on a flowpath surface 190 of a bifurcation of the gas turbine engine 10.

Moreover, for the exemplary embodiment of FIG. 26, the inlet 114 to the cold side bleed assembly 108 of the CCA system 100 is in fluid communication with the ACC duct assembly 404. In such a manner, the CCA system 100 may integrate with the ACC system 400, reducing ductwork and complexity of the gas turbine engine 10.

For the embodiment depicted, the CCA system 100 includes a flow control valve 415. More specifically, the CCA system 100 includes the flow control valve 415 at the inlet 114 to the cold side bleed assembly 108, positioned within the ACC duct assembly 404, such that the inlet 114 of the cold side bleed assembly 108 is in fluid communication with the upstream portion 414 of the ACC duct assembly 404 through the flow control valve 415. The flow control valve 415 is more specifically a variable control valve of the CCA system 100 (e.g., operable to vary a flowrate to the various outlets).

Briefly, it will be appreciated that for the embodiment depicted, the ACC system 400 includes one or more flow control valves operable with the first portion 410 of the ACC the second portion 412 of the ACC duct assembly 404, or both. More specifically, the ACC system 400 includes a first flow control valve 416 operable with the first portion 410 of the ACC duct assembly 404, and a second flow control valve 418 operable with the second portion 412 of the ACC duct assembly 404. The first flow control valve 416, second flow control valve 418, and flow control valve 415 may each be operably connected to a controller (such as the exemplary controller 130 of FIG. 2) for controlling operation of the respective valve and an airflow through the respective duct.

Further, referring still to FIG. 26, the exemplary CCA system 100 additionally includes a blower 420 in fluid communication with the cold side bleed assembly 108 for urging a cooling airflow 102 through the cold side bleed assembly 108. As will be appreciated, the cooling airflow 102 received from the ACC system 400, which in turn, is received from the bypass passage 56, may be a relatively low pressure airflow. The blower 420 may increase a pressure of the cooling airflow 102 to allow for desired operation of the CCA system 100.

It will be appreciated, however, that in other exemplary embodiment, other suitable configurations may be provided. For example, referring now to FIGS. 27 and 28, schematic views of gas turbine engines 10 in accordance with additional exemplary embodiments of the present disclosure are provided. The exemplary gas turbine engines 10 of FIGS. 27 and 28 may be configured in a similar manner as exemplary gas turbine engine 10 of FIG. 26.

For example, the exemplary gas turbine engines 10 each generally include a turbomachine 16 having an ACC system 400 and a CCA system 100. The ACC system 400 of each gas turbine engine 10 generally includes an inlet 402, a first heat transfer assembly 406 arranged around an HP turbine 28 of a turbine section of the respective turbomachine 16, a second heat transfer assembly 408 arranged around an LP turbine 30 of the turbine section of the respective turbomachine 16, and an ACC duct assembly 404 extending from the inlet 402 to the first heat transfer assembly 406 and to the second transfer assembly. The ACC duct assembly 404 of each ACC system 400 includes an upstream portion 414, a first portion 410, and a second portion 412.

Further, the CCA system 100 of each turbomachine 16 generally includes a cold side bleed assembly 108, a hot side bleed assembly 110, and a CCA heat exchanger 112 in thermal communication with both the hot side bleed assembly 110 and the cold side bleed assembly 108. The cold side bleed assembly 108 defines an inlet 114 in fluid communication with the ACC duct assembly 404.

Figure 27:
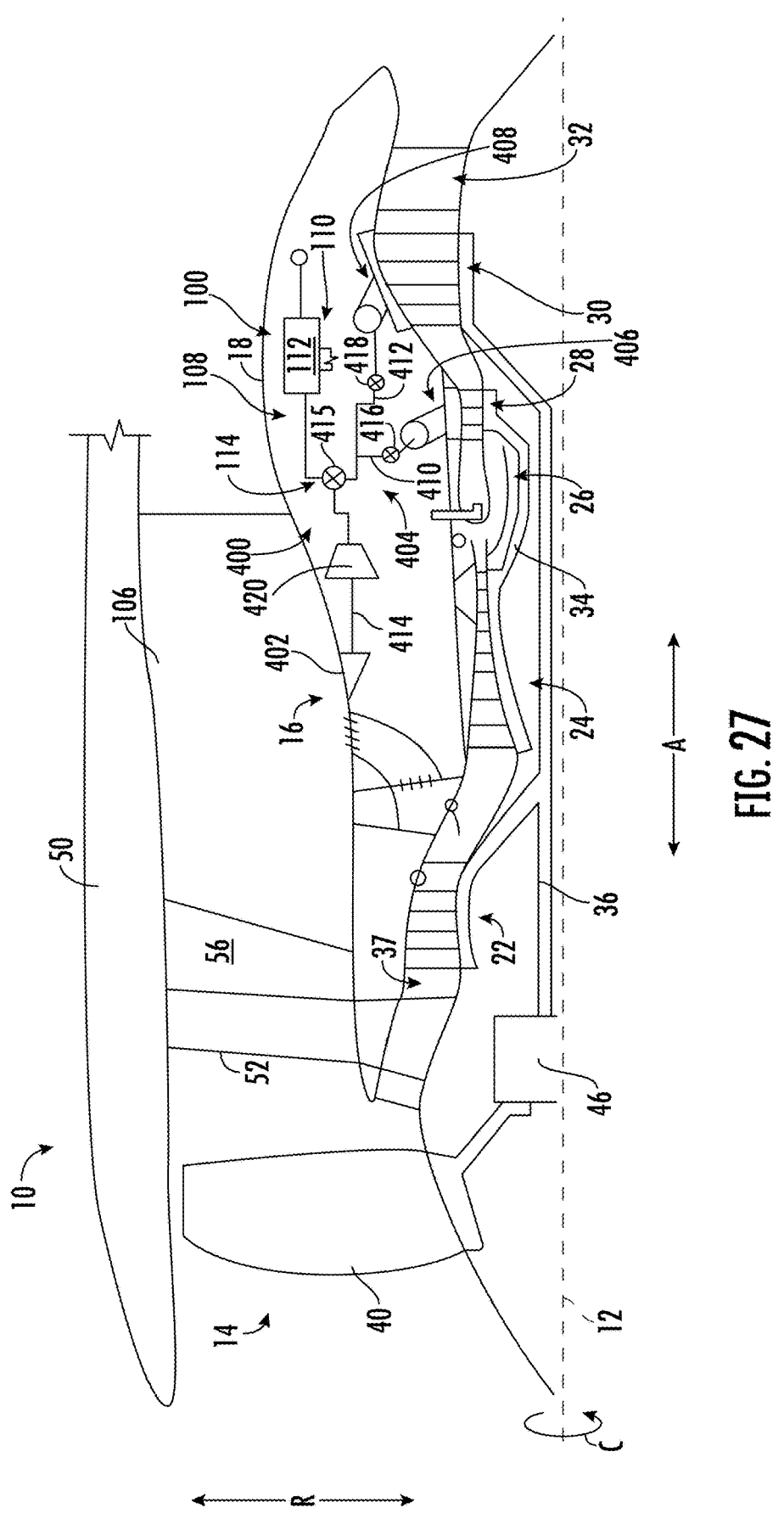
FIG. 27 is a cross-sectional view of a gas turbine engine in accordance with still another exemplary aspect of the present disclosure.

Referring particular to FIG. 27, for the exemplary turbomachine 16 depicted, the CCA system 100 does not include a separate blower in fluid communication with the cold side bleed assembly 108 (see blower 420 in FIG. 26). Instead, for the embodiment depicted, the ACC system 400 includes a blower 420 in fluid communication with the ACC duct assembly 404 for increasing a pressure through the ACC duct assembly 404. With such a configuration, the inlet 114 of the cold side bleed assembly 108 is in fluid communication with the ACC duct assembly 404 at a location downstream of the blower 420. More specifically, for the embodiment depicted, the blower 420 of the ACC system 400 is in fluid communication with the upstream portion 414 of the ACC duct assembly 404, and the inlet 114 is also in fluid communication with the upstream portion 414 of the ACC duct assembly 404. In such a manner, the blower 420 may increase a pressure of the airflow provided through the first portion 410 of the ACC duct assembly 404 to the first heat transfer assembly 406, through the second portion 412 of the ACC duct assembly 404 to the second heat transfer assembly 408, and to/through the CCA system 100.

Referring particularly to FIG. 28, again the CCA system 100 does not include a blower, and instead the ACC system 400 includes a blower 420. However, for the embodiment depicted, the blower 420 of the ACC system 400 is located in the second portion 412 of the ACC duct assembly 404. With such a configuration, the inlet 114 to the cold side bleed assembly 108 of the CCA system 100 is in fluid communication with the second portion 412 of the ACC duct assembly 404 at a location downstream of the blower 420. In such a manner, the blower 420 may increase a pressure of an airflow provided through the second portion 412 of the ACC system 400 to the second heat transfer assembly 408 (e.g., urging the airflow through the second portion 412) and a portion of the airflow provided through the CCA system 100 as a cooling airflow 102 (received from the second portion 412 of the ACC duct assembly 404; not shown in FIG. 28).

Figure 28:
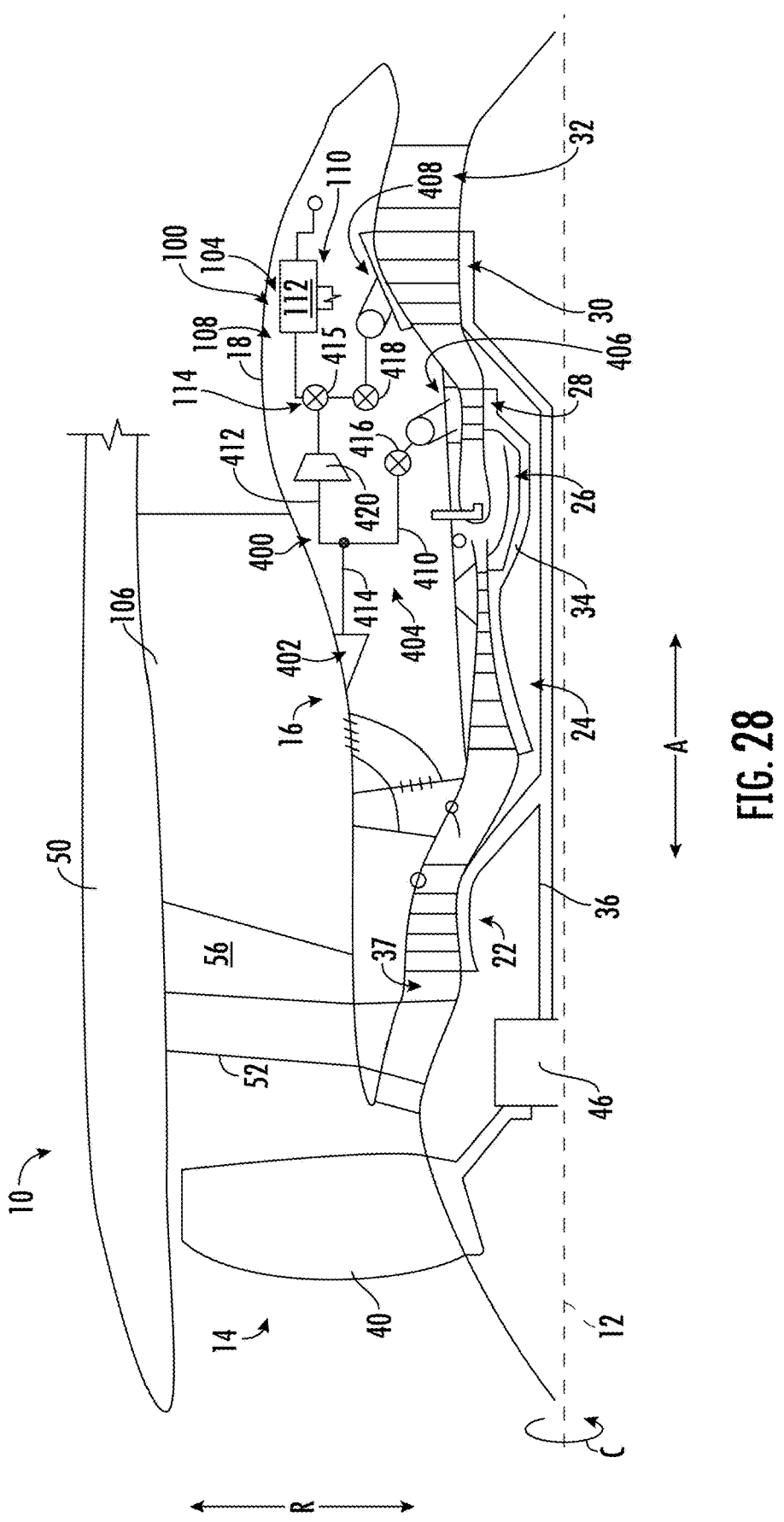
FIG. 28 is a cross-sectional view of a gas turbine engine in accordance with still another exemplary aspect of the present disclosure.
Figure 29:
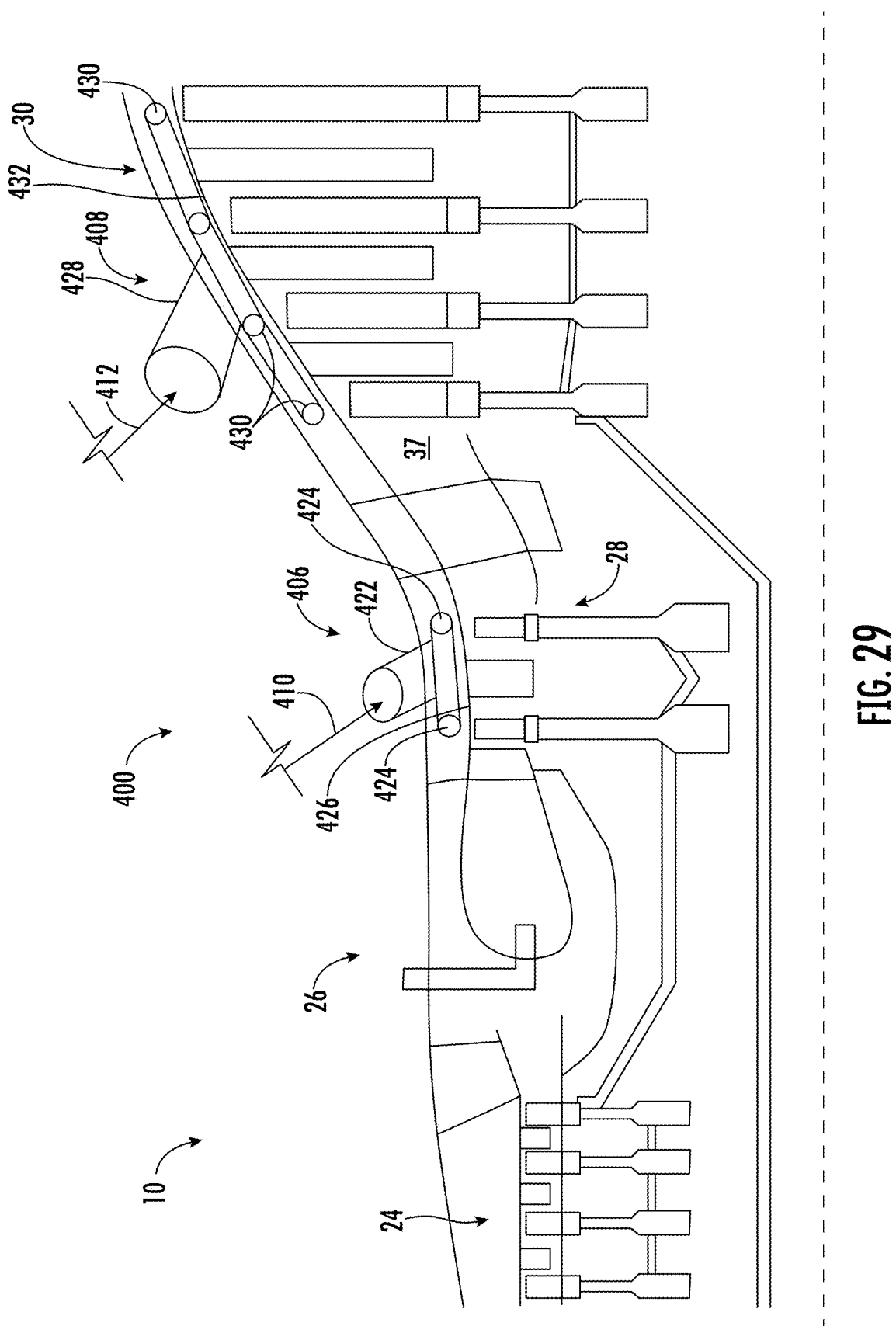
FIG. 29 is a close up view of the exemplary gas turbine engine of FIG. 28.

Briefly, referring now to FIG. 29, a close-up view of the first heat transfer assembly 406 and the second transfer assembly of the ACC system 400 of FIG. 28 is provided. Referring particularly to the first heat transfer assembly 406, the first heat transfer assembly 406 includes a first manifold 422 and a first plurality of circumferential airflow extensions 424. Notably, the HP turbine 28 includes an outer case 426 enclosing a plurality of stages of HP turbine rotor blades of the HP turbine 28, and more specifically, enclosing two stages of HP turbine rotor blades of the HP turbine 28. The first plurality of circumferential airflow extensions 424 includes two circumferential airflow extensions 424 extending circumferentially around the outer case 426 of the HP turbine 28. The two circumferential airflow extensions 424 are configured to blow an airflow onto the outer case 426 to control a thermal growth of the outer case 426 and maintain a clearance between the plurality of stages of HP turbine rotor blades and the outer case 426.

Referring particular to the second heat transfer assembly 408, the second heat transfer assembly 408 includes a second manifold 428 and a second plurality of circumferential airflow extensions 430. The LP turbine 30 further includes an outer case 432 enclosing a plurality of stages of LP turbine rotor blades of the LP turbine 30, and more specifically enclosing four stages of LP turbine rotor blades. The second plurality of circumferential airflow extensions 430 includes four circumferential airflow extensions 430 extending circumferentially around the outer case 432 of the LP turbine 30. Each of the second plurality of circumferential airflow extensions 430 is configured to blow an airflow onto the outer case 432 to control a thermal growth of the outer case 432 and maintain a clearance between the plurality of stages of LP turbine rotor blades and the outer case 432.

Notably, given the increased number of stages within the LP turbine 30 as compared to the HP turbine 28, and the corresponding increased number of circumferential airflow extensions 424, 430 in the second heat transfer assembly 408 compared to the first heat transfer assembly 406, an increased airflow and/or increased pressure of the airflow may be required for desired operation within the second heat transfer assembly 408 compared to the first heat transfer assembly 406. Further, the effectiveness of the ACC system 400 depends on using high pressure air to impinge on the outer cases 426, 432 to achieve the largest heat transfer rate. The first heat transfer assembly 406 for the HP turbine 28 may generally include larger diameter pipes (e.g., the circumferential airflow extensions 424, the first manifold 422) so little flow pressure is lost in delivering the cooling air to the impingement baffles/extensions 424. By contrast, the second heat transfer assembly 408 for the LP turbine 30 may generally include smaller diameter pipes due to a desire to distribute the flow to more spatial locations as well as to reduce engine core cowling size, which reduces the cooling air pressure at the impingement baffles/extensions 430. Boosting the pressure to the second heat transfer assembly 408 for the LP turbine 30 can therefore improve its cooling effectiveness.

In such a manner, it will be appreciated that including the blower 420 in fluid communication with the second portion 412 of the ACC duct assembly 404 (and not the first portion 410 of the ACC duct assembly 404) may facilitate the desired pressure through the second portion 412 of the ACC duct assembly 404 to achieve the desired operation.

Figure 30:
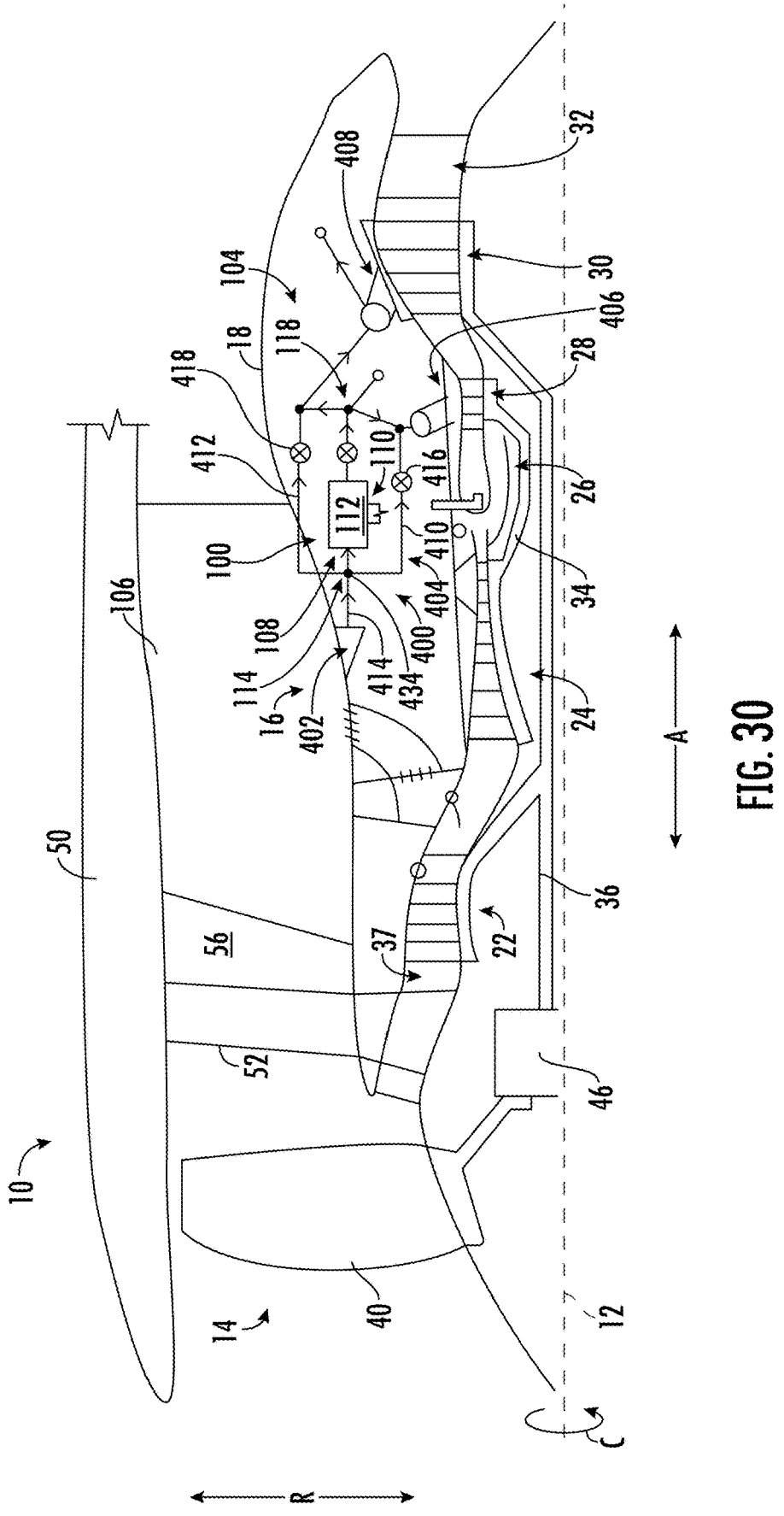
FIG. 30 is a cross-sectional view of a gas turbine engine in accordance with still another exemplary aspect of the present disclosure.

Referring now to FIG. 30, a gas turbine engine 10 in accordance with yet another exemplary embodiment of the present disclosure is provided. The exemplary gas turbine engine 10 of FIG. 30 may be configured in a similar manner as one or more of the exemplary gas turbine engines 10 described above with reference to FIGS. 26 through 29. For example, the exemplary gas turbine engine 10 of FIG. 30 includes an ACC system 400 and a CCA system 100. The ACC system 400 generally includes an inlet 402, a first heat transfer assembly 406, a second heat transfer assembly 408, and an ACC duct assembly 404 extending from the inlet 402 to the first heat transfer assembly 406 and to the second heat transfer assembly 408. In particular, the ACC duct assembly 404 includes an upstream portion 414, a first portion 410 extending from the upstream portion 414 to the first heat transfer assembly 406, and a second portion 412 extending from the upstream portion 414 to the second heat transfer assembly 408. The first portion 410, the second portion 412, and the upstream portion 414 of the ACC duct assembly 404 meet at a juncture 434. For the embodiment shown, the CCA system 100 includes a hot side bleed assembly 110, a cold side bleed assembly 108, and a CCA heat exchanger 112 in thermal communication with both the hot side bleed assembly 110 and the cold side bleed assembly 108. The cold side bleed assembly 108 defines an inlet 114 in fluid communication with the ACC duct assembly 404. In particular, for the embodiment shown, the inlet 114 to the cold side bleed assembly 108 is in fluid communication with the ACC duct assembly 404 at the juncture 434. The cold side bleed assembly 108 further defines an outlet 118. For the embodiment shown, the outlet 118 is selectively in fluid communication with the ACC duct assembly 404 at a location upstream of the first heat transfer assembly 406, at a location upstream of the second heat transfer assembly 408, or both. In particular, for the embodiment shown, the outlet 118 of the cold side bleed assembly 108 is selectively in fluid communication with the first portion 410 of the ACC duct assembly 404 at a location downstream of the juncture 434 and upstream of the first heat transfer assembly 406 and is selectively in fluid communication with the second portion 412 of the ACC duct assembly 404 at a location downstream of the juncture 434 and upstream of the second heat transfer assembly 408.

It will be appreciated that with such a configuration, the CCA system 100, and more specifically, the cold side bleed assembly 108 of the CCA system 100, may provide a relatively hot airflow to the first heat transfer assembly 406, to the second transfer assembly, or both. Such an arrangement may allow for the ACC system 400 to both slow a thermal growth of an outer case 432 surrounding the LP turbine 30 (see FIG. 29), an outer case 426 surrounding the HP turbine 28 (see FIG. 29), or both, or alternatively may increase a thermal growth of the outer case 432, 426 by providing hot air from the cold side bleed assembly 108 of the CCA system 100. Such a configuration may provide greater flexibility in control of the gas turbine engine 10.

As discussed herein above, aspects of the present disclosure relate to a gas turbine engine having a cooled cooling air system for cooling one or more hot components of the gas turbine engine. In particular, the CCA system includes: a cold side bleed assembly defining an inlet in fluid communication with a cold location of the gas turbine engine; a hot side bleed assembly defining an inlet in fluid communication with the working gas flowpath at the compressor discharge cavity (or, e.g., through the compressor section), and a CCA heat exchanger in thermal communication with both the cold side bleed assembly and the hot side bleed assembly to transfer heat to a cooling airflow through the cold side bleed assembly from a cooled airflow through the hot side bleed assembly. The hot side bleed assembly is further in thermal communication with a hot component of the turbomachine to cool the hot component of the turbomachine.

As will further be appreciated, during engine operation, both fuel and compressed air flow through fuel nozzles of a combustion section of the gas turbine engine, and the fuel nozzles are bathed in an external flow of relatively cool compressor discharge air. These flows carry away heat from the fuel nozzles, keeping fuel temperatures relatively low. However, when engine operation stops, a volume of fuel will continue to reside in the fuel nozzles and can be heated to coking temperatures. Small amounts of coke interfering with fuel flow through these orifices can make a large difference in fuel nozzle performance. Further, when the engine operation stops, heat within the combustion section, and, e.g., a downstream end of a compressor section and upstream end of a turbine section, tends to rise, creating a thermal mismatch along a vertical direction. Such can create a bowing of one or more rotors of the gas turbine engine (a rotor bow condition).

Inclusion of an air cooling system known as a reverse bleed system (also referred to herein as RBS) may be configured to reduce or minimize a coke formation within, e.g., fuel nozzles of the gas turbine engine, and may further be configured to reduce or minimize the rotor bow condition within the engine. The reverse bleed system generally includes a reverse bleed duct extending from a cold location to a hot location (such as a compressor discharge cavity), and a blower operable during a shutdown operating condition of the gas turbine engine to circulate airflow through a working gas flowpath of the gas turbine engine and reduce, e.g., the rotor bow condition.

The inventors of the present disclosure surprisingly found that the blower for the reverse bleed system could provide sufficient pressurization of a low pressure airflow to utilize the low pressure airflow for the CCA system during a non-shutdown operating condition of the gas turbine engine. Such an arrangement can allow for greater overall engine efficiency by reducing or eliminating the extraction of airflow from a working gas flowpath of the engine downstream of one or more compression stages, and by utilizing components that would otherwise be unused during the non-shutdown operating condition of the gas turbine engine.

Figure 31:
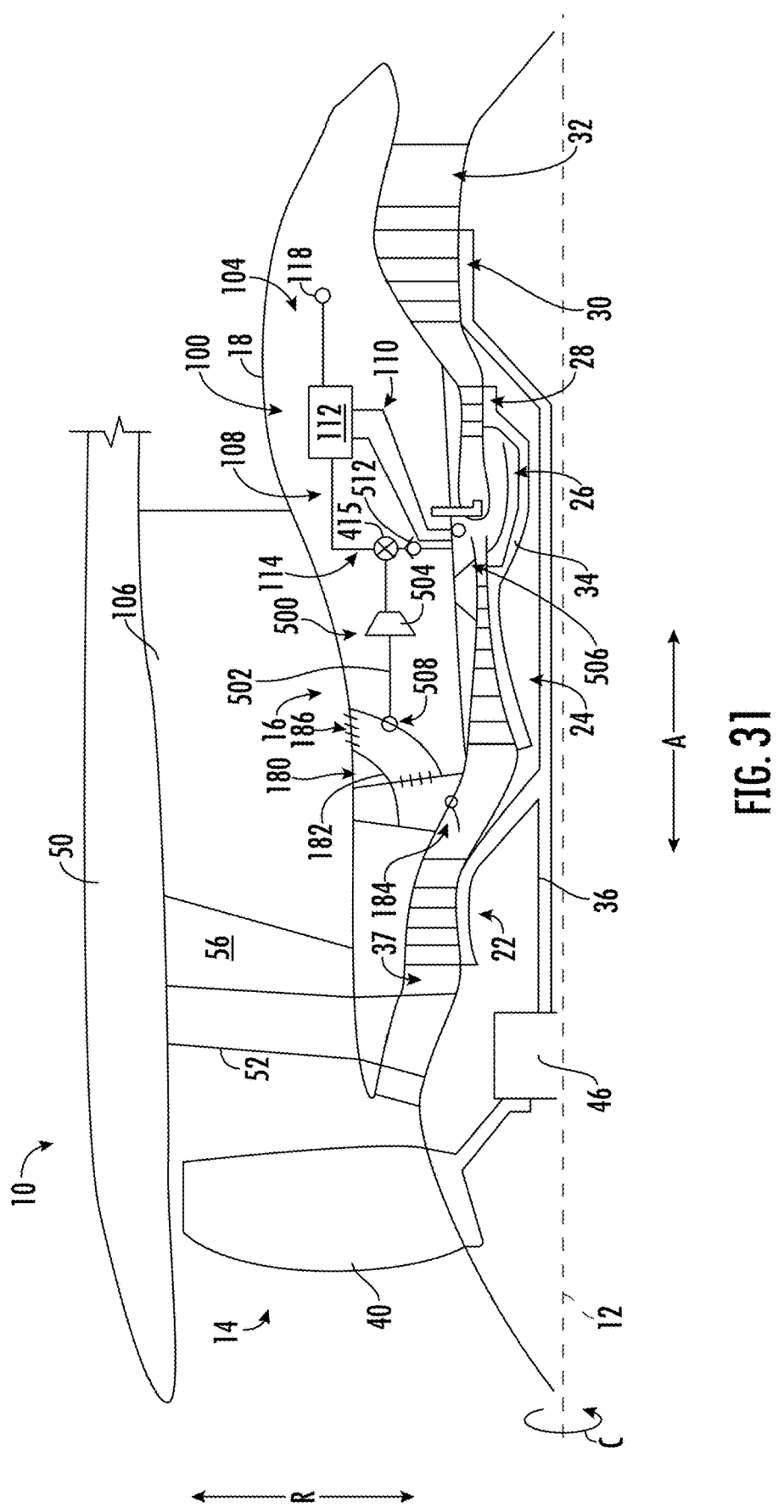
FIG. 31 is a cross-sectional view of a gas turbine engine in accordance with still another exemplary aspect of the present disclosure.

In particular, referring now to FIG. 31, a schematic, cross-sectional view is provided of a gas turbine engine 10 having a CCA system 100 in accordance with another exemplary embodiment of the present disclosure. The exemplary gas turbine engine 10 and CCA system 100 of FIG. 31 may be configured in a similar manner as one or more of the exemplary gas turbine engines 10 and CCA systems 100 described above with reference to FIGS. 1 through 30.

For example, the exemplary gas turbine engine 10 of FIG. 31 generally includes a fan section 14 and a turbomachine 16, with the turbomachine 16 including a compressor section, a combustion section 26, and a turbine section collectively defining at least in part a working gas flowpath 37. The CCA system 100 includes a cold side bleed assembly 108 defining an inlet 114 and an outlet 118. The hot side bleed assembly 110 defines an inlet 122 in fluid communication with the working gas flowpath 37 through the turbomachine 16, and is further in thermal communication with a hot component of the turbomachine 16 to cool the hot component of the turbomachine 16. During operation, a cooling airflow 102 is provided through the cold side bleed assembly 108 and a cooled airflow 124 is provided through the hot side bleed assembly 110. Further, the CCA system 100 includes a CCA heat exchanger 112 in thermal communication with the cold side bleed assembly 108 and the hot side bleed assembly 110, and more specifically in thermal communication with the cooling airflow 102 through the cold side bleed assembly 108 and the cooled airflow 124 through the hot side bleed assembly 110.

Further, for the embodiment of FIG. 31, the gas turbine engine 10, and more specifically, the turbomachine 16 of the gas turbine engine 10 includes a reverse bleed system 500 for providing airflow into the working gas flowpath 37 of the turbomachine 16 during certain operating conditions, such as during a shutdown operating condition. The reverse bleed system 500 generally includes a reverse bleed duct 502 and a reverse bleed blower 504 (also referred to herein as an RBS blower) in fluid communication with the reverse bleed duct 502. Additionally, the reverse bleed duct 502 is in fluid communication with the working gas flowpath 37.

More specifically, the compressor section, the combustion section 26, or both defines a compressor bleed plenum 506 located outward of the working gas flowpath 37 along the radial direction R of the gas turbine engine 10 proximate a downstream and of an HP compressor 24 of the compressor section. The reverse bleed duct 502 is in fluid communication with the working gas flowpath 37 through the compressor bleed plenum 506 for the embodiment depicted. For example, the compressor bleed plenum 506 may be fluidly connected to working gas flowpath 37 through one or more bleed ports (not shown). In certain exemplary embodiments, the reverse bleed duct 502 may be fluidly coupled with the working gas flowpath 37 through a compressor bleed duct, such as a transient bleed duct 240 as discussed above.

Further, the reverse bleed duct 502 is in fluid communication with a cold location of the gas turbine engine 10 as in airflow source or the reverse bleed system 500 during operation of the reverse bleed system 500. In particular, for the embodiment depicted, it will be appreciated that the gas turbine engine 10 defines a bypass passage 56 over the turbomachine 16, and the cold location (and airflow source for the reverse bleed system 500) is the bypass passage 56, the working gas flowpath 37 through an LP compressor 22 of the compressor section, a working gas flowpath 37 between the LP compressor 22 and the HP compressor 24, or a combination thereof. More specifically, still, for the embodiment depicted, the turbomachine 16 includes an operability bleed assembly 180 having an operability bleed duct 182 extending between an inlet 184 in fluid communication with the working gas flowpath 37 and an outlet 186 in fluid communication with a bypass passage 56. The inlet 184 is in fluid communication with the working gas flowpath 37 at a location between the LP compressor 22 and an HP compressor 24. For the embodiment depicted, the reverse bleed duct 502 defines an inlet 508 in fluid communication with the operability bleed duct 182. With such configuration, the cold location is a working gas flowpath 37 between the LP compressor 22 and the HP compressor 24 when the gas turbine engine 10 is in a non-shutdown operating condition and the cold location is the bypass passage 56 when the gas turbine engine 10 is in a shutdown operating condition.

The reverse bleed system 500 may be configured to operate during the shutdown operating condition of the gas turbine engine 10. In particular, following a flight operation of the gas turbine engine 10 (a non-shutdown operating condition), the gas turbine engine 10 may be shut down (e.g., the shutdown operating condition) and an airflow through the working gas flowpath 37 may cease. Heat within certain components, such as, e.g., a downstream end of the HP compressor 24, the combustion section 26, an upstream end of the HP turbine 28, or combinations thereof, may generally rise vertically during the shutdown operating condition, as an airflow over such components ceases. Such can least to a temperature mismatch circumferentially within the gas turbine engine 10, creating a bow or bend in certain components. However, the reverse bleed system 500 can create an airflow through the working gas flowpath 37 during the shutdown operating condition to combat such a result.

For example, in response to determining the gas turbine engine 10 is in a shutdown operating condition, the gas turbine engine 10 may operate the reverse bleed blower 504 to generate an airflow from the inlet 508 (in fluid communication with a cold location of the gas turbine engine 10, such as the bypass passage 56) through the reverse bleed duct 502, through an outlet of the reverse bleed duct 502, and into the working gas flowpath 37 (e.g., through the compressor bleed plenum 506), through the downstream end of the HP compressor 24, the combustion section 26, or both. Such a configuration may minimize a risk of these components bowing or bending during the shutdown operating condition.

Notably, the reverse bleed duct 502 includes a check valve 512 downstream of the reverse bleed blower 504 and upstream of the outlet (not labeled) to ensure airflow from the working gas flowpath 37 does not flow backwards through the reverse bleed duct 502 during a non-shutdown operating condition of the gas turbine engine 10 (e.g., where pressurized airflow is provided through the working gas flowpath 37).

It will further be appreciated that the reverse bleed system 500 described herein and pictured schematically in FIG. 31 may, in certain embodiments, be configured in a similar manner as U.S. patent application Ser. No. 16/800,677, filed Feb. 25, 2020 (issued as U.S. Pat. No. 11,047,306; referred to herein as the '306 patent), which is incorporated herein by reference in its entirety for all purposes. In particular, the reverse bleed system 500 of the present disclosure may be configured in a similar manner as the reverse bleed apparatus of the '306 patent (e.g., may have an inlet fluidly coupled to an operability bleed duct/bleed duct and an outlet in fluid communication with a working gas flowpath through a bleed duct, compressor bleed port, and plenum).

As will be appreciated, during non-shutdown operating conditions of the gas turbine engine 10, the reverse bleed system 500 is not required to operate. Accordingly, in order to make use of certain aspects of the reverse bleed system 500 during non-shutdown operating conditions, the inlet 114 of the cold side bleed assembly 108 of the CCA system 100 is in fluid communication with the reverse bleed duct 502 of the reverse bleed system 500. In particular, the CCA system 100 further includes a flow control valve 415. The inlet 114 of the cold side bleed assembly 108 is in fluid communication with the reverse bleed duct 502 through the flow control valve 415. More specifically, still, the flow control valve 415 is positioned within the reverse bleed duct 502 of the reverse bleed system 500 and the inlet 114 to the cold side bleed assembly 108 is in fluid communication with the reverse bleed duct 502 through the flow control valve 415.

The flow control valve 415 may be movable between a first position, in which an airflow through the reverse bleed duct 502 is directed into the working gas flowpath 37, and a second position, in which the airflow through the reverse bleed duct 502 is directed into the cold side bleed assembly 108 of the CCA system 100. In such a manner, the flow control valve 415 may be moved to the first position during a shutdown operating condition of the gas turbine engine 10, and may be moved to the second position during a non-shutdown operating condition of the gas turbine engine 10.

In addition, the flow control valve 415 may be movable to one or more intermediate positions to split the airflow through the reverse bleed duct 502 to the working gas flowpath 37 and to the cold side bleed assembly 108. Such may be useful when, e.g., the CCA heat exchanger 112 remains relatively hot following, e.g., a flight operating condition of the gas turbine engine 10, as the split flow may both cool the CCA heat exchanger 112 and provide an airflow to the working gas flowpath 37 to combat rotor bow conditions.

Moreover, in still other embodiments, the flow control valve 415 may be moveable to a closed position. In the closed position, airflow through the reverse bleed duct 502 may be prevented from reaching either the working gas flowpath 37 or the cold side bleed assembly 108.

Referring still to the embodiment of FIG. 31, the reverse bleed blower 504 of the reverse bleed system 500 is positioned upstream of the flow control valve 415 within the reverse bleed duct 502. In such a manner, the reverse bleed blower 504 of the reverse bleed system 500 may be operable to increase a pressure of the airflow through the reverse bleed duct 502 and provided to the cold side bleed assembly 108 of the CCA system 100 to increase an operability of the CCA system 100 during certain operations. Such an arrangement may allow for the CCA system 100 to utilize relatively low pressure airflow from, e.g., the bypass passage 56, resulting in an increased efficiency for the gas turbine engine. Alternatively, such an arrangement may allow for the CCA system 100 to be designed with a more efficient CCA heat exchanger 112, having a higher pressure drop and more efficiently exchanging heat from the cooled airflow to the cooling airflow.

In such a manner, the reverse bleed blower 504 of the reverse bleed system 500 may be utilized with both the reverse bleed system 500 and the CCA system 100, making it a dual-use blower 420. Such an arrangement may result in an overall more efficient gas turbine engine, more fully utilizing the components throughout a operational window.

Figure 32:
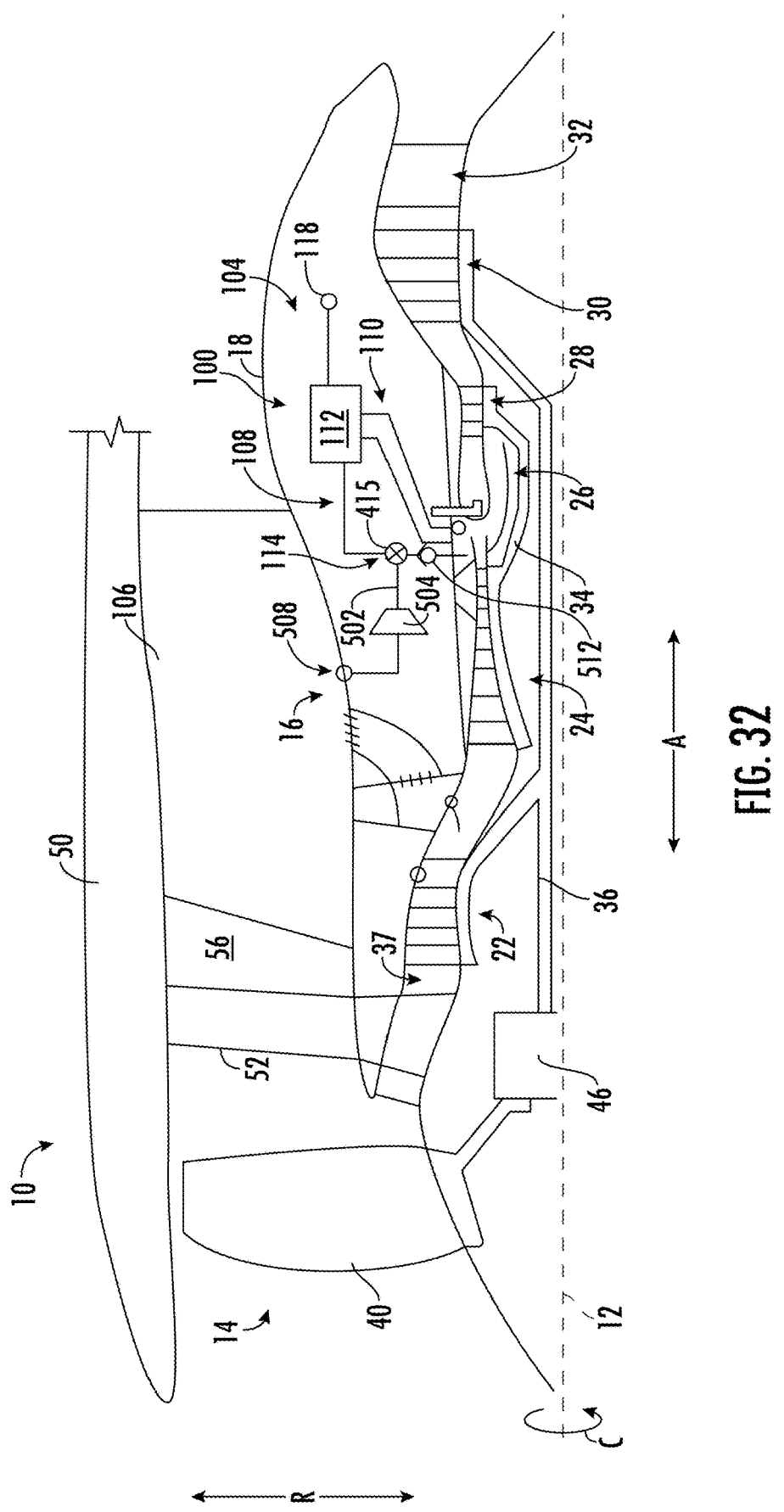
FIG. 32 is a cross-sectional view of a gas turbine engine in accordance with still another exemplary aspect of the present disclosure.

It will be appreciated, however, that in other exemplary embodiments, other suitable configurations may be provided. For example, in other embodiments the cold location of the gas turbine engine 10 may be any of the cold locations of the gas turbine engines 10 described hereinabove. For example, referring now briefly to FIG. 32 providing a schematic view of a gas turbine engine 10 having a reverse bleed system 500 and a CCA system 100 in accordance with another exemplary embodiment of the present disclosure, the cold location may be the bypass passage 56 of the gas turbine engine 10.

Figure 33:
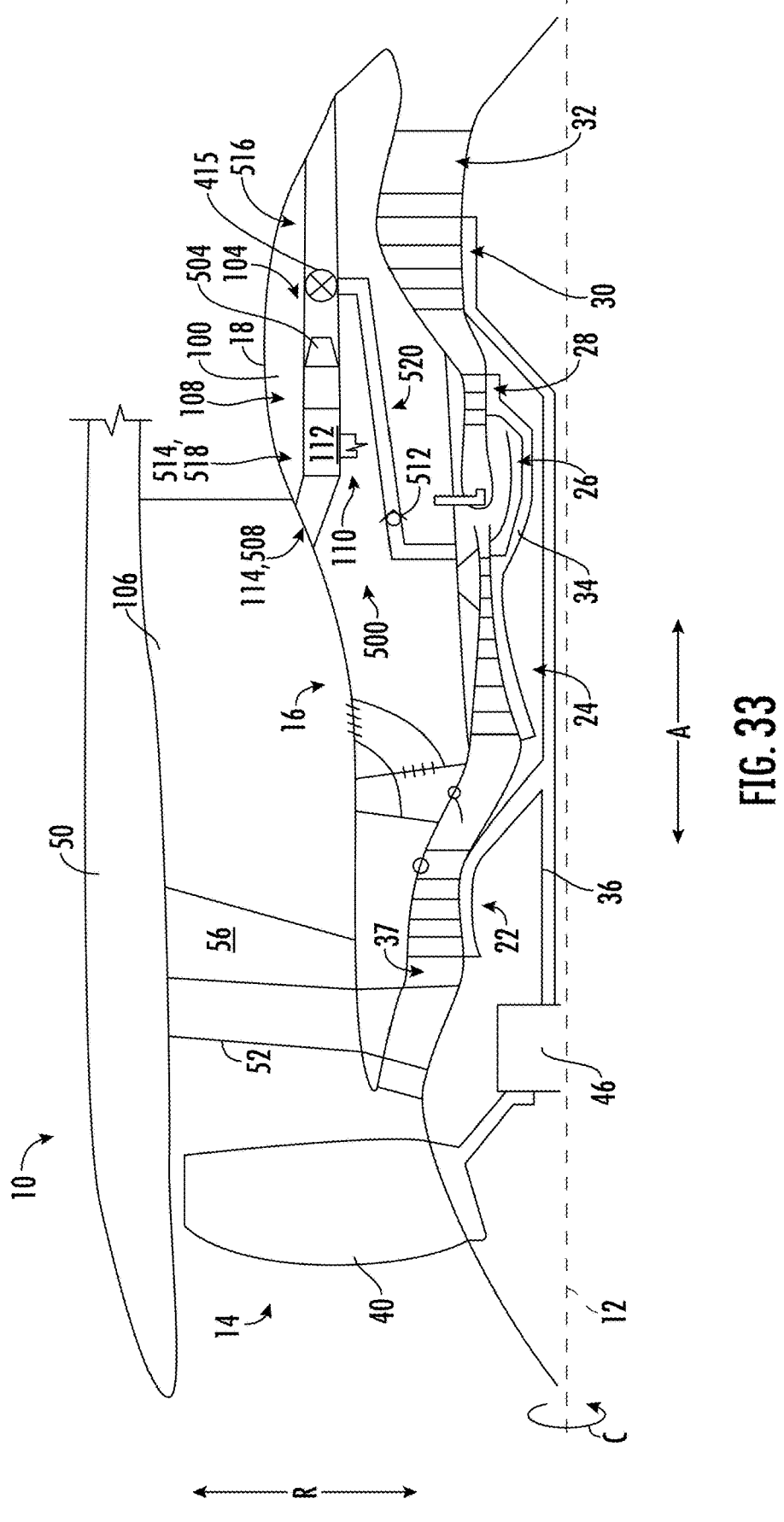
FIG. 33 is a cross-sectional view of a gas turbine engine in accordance with still another exemplary aspect of the present disclosure.

Further, referring now to FIG. 33, a schematic view of a gas turbine engine 10 having a reverse bleed system 500 and a CCA system 100 in accordance with another exemplary embodiment of the present disclosure is provided. The exemplary gas turbine engine 10 of FIG. 33 may be configured in a similar manner as exemplary gas turbine engine 10 of FIG. 31 or 27.

For example, the exemplary reverse bleed system 500 depicted in FIG. 8 includes a reverse bleed duct 502 and a reverse bleed blower 504 in fluid communication with the reverse bleed duct 502. Similarly, the CCA system 100 depicted in FIG. 33 includes a cold side bleed assembly 108, a hot side bleed assembly 110, and a CCA heat exchanger 112. However, for the embodiment depicted, the reverse bleed duct 502 includes a first portion 514 and a second portion 516, and similarly, the cold side bleed assembly 108 includes a first portion 518 and a second portion 520. For the embodiment depicted, the first portion 514 of the cold side bleed assembly 108 is integrated with the first portion 518 of the reverse bleed duct 502. In such a manner, the inlet 508 to the reverse bleed duct 502 is co-located with the inlet 114 to the cold side bleed assembly 108. As will be appreciated, for the embodiment depicted the CCA heat exchanger 112 is positioned within the first portion 514 of the cold side bleed assembly 108, and the reverse bleed blower 504 is positioned within the first portion 518 of the reverse bleed duct 502 at a location downstream of the CCA heat exchanger 112. The CCA system 100 further includes a flow control valve 415, with the second portion 516 of the cold side bleed assembly 108 coupled to the first portion 514 of the cold side bleed assembly 108 through the flow control valve 415. Similarly, the second portion 520 of the reverse bleed duct 502 is in fluid communication with the first portion 518 of the reverse bleed duct 502 through the flow control valve 415.

With such a configuration, operation of the blower 420 during, e.g., the shutdown operating condition necessarily generates an airflow through the CCA heat exchanger 112 during such operating condition, which may cool the CCA heat exchanger 112.

The flow control valve 415 and reverse bleed blower 504 may operate similar to the exemplary flow control valve 415 and reverse bleed blower 504 discussed above with reference FIG. 32. Notably, in certain exemplary embodiments, the flow control valve 415, the reverse bleed blower 504, or both can be operably coupled to a controller, such as the exemplary controller 130 described above with reference to FIG. 2.

Figure 34:
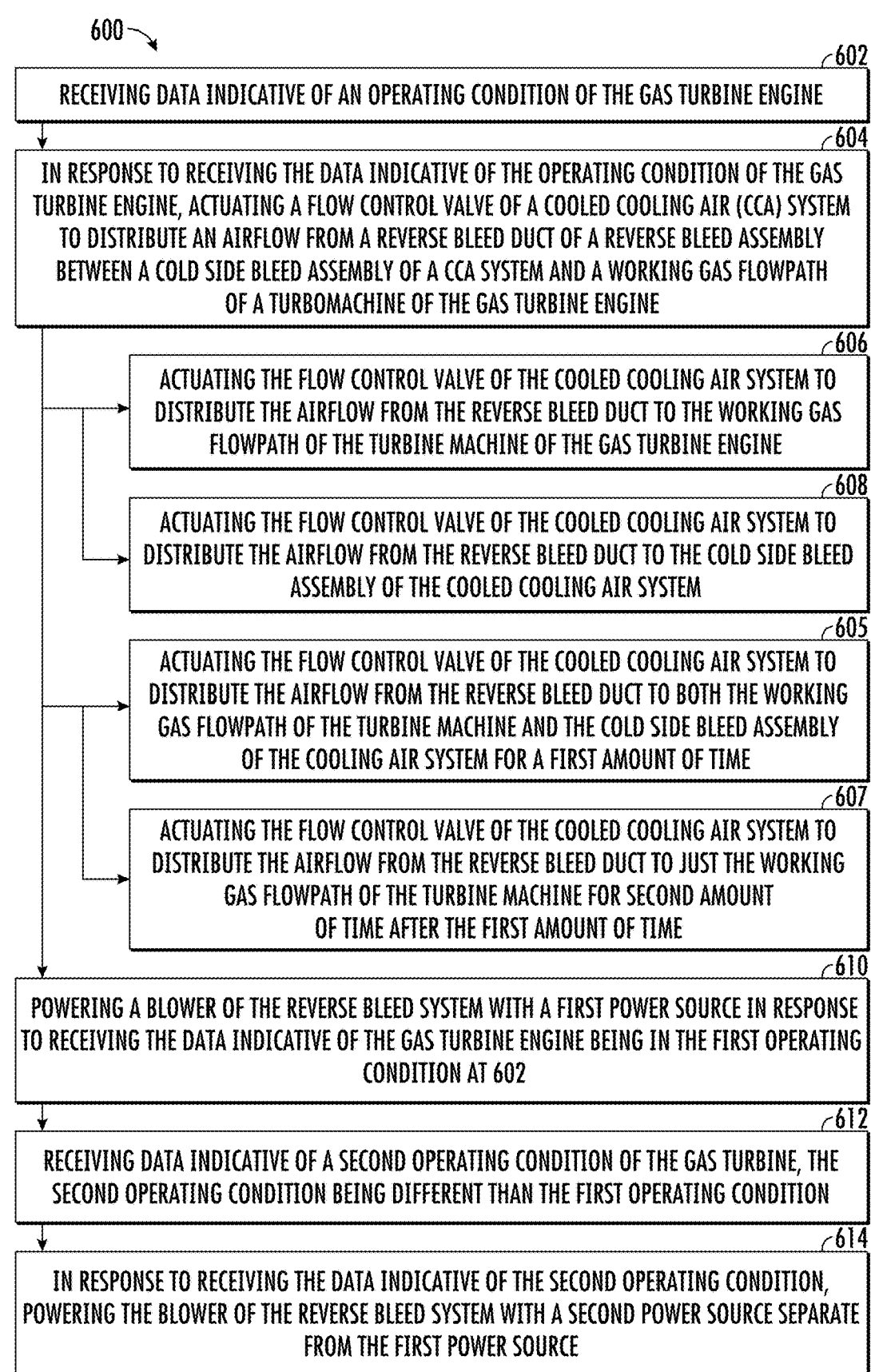
FIG. 34 is a flow diagram of a method of operating a gas turbine engine in accordance with an exemplary aspect of the present disclosure.

Referring now to FIG. 34, a method 600 of operating a gas turbine engine in accordance with an exemplary aspect of the present disclosure is provided. The method 600 may be utilized with one or more of the exemplary gas turbine engines described above with reference to FIGS. 31 through 33.

The method 600 includes at (602) receiving data indicative of an operating condition of the gas turbine engine, and at (604) in response to receiving the data indicative of the operating condition of the gas turbine engine, actuating a flow control valve of a cooled cooling air (CCA) system to distribute an airflow from a reverse bleed duct of a reverse bleed assembly between a cold side bleed assembly of the CCA system and a working gas flowpath of a turbomachine of the gas turbine engine.

In certain exemplary embodiments, the operating condition is a shutdown operating addition. With such exemplary aspect, actuating the flow control valve of the cooled cooling air system at (604) includes at (606) actuating the flow control valve of the cooled cooling air system to distribute the airflow from the reverse bleed duct to the working gas flowpath of the turbine machine of the gas turbine engine. Such an arrangement may reduce the risk of rotor bow or bend.

Briefly, it will be appreciated that when the operating condition is the shutdown operating condition, actuating the flow control valve of the cooled cooling air system at (604) may further include at (605) actuating the flow control valve of the cooled cooling air system distribute airflow from the reverse bleed duct to both the working gas flowpath of the turbine machine and the cold side bleed assembly of the cooling air system for a first amount of time, and at (607) actuating the flow control valve of the cooled cooling air system to distribute the airflow from the reverse bleed duct to just the working gas flowpath of the turbine machine for second amount of time after the first amount of time. In such a manner, the method 600 may allow for cooling of a cooled cooling air heat exchanger of the cooled cooling air system following a shutdown of the gas turbine engine, e.g., a shutdown operating condition of the gas turbine engine, and then transitioning to more complete rotor bow mitigation.

Additionally, in other exemplary aspects, the operating condition may be a flight operating condition (a non-shutdown operating condition). With such exemplary aspect, actuating the flow control valve of the cooled cooling air system at (604) includes at (608) actuating the flow control valve the cooled cooling air system to distribute the airflow from the reverse bleed duct to the cold side bleed assembly of the cooled cooling air system. Such an arrangement may allow for operation of the cooled cooling air system.

Notably, in certain exemplary aspects, a power source for the blower may change based on the operating condition of the gas turbine engine. For example, in certain exemplary embodiments, the operating condition may be a first operation condition. With this exemplary aspect, the exemplary method 600 may further include at (610) powering a blower of the reverse bleed system with a first power source in response to receiving the data indicative of the gas turbine engine being in the first operating condition at (602).

The method may further include at (612) receiving data indicative of a second operating condition of the gas turbine, the second operating condition being different than the first operating condition, and at (614) in response to receiving the data indicative of the second operating condition, powering the blower of the reverse bleed system with a second power source separate from the first power source.

For example, the first power source may be an engine power source, such as an electric generator of the gas turbine engine, an energy storage unit of the gas turbine engine, or the like. The second power source may be an aircraft power source, a ground power source, or other power source separate from the gas turbine engine.

As discussed herein above, aspects of the present disclosure relate to a gas turbine engine having an active clearance control (ACC) system within a turbine section of the gas turbine engine to maintain a desired clearance between turbine rotor blades and an outer casing of a turbine of the turbine section. ACC systems can operate by providing an airflow onto the outer casing of the turbine to control a thermal growth of the outer casing relative to the turbine rotor blades. Certain ACC systems use a low pressure airflow, such as a bypass airflow given the relatively low temperature of the airflow. However, as discussed above, depending on, e.g., how complex the ACC system is, a higher pressure airflow may be needed to drive the airflow through a manifold of the ACC system. Accordingly, a blower (e.g., a pump) may be provided to urge the airflow through the ACC system.

As will further be appreciated, a reverse bleed system can be provided to reduce or minimize a coke formation within, e.g., fuel nozzles of the gas turbine engine, and a rotor bow condition within the engine. The reverse bleed system generally includes a reverse bleed duct extending from a cold location to a hot location (such as a compressor discharge cavity), and a blower operable during a shutdown operating condition of the gas turbine engine to circulate airflow through a working gas flowpath of the gas turbine engine and reduce, e.g., the rotor bow condition.

The inventors of the present disclosure surprisingly found that the blower for the reverse bleed system could provide sufficient pressurization of a low pressure airflow to utilize the low pressure airflow for the ACC system during a non-shutdown operating condition of the gas turbine engine. Such an arrangement can allow for greater overall engine efficiency by reducing or eliminating the extraction of airflow from a working gas flowpath of the engine downstream of one or more compression stages, and by utilizing components that would otherwise be unused during the non-shutdown operating condition of the gas turbine engine.

Figure 35:
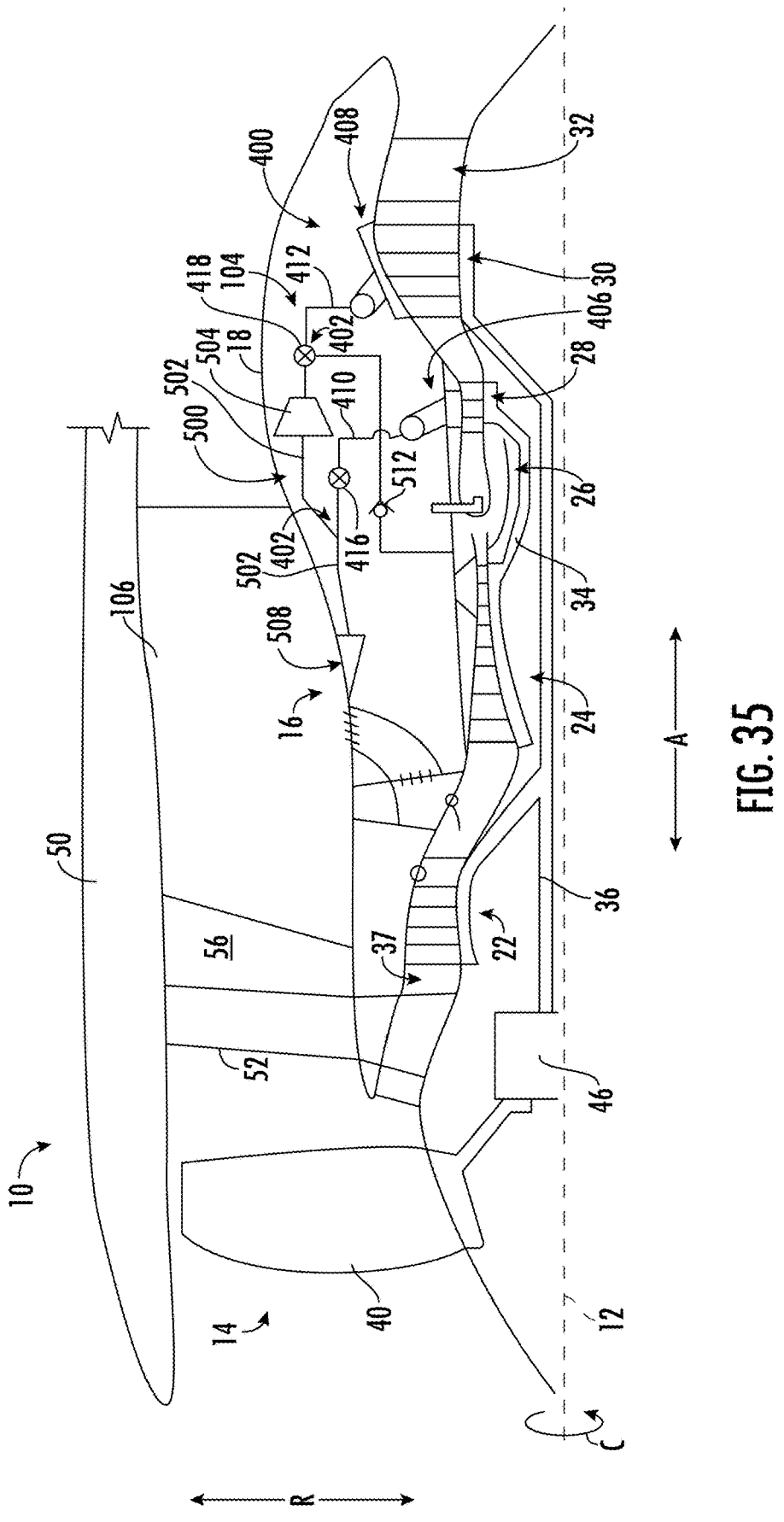
FIG. 35 is a cross-sectional view of a gas turbine engine in accordance with still another exemplary aspect of the present disclosure.

In particular, referring now to FIG. 35, a schematic, cross-sectional view is provided of a gas turbine engine 10 in accordance with another exemplary embodiment of the present disclosure. The exemplary gas turbine engine 10 of FIG. 35 may be configured in a similar manner as one or more of the exemplary gas turbine engines 10 and CCA systems 100 described above with reference to FIGS. 1 through 34.

For example, the exemplary gas turbine engine 10 of FIG. 35 generally includes a fan section 14 and a turbomachine 16, with the turbomachine 16 including a compressor section, a combustion section 26, and a turbine section collectively defining at least in part a working gas flowpath 37. The turbine section includes a first turbine, or rather an HP turbine 28 in the embodiment shown, and the second turbine, or rather an LP turbine 30 in the embodiment shown.

However, for the embodiment of FIG. 35, the turbomachine 16 further includes a reverse bleed system 500 and an ACC system 400. The reverse bleed system 500 may be configured in a similar manner as one or more of the exemplary reverse bleed systems 500 described above. For example, the reverse bleed system 500 includes a reverse bleed duct 502 and a reverse bleed blower 504 in fluid communication with the reverse bleed duct 502. The reverse bleed duct 502 is further in fluid communication with the working gas flowpath 37 for providing an airflow to the working gas flowpath 37 during operation of the reverse bleed system 500. Moreover, an inlet 508 to the reverse bleed duct 502 is in fluid communication with a cold location of the gas turbine engine 10, which for the embodiment of FIG. 35 is a bypass passage 56 of the gas turbine engine 10.

However, in other embodiments, the cold location may be one or more of the other exemplary cold locations described above.

Similarly, the ACC system 400 may be configured in a similar manner as one or more of the exemplary ACC systems 400 described above. For example, the ACC system 400 generally includes an inlet 402, a heat transfer assembly arranged around a turbine of the turbine section, and an ACC duct assembly 404 extending from the inlet 402 to the heat transfer assembly. More specifically, for the embodiment shown, the turbine is the HP turbine 28, and the heat transfer assembly is a first heat transfer assembly 406. The exemplary ACC system 400 further includes a second heat transfer assembly 408 arranged around the LP turbine 30. The ACC duct assembly 404 extends to both the first heat transfer assembly 406 and the second heat transfer assembly 408.

In particular, for the embodiment shown, the ACC duct assembly 404 includes a first portion 410 that extends to the first heat transfer assembly 406 and a second portion 412 that extends to the second heat transfer assembly 408. The first portion 410 and the second portion 412 each include a separate inlet 402 (fluidly coupled to the reverse bleed duct 502, as discussed in more detail below). Briefly, it will be appreciated that for the embodiment depicted, the ACC system 400 includes one or more flow control valves operable with the first portion 410 of the ACC the second portion 412 of the ACC duct assembly 404, or both. More specifically, the ACC system 400 includes a first flow control valve 416 operable with the first portion 410 of the ACC duct assembly 404, and a second flow control valve 418 operable with the second portion 412 of the ACC duct assembly 404. The first flow control valve 416, second flow control valve 418, and flow control valve 415 may each be operably connected to a controller (such as the exemplary controller 130 of FIG. 2) for controlling operation of the respective valve and an airflow through the respective duct.

In the embodiment depicted, in order to more fully utilize aspects of the reverse bleed system 500 throughout various operating conditions of the gas turbine engine 10, the inlet 402 of the ACC system 400 is in fluid communication with the reverse bleed duct 502 of the first bleed system. As noted, the reverse bleed system 500 may operate during a shutdown operating condition of the gas turbine engine 10. By contrast, the ACC system 400 may operate during a non-shutdown operating condition of the gas turbine engine 10. Accordingly, certain aspects of the reverse bleed system 500 may be more fully utilized across various operating conditions of the gas turbine engine 10 with the exemplary configuration of FIG. 35.

Referring still to FIG. 35, the first portion 410 is more specifically in fluid communication with the reverse bleed duct 502 at a first location along the reverse bleed duct 502, and the second portion 412 is in fluid communication with the reverse bleed duct 502 at a second location along the reverse bleed duct 502. In the embodiment shown, the reverse bleed blower 504 is in fluid communication with the first bleed duct at a third location between the first location and the second location. In such a manner, the reverse bleed duct 502 may be configured to increase a pressure of an airflow provided to the second heat transfer assembly 408 around the LP turbine 30 during the non-shutdown operating condition of the gas turbine engine 10. As discussed hereinabove, such may allow for operation of the ACC system 400 in a desired manner, given the intricacies of the second heat transfer assembly 408 around the LP turbine 30.

Moreover, it will be appreciated that for the exemplary ACC system 400 depicted, the second flow control valve 418 is located at the second location and is configured as a variable three-way valve. In such a manner, the second flow control valve 418 may be configured to modulate an airflow between the reverse bleed duct 502 (and more specifically, a section of the reverse bleed duct 502 extending from the second location to the working gas flowpath 37) and the second portion 412 of the ACC duct assembly 404. The second portion 412 of the ACC duct assembly 404 is therefore in fluid communication with the reverse bleed duct 502 through the second flow control valve 418.

When the gas turbine engine 10 is in a shutdown operating condition, the first flow control valve 416 may be moved to a closed positioned such that an airflow through the first portion 410 of the ACC duct assembly 404 may be prevented from flowing there across. Also during the shutdown operating condition, the second flow control valve 418 may be moved to a position which all or substantially all of an airflow through the reverse bleed duct 502 from the reverse bleed blower 504 is provided past the second location and remains flowing through the reverse bleed duct 502 to the working gas flowpath 37.

By contrast, when the gas turbine engine 10 is in a non-shutdown operating condition, the first flow control valve 416 may be moved to an open position such that the airflow through the first portion 410 of the ACC duct assembly 404 is permitted to flow there across. Also during the non-shutdown operating condition, the second flow control valve 418 may be moved to a different position wherein all or substantially all of an airflow through the reverse bleed duct 502 from the reverse bleed blower 504 is provided to the second portion 412 of the ACC duct assembly 404 and permitted to flow from the reverse bleed duct 502 through the second portion 412 of the ACC duct assembly 404 (and to the second heat transfer assembly 408). Notably, the reverse bleed system 500 includes a check valve 512 within the reverse bleed duct 502 at a location downstream of the inlet 402 of the second portion 412 of the ACC duct 404. The check valve 512 is positioned to prevent an airflow from the outlet of the reverse bleed duct 502 flowing upstream towards the reverse bleed blower 504.

Figure 36:
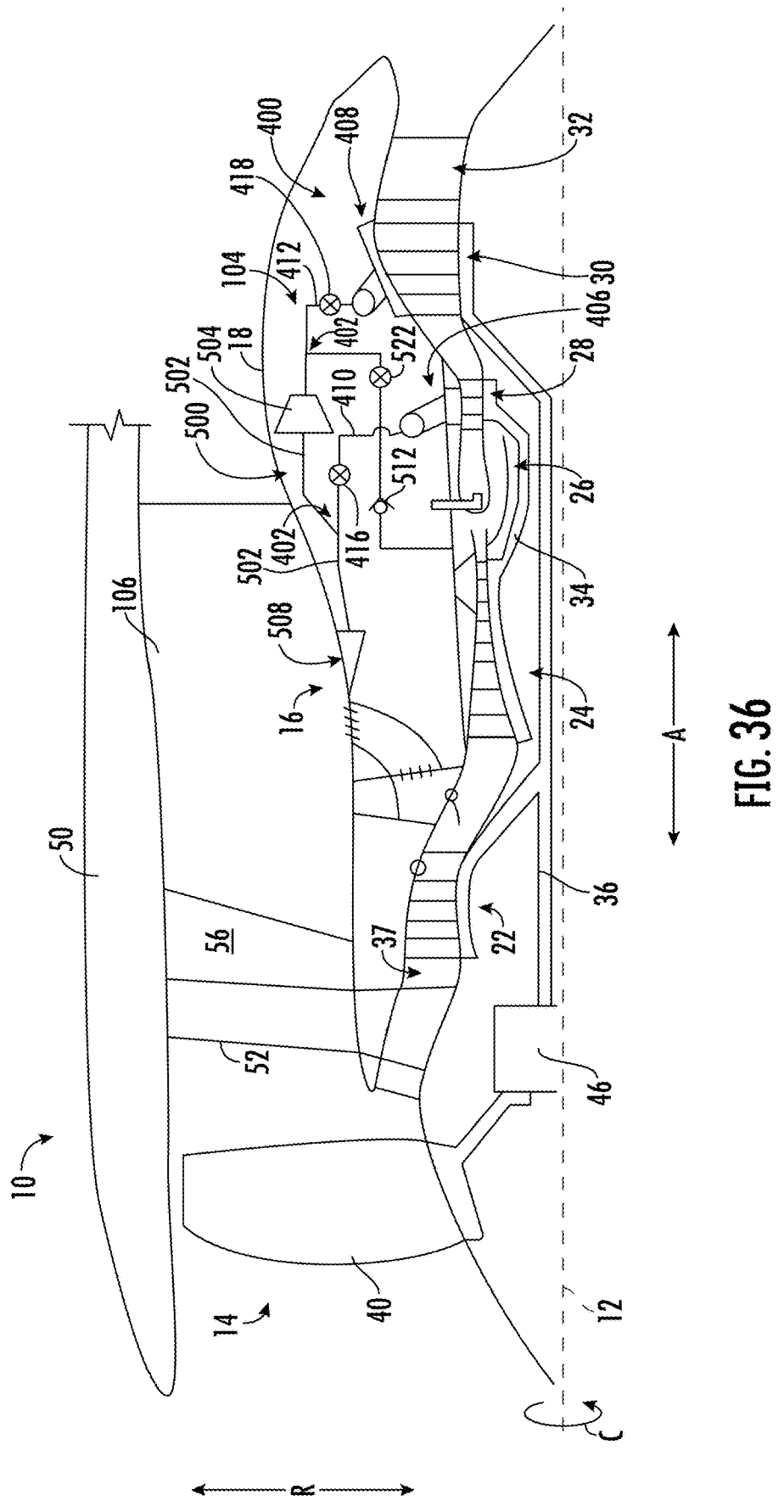
FIG. 36 is a cross-sectional view of a gas turbine engine in accordance with still another exemplary aspect of the present disclosure.

It will be appreciated, however, that in other exemplary embodiments, other suitable configurations may be provided. For example, referring briefly to FIG. 36, providing a schematic view of a gas turbine engine 10 having a reverse bleed system 500 and an ACC system 400 in accordance with another exemplary embodiment of the present disclosure, differing valve arrangement may be provided. For the embodiment depicted, the second portion 412 of the ACC duct assembly 404 includes a second flow control valve 418 located downstream of a second location, and the reverse bleed system 500 includes a separate flow control valve 522 downstream of the second location.

Figure 37:
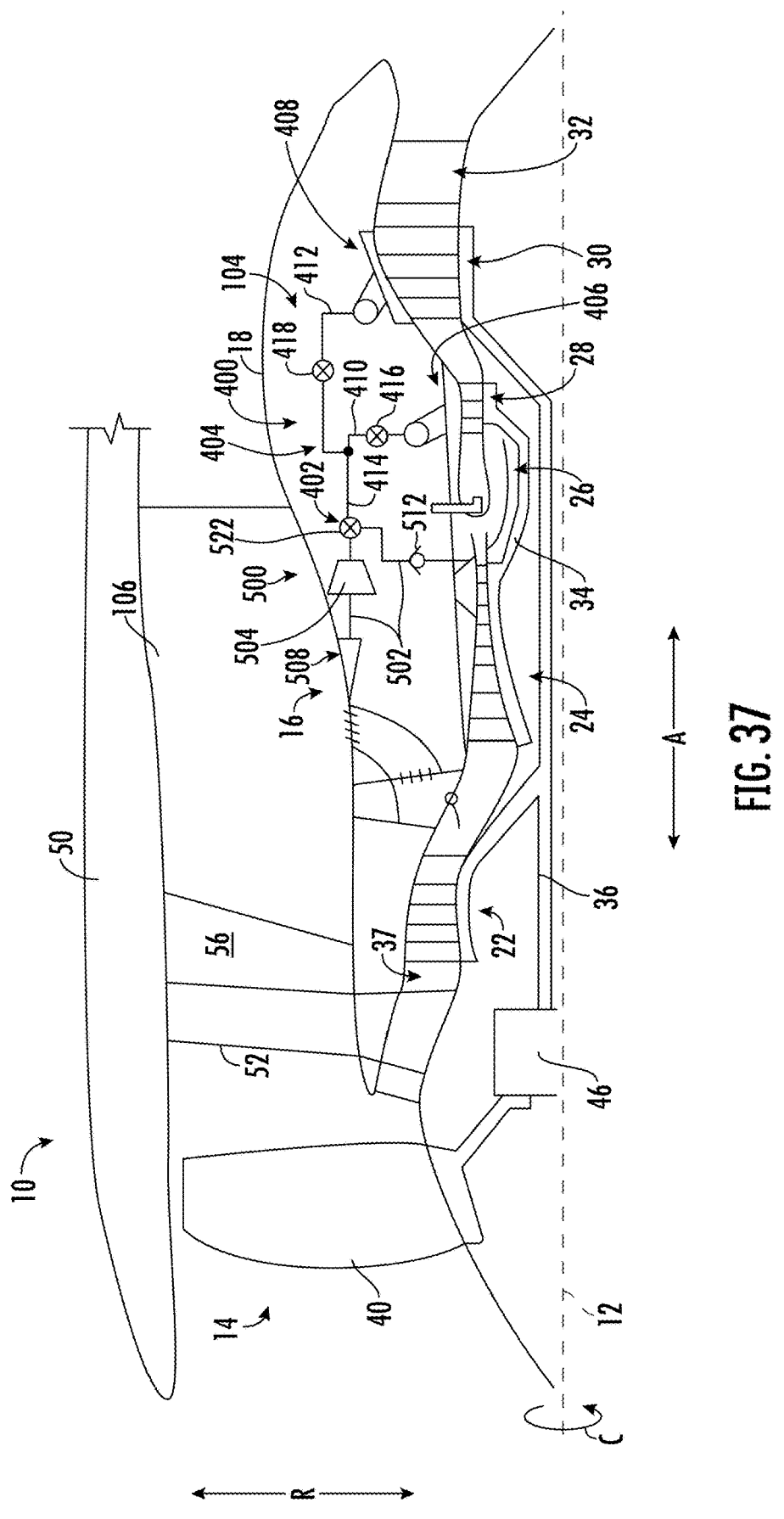
FIG. 37 is a cross-sectional view of a gas turbine engine in accordance with still another exemplary aspect of the present disclosure.

Moreover, referring now to FIG. 37, providing another exemplary embodiment of a gas turbine engine 10 in accordance with an embodiment present disclosure, the gas turbine engine 10 may again be configured in a similar manner as exemplary gas turbine engine 10 described above with reference to FIG. 35. The same or similar numbers may refer to the same or similar parts.

For example, the exemplary gas turbine engine 10 generally includes a reverse bleed system 500 and an ACC system 400. An inlet 402 of the ACC system 400 is in fluid communication with a reverse bleed duct 502 of the reverse bleed system 500. However, for the embodiment depicted, an ACC duct assembly 404 of the ACC system 400 includes a first portion 410 that extends to a first heat transfer assembly 406 of the ACC system 400, a second portion 412 that extends to a second heat transfer assembly 408 of the ACC system 400, and an upstream portion 414 that extends from the inlet 402 of the ACC system 400 to the first portion 410 and the second portion 412. With such exemplary embodiment, the reverse bleed system 500 further includes a flow control valve 522, with the inlet 402 to the ACC duct assembly 404 in fluid communication with the reverse bleed duct 502 through the flow control valve 522. The flow control valve 522 may be movable between a first position, in which airflow from a reverse bleed blower 504 of the reverse bleed system 500 is provided through the reverse bleed duct 502 and through the inlet 402 to the ACC duct assembly 404 (e.g., during a non-shutdown operating condition), and a second position, in which airflow from the reverse bleed blower 504 is provided through the reverse bleed duct 502 to the working gas flowpath 37 of the gas turbine engine 10 (e.g., during a shutdown operating condition).

Such a configuration may result in an overall more efficient engine by more completely using the components throughout an operational window of the gas turbine engine.

As discussed herein above, aspects of the present disclosure relate to a reverse bleed system can be provided to reduce or minimize a coke formation within one or more portions of the gas turbine engine, e.g., fuel nozzles of the gas turbine engine, and/or a rotor bow condition within the engine. The reverse bleed system generally includes a reverse bleed duct extending from a cold location to a hot location (such as a compressor discharge cavity), and a blower operable during a shutdown operating condition of the gas turbine engine to circulate airflow through a working gas flowpath of the gas turbine engine and reduce, e.g., the rotor bow condition.

Moreover, a variety of accessory systems of the gas turbine engine, and particularly of a turbomachine of the gas turbine engine, require cooling during a non-shutdown operating condition. Many of these accessory systems are located in an under-cowl area (an area beneath an outer cowl of the turbomachine and outward of a working gas flowpath of the gas turbine engine). Particularly, as engines are being pushed to operate more efficiently (and hotter), cooling of these accessory systems in the under-cowl area can become more difficult.

The inventors of the present disclosure have found, however, that the utilization of the blower for the reverse bleed system could provide sufficient pressurization of a low pressure, cold airflow to allow for additional cooling of one or more of these accessory systems. In particular, by pressurizing the low pressure cold air, more airflow and more impingement cooling may be possible for these accessory systems. Such an arrangement can allow for greater overall engine efficiency by utilizing more completely the components that would otherwise be unused during the non-shutdown operating condition of the gas turbine engine to provide additional cooling for certain engine systems.

Figure 38:
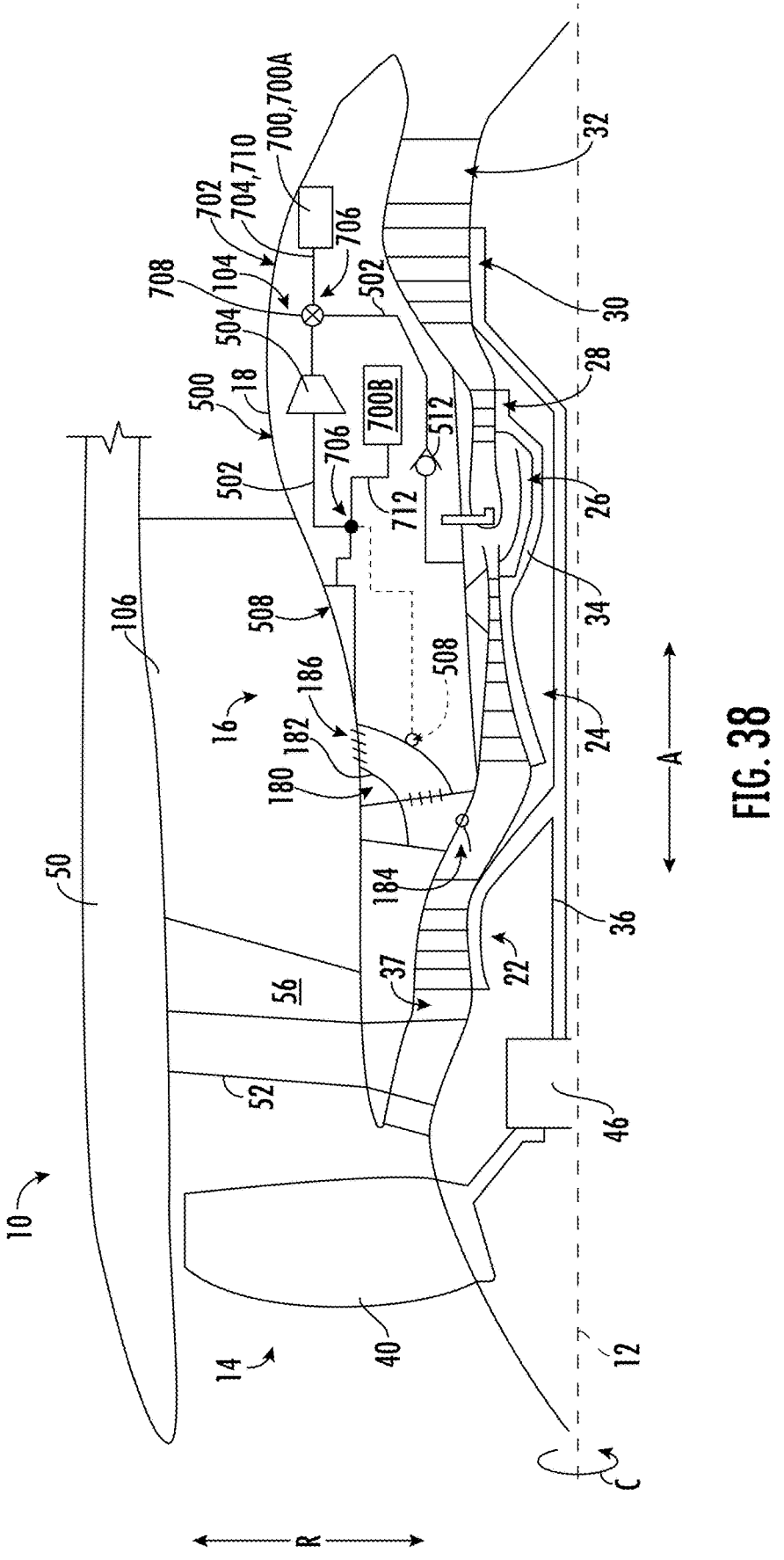
FIG. 38 is a cross-sectional view of a gas turbine engine in accordance with still another exemplary aspect of the present disclosure.

In particular, referring now to FIG. 38, a schematic, cross-sectional view is provided of a gas turbine engine 10 in accordance with another exemplary embodiment of the present disclosure. The exemplary gas turbine engine 10 of FIG. 38 may be configured in a similar manner as one or more of the exemplary gas turbine engines 10 described above with reference to FIGS. 1 through 37.

For example, the exemplary gas turbine engine 10 of FIG. 38 generally includes a fan section 14 and a turbomachine 16, with the turbomachine 16 including a compressor section, a combustion section 26, and a turbine section collectively defining at least in part a working gas flowpath 37. The turbomachine 16 additionally includes an operability bleed assembly 180 having an operability bleed duct 182 extending between an inlet 184 in fluid communication with the working gas flowpath 37 and an outlet 186 in fluid communication with a bypass passage 56 of the gas turbine engine 10. In particular, the inlet 184 of the operability bleed duct 182 is in fluid communication with the working gas flowpath 37 at a location between an LP compressor 22 and an HP compressor 24.

Further, the exemplary turbomachine 16 depicted includes a reverse bleed system 500. The reverse bleed system 500 may be configured in a similar manner as one or more of the exemplary reverse bleed systems 500 described hereinabove. For example, the reverse bleed system 500 generally includes a reverse bleed duct 502 and a reverse bleed blower 504 in fluid communication with the reverse bleed duct 502. The reverse bleed duct 502 is further in fluid communication with a working gas flowpath 37 for providing an airflow to the working gas flowpath 37 during operation of the reverse bleed system 500.

As with one or more of the exemplary embodiments discussed hereinabove, the exemplary embodiment of FIG. 38 includes a means for utilizing one or more aspects of the reverse bleed system 500 during a non-shutdown operating condition of the gas turbine engine 10. In particular, the exemplary gas turbine engine 10 further includes an accessory system 700, and the turbomachine 16 further includes an accessory cooling system 702. The accessory cooling system 702 includes a cooling duct 704 defining an inlet 706 in fluid communication with the reverse bleed duct 502. The cooling duct 704 is configured to provide an airflow onto the accessory system 700 to cool the accessory system 700.

In the embodiment depicted, the accessory cooling system 702 further includes a flow control valve 708. The inlet 402 of the accessory cooling system 702 is in fluid communication with the reverse bleed duct 502 through the flow control valve 708. In particular, for the embodiment depicted, the flow control valve 708 is a variable three-way valve positioned within the reverse bleed duct 502 of the reverse bleed system 500, with the inlet 706 of the accessory cooling system 702 located at the variable three-way valve. In such a manner, the variable three-way valve may be movable between a first position and a second position. In the first position, the variable three-way valve may allow for an airflow through the reverse bleed duct 502 to flow past the variable three-way valve and remain within the reverse bleed duct 502. In the second position, by contrast, the variable three-way valve made divert the airflow through the reverse bleed duct 502 into the cooling duct 704 of the accessory cooling system 702. The variable three-way valve may be in the first position when the gas turbine engine 10 is in a shutdown operating condition, and the variable three-way valve may be in the second position when the gas turbine engine 10 is in a non-shutdown operating condition.

In the embodiment depicted, the reverse bleed blower 504 is in fluid communication with the reverse bleed duct 502 at a location upstream of the flow control valve 708. The reverse bleed blower 504 may be configured to increase a pressure of airflow through the reverse bleed duct 502, received from the inlet 114 of the reverse bleed duct 502. The inlet 114 of the reverse bleed duct 502 is in fluid communication with a cold location of the gas turbine engine 10. For the embodiment depicted, the cold location is a bypass passage 56 of the gas turbine engine 10.

However, as is depicted in phantom, in other exemplary embodiments, the cold location may be one or more other suitable cold locations, such as one or more of the other cold locations discussed hereinabove, such as the operability bleed duct 182 of the turbomachine 16.

Moreover, for the embodiment of FIG. 38, the accessory system 700 is a first accessory system 700A, and the gas turbine engine 10 further includes a second accessory system 700B. The cooling duct 704 includes a first portion 710 that extends towards the first accessory system 700A and is in fluid communication with the reverse bleed duct 502 at a first location along the reverse bleed duct 502. In particular, the first portion 710 is in fluid communication with the reverse bleed duct 502 through the flow control valve 708.

The cooling duct 704 further includes a second portion 712 that extends towards the second accessory system 700B and is in fluid communication with the reverse bleed duct 502 at a second location along the reverse bleed duct 502. In the embodiment shown, the reverse bleed blower 504 is in fluid communication with the reverse bleed duct 502 at a third location between the first location and the second location. In particular, the reverse bleed blower 504 is in fluid communication with the reverse bleed duct 502 at a location downstream of the second location and upstream of the first location. In such a manner, the accessory cooling system 702 may be configured to provide a passive airflow cooling to the second accessory system 700B and may be configured to provide an active, or pressurized, airflow cooling to the first accessory system 700A, e.g., during a non-shutdown operating condition using the reverse bleed blower 504.

Figure 39:
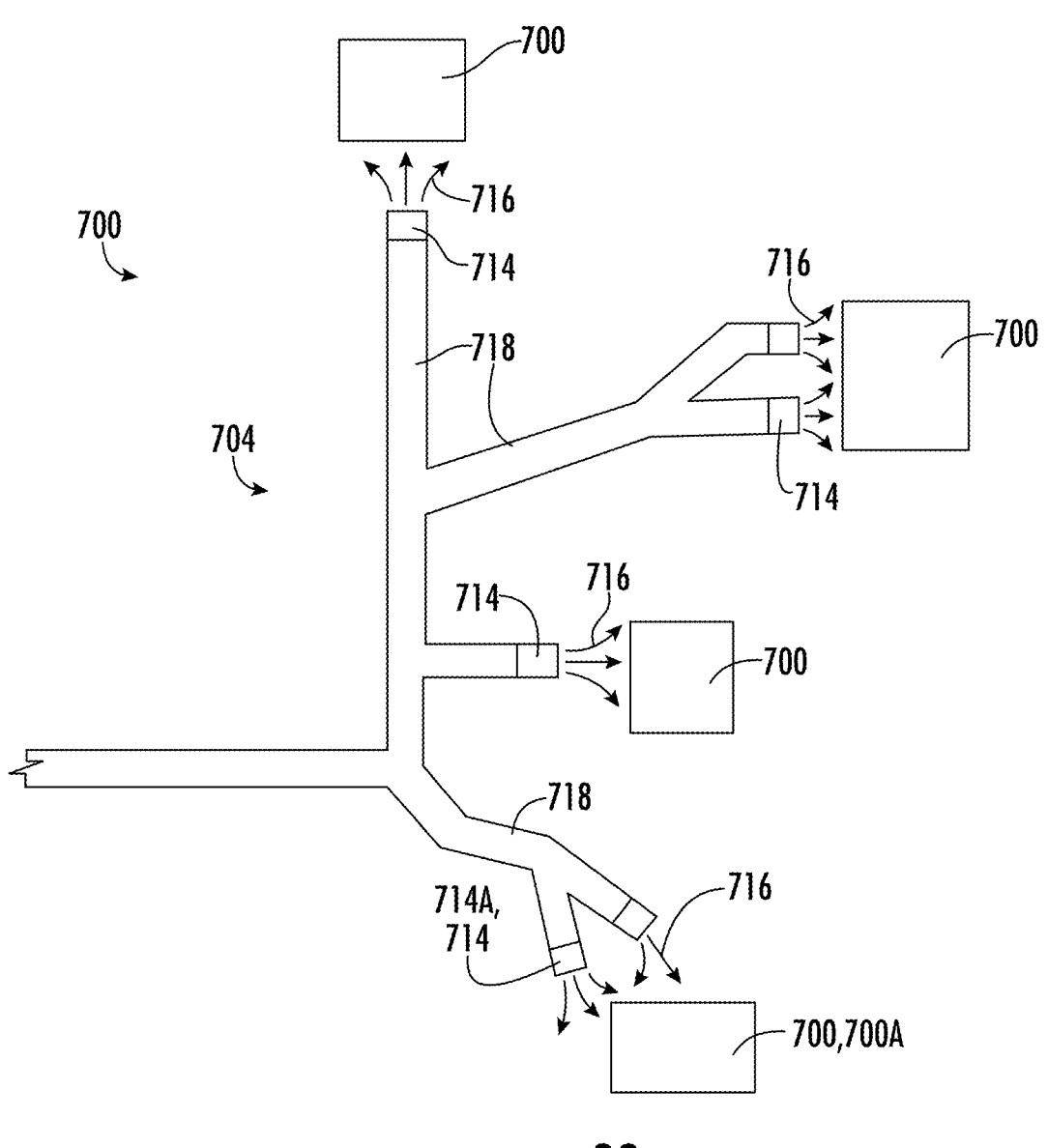
FIG. 39 is a schematic view of an accessory system cooling system in accordance with an exemplary aspect of the present disclosure.

Referring now to FIG. 39, a schematic view of a cooling duct 704 of an accessory cooling system 702 in accordance with an exemplary aspect of the present disclosure is provided. The exemplary cooling duct 704 of the accessory cooling system 702 depicted in FIG. 39 may be configured in a similar manner as exemplary cooling duct 704 of the accessory cooling system 702 described above with reference FIG. 38.

For the embodiment of FIG. 39, the cooling duct 704 of the accessory cooling system 702 includes a cooling tip 714, with the cooling tip 714 oriented towards an accessory system 700 to provide a cooling airflow 716 on to the accessory system 700. The cooling tip 714 may include a nozzle or diffuser configuration to either jet flow at the accessory system to increase local cooling or diffuse the flow to cover a wide area of the accessory system.

More specifically, in the embodiment of FIG. 39, the accessory system 700 is a first accessory system 700A of a plurality of accessory systems 700 of the gas turbine engine 10 and the cooling tip 714 is a first cooling tip 714A of a plurality of cooling tips 714. More specifically, the cooling duct 704 includes a plurality of branches 718 and each of the plurality of branches 718 includes (or defines) a respective one of the plurality of cooling tips 714. Each cooling tip 714 of the plurality of cooling tips 714 is oriented towards a respective accessory system 700 of the plurality of accessory systems 700 to provide the cooling airflow 716 onto of the respective accessory system 700.

In such a manner, the accessory cooling system 702 may provide impingement cooling for a variety of different accessory systems 700 of the gas turbine engine 10 using components of the reverse bleed system 500 that would otherwise be non-operational during the non-shutdown operating condition of the gas turbine engine 10.

In certain exemplary embodiments, the accessory systems 700 may be spaced along an axial direction and circumferential direction within an under-cowl area of the turbomachine 16. The accessory systems 700 may include one or more of: HP turbine ACC valve (e.g., the first flow control valve 416), LP turbine ACC valve (e.g., the second flow control valve 418), a combustor ignitor system, Core Compartment Cooling valves, Booster Anti-Ice valves, Nacelle Anti-Ice valves, Start Bleed Valves, Transient Bleed Valves, Modulated Turbine Cooling valves, an engine controller (such as controller 130 in FIG. 2), high pressure shutoff valve, or the like.

Figure 40:
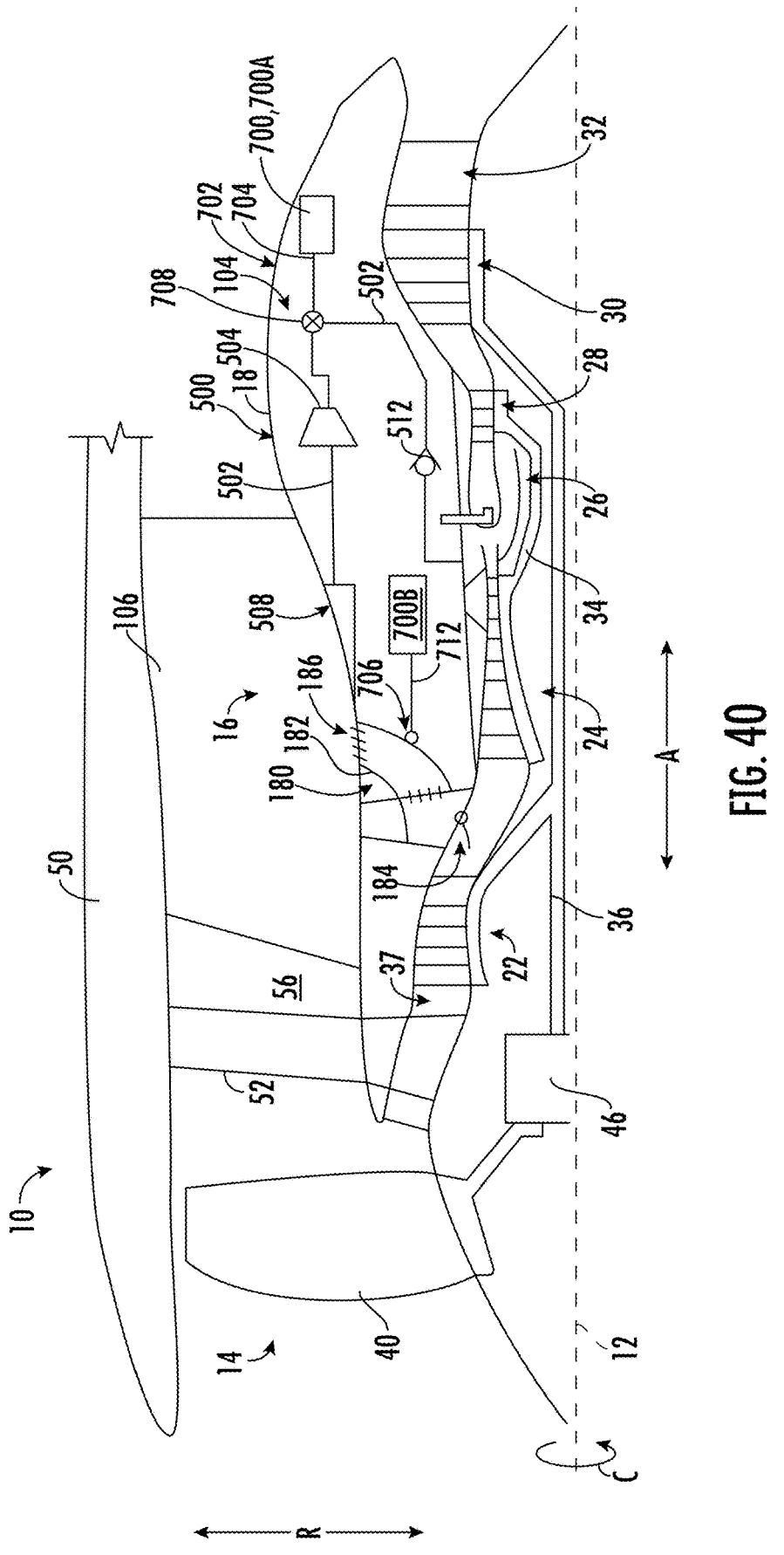
FIG. 40 is a cross-sectional view of a gas turbine engine in accordance with still another exemplary aspect of the present disclosure.

Referring now to FIG. 40, a schematic view of a gas turbine engine 10 in accordance with another exemplary embodiment of the present disclosure is provided. The exemplary gas turbine engine 10 of FIG. 40 may be configured in substantially the same manner as the exemplary gas turbine engine 10 of FIG. 38, and accordingly, the same or similar numbers may refer to the same or similar parts.

For example, the exemplary gas turbine engine 10 of FIG. 40 includes an accessory system 700 and a turbomachine 16 having a reverse bleed system 500 and an accessory cooling system 702 for cooling the accessory system 700. However, for the embodiment of FIG. 40, the accessory system 700 is a first accessory system 700A and the gas turbine engine 10 further includes a second accessory system 700B. Moreover, the accessory cooling system 702 includes a cooling duct 704 having a first portion 710 that extends towards the first accessory system 700A and is in fluid communication with the reverse bleed duct 502 at a first location along the reverse bleed duct 502, and the cooling duct 704 further includes a second portion 712 that extends towards the second accessory system 700B and is in fluid communication with a cold location of the gas turbine engine 10 separate from the reverse bleed system 500. In particular, for the embodiment depicted, the reverse bleed system 500 includes a reverse bleed duct 502 having an inlet 508 in fluid communication with a bypass passage 56 of the gas turbine engine 10, and the cold location that the second portion 712 of the cooling duct 704 is in fluid communication with is an operability bleed duct 182 of the turbomachine 16.

Notably, however, that in still other exemplary embodiments, the accessory cooling system 702 and reverse bleed system 500 may have still other configurations. For example, it will be appreciated that in other embodiments, the accessory cooling system 702 may include a flow control valve 708 located downstream of a second location along a reverse bleed duct 502 (e.g., the location where the accessory cooling system 702 is in fluid communication with the reverse bleed duct 502). With such an exemplary aspect, a second portion 712 of the accessory cooling system 702 may be in fluid communication with the reverse bleed duct 504 through the flow control valve 708, and the reverse bleed system 500 may further includes a separate RBS flow control valve (not shown herein) located downstream of the second location.

It will be appreciated that the embodiments provided hereinabove are provided by way of example only. Features of each of these embodiments may be combined with features of any other embodiment, unless clear from the context that it is not combinable, to create additional embodiments within the scope of this disclosure.

Figure 41:
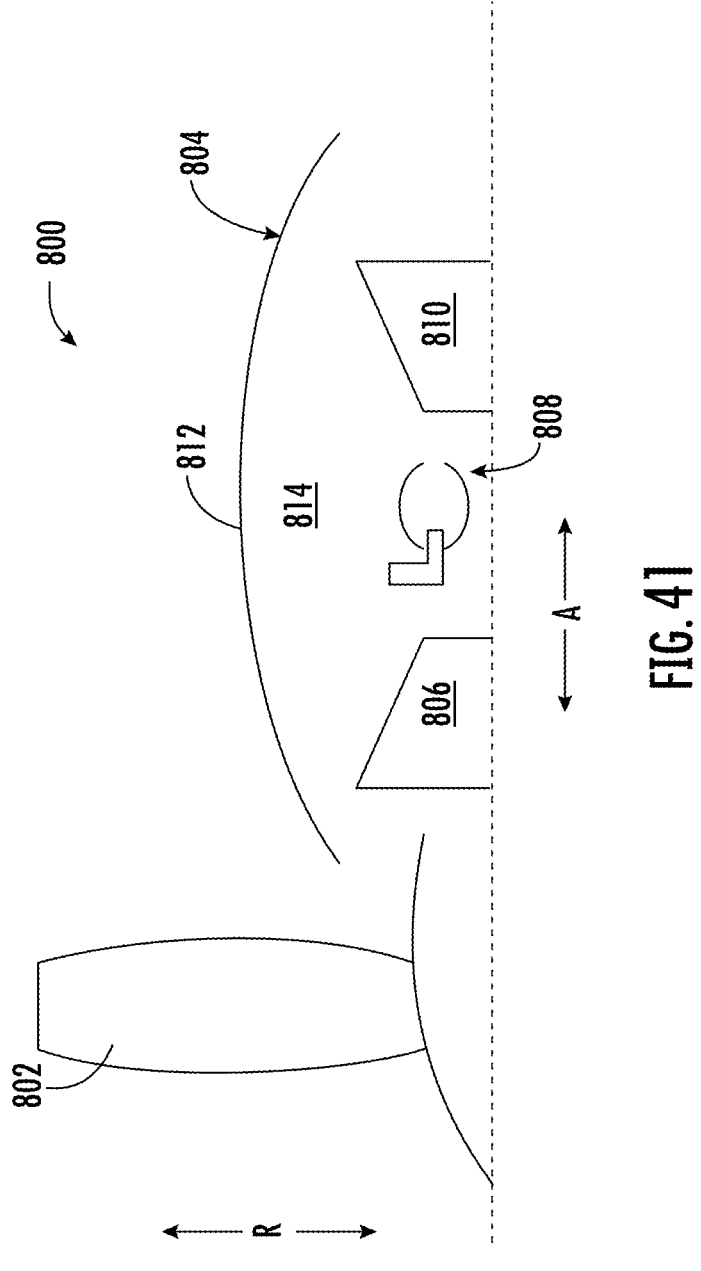
FIG. 41 is a cross-sectional view of a gas turbine engine in accordance with still another exemplary aspect of the present disclosure.

It will further be appreciated that while the exemplary embodiments described above are described in the context of a turbofan engine (e.g., having a fan, a turbomachine, and an outer nacelle surrounding the fan and at least a portion of the turbomachine), in other exemplary embodiments, the embodiments described herein may further be incorporated into an open rotor engine (e.g., having an unducted fan driven by a turbomachine). An example of such an engine is provided in FIG. 41, providing a schematic view of an open rotor engine 800 having an unducted fan 802 and a turbomachine 804. The turbomachine 804 generally includes a compressor section 806, a combustion section 808, and a turbine section 810 arranged in serial flow order. The turbomachine 804 further includes an outer cowl 812 surrounding the compressor section 806, combustion section 808, and turbine section 810. The outer cowl 812 defines in part an under-cowl area 814, which may house one or more of an ACC system, a CCA system, a reverse bleed system, an accessory cooling system, or the like.

Further aspects are provided by the subject matter of the following clauses:

A gas turbine engine comprising: a turbomachine comprising a compressor section having a low pressure compressor and a high pressure compressor, a combustion section defining a compressor discharge cavity, and a turbine section, the turbomachine defining a working gas flowpath and further comprising a cooled cooling air (CCA) system, the CCA system comprising: a cold side bleed assembly defining an inlet in fluid communication with the working gas flowpath through the compressor section at a location through the low pressure compressor, between the low pressure compressor and high pressure compressor, or both; a CCA heat exchanger in thermal communication with the cold side bleed assembly downstream of the inlet of the cold side bleed assembly; and a hot side bleed assembly defining an inlet in fluid communication with the working gas flowpath through the compressor section, at the compressor discharge cavity, or both, the hot side bleed assembly in thermal communication with the CCA heat exchanger to cool an airflow through the hot side bleed assembly, the hot side bleed assembly further in thermal communication with a hot component of the turbomachine to cool the hot component of the turbomachine.

The gas turbine engine of any preceding clause, wherein the turbine section comprises a high pressure turbine, and wherein the hot component is the high pressure turbine.

The gas turbine engine of any preceding clause, wherein the hot component is a rotor bore of a turbine of the turbine section, an airfoil of the turbine, a rotor bore of the high pressure compressor, an airfoil of the high pressure compressor, a sump within the turbine section, a turbine midframe, a turbine rear frame, or a combination thereof.

The gas turbine engine of any preceding clause, wherein the turbomachine defines an under-cowl cavity, and wherein the CCA heat exchanger is located in the under-cowl cavity of the turbomachine.

The gas turbine engine of any preceding clause, wherein the gas turbine engine comprises a bifurcation defining a bifurcation cavity, wherein the turbomachine defines an under-cowl cavity, and wherein the CCA heat exchanger is located in the under-cowl cavity of the turbomachine, the bifurcation cavity, or both.

The gas turbine engine of any preceding clause, wherein the gas turbine engine is turbofan engine comprising a fan driven by the turbomachine and an outer nacelle surrounding the fan and defining a bypass passage with the turbomachine.

The gas turbine engine of any preceding clause, wherein the turbomachine comprises an operability bleed assembly defining an operability bleed duct extending between an inlet in fluid communication with the working gas flowpath at a location between the low pressure compressor and high pressure compressor and an outlet, wherein the inlet of the cold side bleed assembly is in fluid communication with the operability bleed duct.

The gas turbine engine of any preceding clause, wherein the operability bleed assembly further comprises a variable bleed valve in communication with the operability bleed duct at a location upstream of the inlet of the cold side bleed assembly.

The gas turbine engine of any preceding clause, wherein the inlet is in direct fluid communication with the working gas flowpath.

The gas turbine engine of any preceding clause, wherein the CCA heat exchanger is a first CCA heat exchanger, wherein the CCA system further comprises a second CCA heat exchanger, wherein the cold side bleed assembly comprises a first portion and a second portion arranged in parallel flow, wherein the first portion is in thermal communication with the first CCA heat exchanger and the second portion is in thermal communication with the second CCA heat exchanger.

The gas turbine engine of any preceding clause, wherein the hot side bleed assembly is a first hot side bleed assembly and is in thermal communication with the first CCA heat exchanger, wherein the CCA system further comprises a second hot side bleed assembly in thermal communication with the second CCA heat exchanger.

The gas turbine engine of any preceding clause, wherein the hot component is a first hot component, wherein the CCA heat exchanger is a first CCA heat exchanger, wherein the CCA system further comprises a third CCA heat exchanger, wherein the cold side bleed assembly comprises a first portion and a third portion arranged in parallel flow, wherein the first portion is in thermal communication with the first CCA heat exchanger and the third portion is in thermal communication with the third CCA heat exchanger, and wherein the hot side bleed assembly is a first hot side bleed assembly and is in thermal communication with the first CCA heat exchanger, wherein the CCA system further comprises a third hot side bleed assembly in thermal communication with the third CCA heat exchanger and a hot component of the gas turbine engine separate from the first hot component.

The gas turbine engine of any preceding clause, wherein the CCA system further comprises a flow control valve in operable communication with the cold side bleed assembly.

The gas turbine engine of any preceding clause, wherein the CCA system further comprises a flow control valve in operable communication with the hot side bleed assembly.

The gas turbine engine of any preceding clause, wherein the inlet of the hot side bleed assembly is in fluid communication with the working gas flowpath at the compressor discharge cavity.

The gas turbine engine of any preceding clause, wherein the hot side bleed assembly comprises a first portion in thermal communication with the CCA heat exchanger and a bypass portion bypassing the CCA heat exchanger.

The gas turbine engine of any preceding clause, wherein the gas turbine engine defines an overall pressure ratio greater than or equal to 50:1 and less than or equal to 70:1 when operated at a rated speed during standard day operating conditions.

The gas turbine engine of any preceding clause, further comprising: a fan section having a fan driven by the turbomachine, wherein the fan defines a fan pressure ratio less than or equal to 1.6 when the engine is operated at a cruise condition.

The gas turbine engine of any preceding clause, wherein the gas turbine engine is an open rotor gas turbine engine.

The gas turbine engine of any preceding clause, wherein the gas turbine engine is a turbofan engine.

A gas turbine engine comprising: a bifurcation; and a turbomachine comprising a compressor section, a combustion section defining a compressor discharge cavity, and a turbine section, the turbomachine defining a working gas flowpath and further comprising a cooled cooling air (CCA) system, the CCA system comprising: a cold side bleed assembly defining an inlet positioned to be in fluid communication with an airflow over the bifurcation; a CCA heat exchanger in thermal communication with the cold side bleed assembly downstream of the inlet of the cold side bleed assembly; and a hot side bleed assembly defining an inlet in fluid communication with the working gas flowpath through the compressor section, at the compressor discharge cavity, or both, the hot side bleed assembly in thermal communication with the CCA heat exchanger to cool an airflow through the hot side bleed assembly, the hot side bleed assembly further in thermal communication with a hot component of the turbomachine to cool the hot component of the turbomachine.

The gas turbine engine of any preceding clause, wherein the inlet is located on a flowpath surface of the bifurcation.

The gas turbine engine of any preceding clause, wherein the cold side bleed assembly comprises a scoop at the inlet.

The gas turbine engine of any preceding clause, wherein the cold side bleed assembly comprises a variable geometry component at the inlet.

The gas turbine engine of any preceding clause, wherein the bifurcation is an upper bifurcation of the gas turbine engine.

The gas turbine engine of any preceding clause, wherein the gas turbine engine is turbofan engine comprising a fan driven by the turbomachine and an outer nacelle surrounding the fan and defining a bypass passage with the turbomachine, wherein the upper bifurcation extends between the turbomachine and the outer nacelle.

The gas turbine engine of any preceding clause, further comprising: an accessory system cooling system comprising a cooling system inlet on the bifurcation and a duct in fluid communication with the cooling system inlet, wherein the inlet is in fluid communication with the duct of the accessory system cooling system at a location downstream of the cooling system inlet.

The gas turbine engine of any preceding clause, wherein the accessory system cooling system is an environmental control system.

The gas turbine engine of any preceding clause, wherein the CCA system further comprises a flow control valve, wherein the flow control valve is located at the inlet to control an airflow split between the duct of the accessory system cooling system and the cold side bleed assembly.

The gas turbine engine of any preceding clause, wherein the turbine section comprises a high pressure turbine, and wherein the hot component is the high pressure turbine.

The gas turbine engine of any preceding clause, wherein the hot component is a rotor bore of a turbine of the turbine section, an airfoil of the turbine, a rotor bore of the high pressure compressor, an airfoil of the high pressure compressor, a sump within the turbine section, a turbine midframe, a turbine rear frame, or a combination thereof.

The gas turbine engine of any preceding clause, wherein the turbomachine defines an under-cowl cavity, and wherein the CCA heat exchanger is located in the under-cowl cavity of the turbomachine.

The gas turbine engine of any preceding clause, wherein the bifurcation defines a bifurcation cavity, wherein the turbomachine defines an under-cowl cavity, and wherein the CCA heat exchanger is located in the under-cowl cavity of the turbomachine, the bifurcation cavity of the bifurcation, or both.

The gas turbine engine of any preceding clause, wherein the CCA heat exchanger is a first CCA heat exchanger, wherein the CCA system further comprises a second CCA heat exchanger, wherein the cold side bleed assembly comprises a first portion and a second portion arranged in parallel flow, wherein the first portion is in thermal communication with the first CCA heat exchanger and the second portion is in thermal communication with the second CCA heat exchanger.

The gas turbine engine of any preceding clause, wherein the hot side bleed assembly comprises a first portion and a second portion arranged in parallel flow, wherein the first portion is in thermal communication with the first CCA heat exchanger and the second portion is in thermal communication with the second CCA heat exchanger.

The gas turbine engine of any preceding clause, wherein the CCA system further comprises a flow control valve in operable communication with the cold side bleed assembly.

The gas turbine engine of any preceding clause, wherein the CCA system further comprises a flow control valve in operable communication with the hot side bleed assembly.

The gas turbine engine of any preceding clause, wherein the gas turbine engine defines an overall pressure ratio greater than or equal to 50:1 and less than or equal to 70:1 when operated at a rated speed during standard day operating conditions.

The gas turbine engine of any preceding clause, further comprising: a fan section having a fan driven by the turbomachine, wherein the fan defines a fan pressure ratio less than or equal to 1.6 when the engine is operated at a cruise condition.

The gas turbine engine of any preceding clause, wherein the inlet of the hot side bleed assembly is in fluid communication with the working gas flowpath at the compressor discharge cavity.

A gas turbine engine comprising: an extension; and a turbomachine comprising a compressor section, a combustion section defining a compressor discharge cavity, and a turbine section, the turbomachine defining a working gas flowpath and further comprising a cooled cooling air (CCA) system, the extension coupled to the turbomachine and extending outwardly from the turbomachine, the CCA system comprising: a cold side bleed assembly defining an inlet positioned to be in fluid communication with an airflow over the extension; a CCA heat exchanger in thermal communication with the cold side bleed assembly downstream of the inlet of the cold side bleed assembly; and a hot side bleed assembly defining an inlet in fluid communication with the working gas flowpath through the compressor section, at the compressor discharge cavity, or both, the hot side bleed assembly in thermal communication with the CCA heat exchanger to cool an airflow through the hot side bleed assembly, the hot side bleed assembly further in thermal communication with a hot component of the turbomachine to cool the hot component of the turbomachine.

A gas turbine engine comprising: a turbomachine comprising a compressor section, a combustion section defining a compressor discharge cavity, and a turbine section, the turbomachine defining a working gas flowpath and further comprising a cooled cooling air (CCA) system, the CCA system comprising: a hot side bleed assembly defining an inlet in fluid communication with the working gas flowpath through the compressor section, at the compressor discharge cavity, or both, the hot side bleed assembly further in thermal communication with a hot component of the turbomachine to cool the hot component of the turbomachine; a CCA heat exchanger in thermal communication with the hot side bleed assembly downstream of the inlet of the hot side bleed assembly; and a cold side bleed assembly defining an inlet in fluid communication with a cold location of the gas turbine engine and an outlet, the cold side bleed assembly in thermal communication with the CCA heat exchanger for cooling an airflow through the hot side bleed assembly, the outlet of the cold side bleed assembly in fluid communication with the working gas flowpath at a location downstream of the turbine section, with a core cowl vent of the turbomachine, with a passage over the turbomachine, or a combination thereof.

The gas turbine engine of any preceding clause, wherein the outlet of the cold side bleed assembly is in fluid communication with the core cowl vent of the turbomachine.

The gas turbine engine of any preceding clause, wherein the cold side bleed assembly includes one or more ducts extending from the CCA heat exchanger toward the core cowl vent to a location at an aft end of a low pressure turbine of the turbine section or to a location aft of the low pressure turbine of the turbine section.

The gas turbine engine of any preceding clause, wherein the turbomachine defines an under-cowl flowpath for an airflow through the outlet of the cold side bleed assembly to the core cowl vent, and wherein the turbomachine comprises a heat shield between the under-cowl flowpath and a low pressure turbine of the turbine section.

The gas turbine engine of any preceding clause, wherein the cold side bleed assembly comprises a diffuser located at the outlet.

The gas turbine engine of any preceding clause, wherein the turbomachine comprises a transient bleed assembly defining a transient bleed duct extending between an inlet and an outlet, wherein the inlet is in fluid communication with the working gas flowpath at a high pressure compressor of the compressor section or the compressor discharge cavity, wherein the outlet of the cold side bleed assembly is in fluid communication with the transient bleed duct.

The gas turbine engine of any preceding clause, further comprising: a bifurcation connected to the turbomachine, wherein the outlet of the cold side bleed assembly is in fluid communication with an opening in a flowpath surface of the bifurcation at a trailing edge of the bifurcation.

The gas turbine engine of any preceding clause, wherein the cold location of the gas turbine engine is the working gas flowpath through a low pressure compressor, between the low pressure compressor and a high pressure compressor, or both.

The gas turbine engine of any preceding clause, further comprising: a bifurcation connected to the turbomachine, wherein the cold location of the gas turbine engine is a flowpath surface of the bifurcation.

The gas turbine engine of any preceding clause, wherein the cold side bleed assembly comprises a scoop at the inlet.

The gas turbine engine of any preceding clause, wherein the cold side bleed assembly comprises a variable geometry component at the inlet.

The gas turbine engine of any preceding clause, wherein the bifurcation is an upper bifurcation of the gas turbine engine.

The gas turbine engine of any preceding clause, wherein the gas turbine engine defines a bypass passage over the turbomachine, and wherein the cold location is the bypass passage.

The gas turbine engine of any preceding clause, wherein the turbine section comprises a high pressure turbine, and wherein the hot component is the high pressure turbine.

The gas turbine engine of any preceding clause, wherein the hot component is a rotor bore of a turbine of the turbine section, an airfoil of the turbine, a rotor bore of the high pressure compressor, an airfoil of the high pressure compressor, a sump within the turbine section, a turbine midframe, a turbine rear frame, or a combination thereof.

The gas turbine engine of any preceding clause, wherein the turbomachine defines an under-cowl cavity, and wherein the CCA heat exchanger is located in the under-cowl cavity of the turbomachine.

The gas turbine engine of any preceding clause, wherein the bifurcation defines a bifurcation cavity, wherein the turbomachine defines an under-cowl cavity, and wherein the CCA heat exchanger is located in the under-cowl cavity of the turbomachine, the bifurcation cavity of the bifurcation, or both.

The gas turbine engine of any preceding clause, wherein the CCA system further comprises a flow control valve in operable communication with the cold side bleed assembly.

The gas turbine engine of any preceding clause, wherein the CCA system further comprises a flow control valve in operable communication with the hot side bleed assembly.

The gas turbine engine of any preceding clause, wherein the inlet of the hot side bleed assembly is in fluid communication with the working gas flowpath at the compressor discharge cavity.

The gas turbine engine of any preceding clause, wherein the turbomachine comprises a transient bleed assembly defining a transient bleed duct extending between an inlet and an outlet, wherein the inlet is in fluid communication with the hot side bleed assembly, wherein the outlet of the cold side bleed assembly is in fluid communication with the transient bleed duct.

The gas turbine engine of any preceding clause, wherein the outlet of the transient bleed duct is in fluid communication with the hot side bleed assembly at a location upstream of the CCA heat exchanger.

A gas turbine engine comprising: a turbomachine comprising a compressor section, a combustion section defining a compressor discharge cavity, and a turbine section, the turbomachine further comprising a cooled cooling air (CCA) system, the CCA system comprising: a CCA heat exchanger; a cold side bleed assembly defining an inlet in fluid communication with a cold location of the gas turbine engine and an outlet; a hot side bleed assembly defining an inlet in fluid communication with the working gas flowpath through the compressor section, at the compressor discharge cavity, or both, the CCA heat exchanger in thermal communication with both the cold side bleed assembly and the hot side bleed assembly to cool an airflow through the hot side bleed assembly, the hot side bleed assembly further in thermal communication with a hot component of the turbomachine to cool the hot component of the turbomachine; and a valve assembly operable with the cold side bleed assembly and with the hot side bleed assembly, the valve assembly structured to modulate airflows through the cold side bleed assembly and through the hot side bleed assembly in tandem.

The gas turbine engine of any preceding clause, wherein the valve assembly comprises a cold side valve section operable with the cold side bleed assembly, a hot side valve section operable with the hot side bleed assembly, and an actuator coupled to both the cold side valve section and the hot side valve section.

The gas turbine engine of any preceding clause, wherein the valve assembly further comprises a shaft moveable by the actuator, the actuator coupled to both the cold side valve section and the hot side valve section through the shaft.

The gas turbine engine of any preceding clause, wherein the actuator is a rotary actuator operable to rotate the shaft about an axis of the shaft.

The gas turbine engine of any preceding clause, wherein the actuator is a linear actuator operable to move the shaft along an axis of the shaft.

The gas turbine engine of any preceding clause, wherein the valve assembly further comprises a shaft, a first rod, and a second rod, wherein the actuator is coupled to the shaft, wherein the first rod and second rod are rotatably coupled to an end of the shaft opposite the actuator at a first connection point, wherein the first rod is further coupled to the cold side valve section, and wherein the second rod is further coupled to the hot side valve section.

The gas turbine engine of any preceding clause, wherein the valve assembly is operable with the cold side bleed assembly at a location upstream of the CCA heat exchanger, and with the hot side bleed assembly at a location upstream of the CCA heat exchanger.

The gas turbine engine of any preceding clause, wherein the valve assembly is operable with the cold side bleed assembly at a location upstream of the CCA heat exchanger, and with the hot side bleed assembly at a location downstream of the CCA heat exchanger.

The gas turbine engine of any preceding clause, wherein the turbine section comprises a high pressure turbine, and wherein the hot component is the high pressure turbine.

The gas turbine engine of any preceding clause, wherein the hot component is a rotor bore of a turbine of the turbine section, an airfoil of the turbine, a rotor bore of the high pressure compressor, an airfoil of the high pressure compressor, a sump within the turbine section, a turbine midframe, a turbine rear frame, or a combination thereof.

The gas turbine engine of any preceding clause, wherein the turbomachine defines an under-cowl cavity, and wherein the CCA heat exchanger and valve assembly are each located in the under-cowl cavity of the turbomachine.

The gas turbine engine of any preceding clause, further comprising: a bifurcation coupled to the turbomachine, wherein the bifurcation defines an inner cavity, wherein the turbomachine defines an under-cowl cavity, and wherein the CCA heat exchanger and valve assembly are each located in the under-cowl cavity of the turbomachine, the inner cavity of the bifurcation, or both.

The gas turbine engine of any preceding clause, wherein the cold side bleed assembly further defines an outlet, wherein the outlet of the cold side bleed assembly in fluid communication with the working gas flowpath at a location downstream of the turbine section, with a core cowl vent of the turbomachine, a passage over the turbomachine, or a combination thereof.

The gas turbine engine of any preceding clause, wherein the cold location of the gas turbine engine is the working gas flowpath through a low pressure compressor, between the low pressure compressor and a high pressure compressor, or both.

The gas turbine engine of any preceding clause, wherein the gas turbine engine defines a bypass passage over the turbomachine, and wherein the cold location is the bypass passage.

The gas turbine engine of any preceding clause, wherein the turbine section comprises a high pressure turbine, and wherein the hot component is the high pressure turbine.

A method of operating a valve assembly for a gas turbine engine, the method comprising: receiving data indicative of an operating condition of the gas turbine engine; and in response to receiving the data indicative of the operating condition of the gas turbine engine, actuating a valve assembly of a cooled cooling air (CCA) system to modulate a first airflow through a cold side bleed assembly of the CCA system and a second airflow through a hot side bleed assembly of the CCA system in tandem.

The method of any preceding clause, wherein the data indicative of the operating condition is data indicative of a power level of the gas turbine engine.

The method of any preceding clause, wherein the valve assembly comprises a cold side valve section operable with the cold side bleed assembly, a hot side valve section operable with the hot side bleed assembly, and an actuator coupled to both the cold side valve section and the hot side valve section, and wherein actuating the valve assembly comprises moving a shaft of the actuator assembly with the actuator, the shaft coupled to both the cold side valve section and the hot side valve section.

The method of any preceding clause, further comprising: receiving data indicative of a deterioration parameter of one or more aspects of the gas turbine engine; and in response to receiving the data indicative of a deterioration parameter, actuating the valve assembly.

A gas turbine engine comprising: a turbomachine comprising a compressor section, a combustion section defining a compressor discharge cavity, and a turbine section comprising a turbine, the turbomachine further comprising: an active clearance control (ACC) system comprising an inlet, a heat transfer assembly arranged around the turbine of the turbine section, and an ACC duct assembly extending from the inlet to the heat transfer assembly; and a cooled cooling air (CCA) system comprising: a CCA heat exchanger; a hot side bleed assembly defining an inlet in fluid communication with the working gas flowpath through the compressor section, at the compressor discharge cavity, or both, the hot side bleed assembly further in thermal communication with a hot component of the turbomachine to cool the hot component of the turbomachine; and a cold side bleed assembly in thermal communication with an airflow through the hot side bleed assembly across the CCA heat exchanger, the cold side bleed assembly defining an inlet in fluid communication with the ACC duct assembly.

The gas turbine engine of any preceding clause, wherein the turbine is a first turbine and wherein the heat transfer assembly is a first heat transfer assembly, wherein the turbine section further comprises a second turbine and wherein the ACC system further comprises a second heat transfer assembly arranged around the second turbine, wherein the ACC duct assembly extends to both the first heat transfer assembly and the second heat transfer assembly.

The gas turbine engine of any preceding clause, wherein the ACC duct assembly comprises a first portion that extends to the first heat transfer assembly, a second portion that extends to the second heat transfer assembly, and an upstream portion that extends from the inlet of the ACC system to the first portion and the second portion.

The gas turbine engine of any preceding clause, wherein the inlet of the cold side bleed assembly is in fluid communication with the upstream portion of ACC duct assembly through a variable control valve of the CCA system.

The gas turbine engine of any preceding clause, wherein the ACC system comprises one or more flow control valves operable with the first portion of the ACC duct assembly, the second portion of the ACC duct assembly, or both.

The gas turbine engine of any preceding clause, wherein the ACC system comprises a blower in fluid communication with the upstream portion of the ACC duct assembly for urging an airflow through the ACC duct assembly.

The gas turbine engine of any preceding clause, wherein the inlet of the cold side bleed assembly is in fluid communication with the upstream portion of ACC duct assembly at a location downstream of the blower.

The gas turbine engine of any preceding clause, wherein the CCA system comprises a blower in fluid communication with the cold side bleed assembly for urging an airflow through the cold side bleed assembly.

The gas turbine engine of any preceding clause, wherein the gas turbine engine defines a bypass passage over the turbomachine, and wherein the inlet of the ACC duct assembly is in fluid communication with the bypass passage.

The gas turbine engine of any preceding clause, wherein the ACC system comprises a blower in fluid communication with the second portion of the ACC duct assembly for urging an airflow through the second portion of the ACC duct assembly.

The gas turbine engine of any preceding clause, wherein the inlet of the cold side bleed assembly is in fluid communication with the second portion of ACC duct assembly at a location downstream of the blower.

The gas turbine engine of any preceding clause, wherein the cold side bleed assembly further defines an outlet, wherein the outlet is selectively in fluid communication with the first portion of the ACC duct assembly, with the second portion of the ACC duct assembly, or both.

The gas turbine engine of any preceding clause, wherein the cold side bleed assembly further defines an outlet, wherein the outlet is selectively in fluid communication with the ACC duct assembly at a location upstream of the heat transfer assembly.

The gas turbine engine of any preceding clause, wherein the inlet of the ACC system is in fluid communication with a cold location of the gas turbine engine, wherein the cold location of the gas turbine engine is the working gas flowpath through a low pressure compressor, between the low pressure compressor and a high pressure compressor, or both.

The gas turbine engine of any preceding clause, wherein the turbomachine comprises an operability bleed assembly defining an operability bleed duct extending between an inlet in fluid communication with the working gas flowpath at a location between the low pressure compressor and high pressure compressor and an outlet, wherein the inlet of the ACC system is in fluid communication with the operability bleed duct.

The gas turbine engine of any preceding clause, wherein the inlet of the ACC system is in fluid communication with a cold location of the gas turbine engine, wherein the gas turbine engine further comprises: a bifurcation connected to the turbomachine, wherein the cold location of the gas turbine engine is a flowpath surface of the bifurcation.

The gas turbine engine of any preceding clause, wherein the turbine section comprises a high pressure turbine, and wherein the hot component is the high pressure turbine.

The gas turbine engine of any preceding clause, wherein the hot component is a rotor bore of a turbine of the turbine section, an airfoil of the turbine, a rotor bore of a high pressure compressor, an airfoil of the high pressure compressor, a sump within the turbine section, a turbine midframe, a turbine rear frame, or a combination thereof.

The gas turbine engine of any preceding clause, wherein the turbomachine defines an under-cowl cavity, and wherein the CCA heat exchanger is located in the under-cowl cavity of the turbomachine.

The gas turbine engine of any preceding clause, wherein the inlet of the hot side bleed assembly is in fluid communication with the working gas flowpath at the compressor discharge cavity.

A gas turbine engine comprising: a turbomachine comprising a compressor section, a combustion section defining a compressor discharge cavity, and a turbine section collectively defining in part a working gas flowpath, the turbomachine further comprising: a reverse bleed system comprising a reverse bleed duct and an RBS blower in fluid communication with the reverse bleed duct, the reverse bleed duct in fluid communication with the working gas flowpath; and a cooled cooling air (CCA) system, the CCA system comprising: a CCA heat exchanger; a hot side bleed assembly defining an inlet in fluid communication with the working gas flowpath through the compressor section, at the compressor discharge cavity, or both, the hot side bleed assembly further in thermal communication with a hot component of the turbomachine to cool the hot component of the turbomachine; and a cold side bleed assembly in thermal communication with an airflow through the hot side bleed assembly across the CCA heat exchanger, the cold side bleed assembly defining an inlet in fluid communication with the reverse bleed duct.

The gas turbine engine of any preceding clause, wherein the CCA system further comprises a flow control valve, wherein the inlet of the cold side bleed assembly is in fluid communication with the reverse bleed duct through the flow control valve.

The gas turbine engine of any preceding clause, wherein the flow control valve is moveable between a first position in which an airflow through the reverse bleed duct is directed into the working gas flowpath and a second position in which the airflow through the reverse bleed duct is directed into the cold side bleed assembly.

The gas turbine engine of any preceding clause, wherein the flow control valve is moveable to one or more intermediate positions to split the airflow through the reverse bleed duct to the working gas flowpath and to the cold side bleed assembly.

The gas turbine engine of any preceding clause, wherein the flow control valve is moveable to a closed position in which an airflow through the reverse bleed duct is prevented from reaching either the working gas flowpath or the cold side bleed assembly.

The gas turbine engine of any preceding clause, wherein the blower of the reverse bleed assembly is positioned upstream of the flow control valve within the reverse bleed duct.

The gas turbine engine of any preceding clause, wherein the compressor section, the combustion section, or both defines a compressor bleed plenum, wherein the reverse bleed duct is in fluid communication with the working gas flowpath through the compressor bleed plenum.

The gas turbine engine of any preceding clause, wherein the reverse bleed duct is further in in fluid communication with a cold location of the gas turbine engine as an airflow source for the reverse bleed system.

The gas turbine engine of any preceding clause, further comprising: a bifurcation connected to the turbomachine, wherein the cold location of the gas turbine engine is a flowpath surface of the bifurcation.

The gas turbine engine of any preceding clause, wherein the gas turbine engine defines a bypass passage over the turbomachine, and wherein the cold location is the bypass passage, the working gas flowpath through a low pressure compressor, the working gas flowpath between the low pressure compressor and a high pressure compressor, or a combination thereof.

The gas turbine engine of any preceding clause, wherein the turbomachine comprises an operability bleed assembly having an operability bleed duct extending between an inlet in fluid communication with the working gas flowpath at a location between the low pressure compressor and the high pressure compressor and an outlet, wherein an inlet of the reverse bleed duct is in fluid communication with the operability bleed duct.

The gas turbine engine of any preceding clause, wherein the outlet of the operability bleed duct is in fluid communication with the bypass passage, wherein the cold location is the working gas flowpath between the low pressure compressor and the high pressure compressor when the gas turbine engine is in an operating condition, and wherein the cold location is the bypass passage when the gas turbine engine is in a shutdown operating condition.

The gas turbine engine of any preceding clause, wherein the reverse bleed duct comprises a first portion and a second portion, wherein the cold side bleed assembly includes a first portion and a second portion, wherein the first portion of the cold side bleed assembly is integrated with the first portion of the reverse bleed duct.

The gas turbine engine of any preceding clause, wherein the CCA heat exchanger is positioned within the first portion of the cold side bleed assembly.

The gas turbine engine of any preceding clause, wherein the RBS blower is positioned within the first portion of the reverse bleed duct at a location downstream of the CCA heat exchanger.

A method of operating a gas turbine engine, the method comprising: receiving data indicative of an operating condition of the gas turbine engine; and in response to receiving the data indicative of the operating condition of the gas turbine engine, actuating a flow control valve of a cooled cooling air (CCA) system to distribute an airflow from a reverse bleed duct of a reverse bleed assembly between a cold side bleed assembly of the CCA system and a working gas flowpath of a turbomachine of the gas turbine engine.

The method of any preceding clause, wherein the operating condition is a shutdown operating condition, and wherein actuating the flow control valve of the CCA system comprises actuating the flow control valve of the CCA system to distribute the airflow from the reverse bleed duct to the working gas flowpath of the turbomachine of the gas turbine engine.

The method of any preceding clause, wherein the operating condition is a flight operating condition, and wherein actuating the flow control valve of the CCA system comprises actuating the flow control valve of the CCA system to distribute the airflow from the reverse bleed duct to the cold side bleed assembly of the CCA system.

The method of any preceding clause, wherein the operating condition is a first operation condition, and wherein the method further comprises: powering a blower of the reverse bleed system with a first power source in response to receiving the data indicative of the gas turbine engine being in the first operating condition; receiving data indicative of a second operating condition of the gas turbine, the second operating condition being different than the first operating condition; and in response to receiving the data indicative of the second operating condition, powering the blower of the reverse bleed system with a second power source separate from the first power source.

The method of any preceding clause, wherein the operating condition is a shutdown operating condition, and wherein actuating the flow control valve of the CCA system comprises: actuating the flow control valve of the CCA system to distribute the airflow from the reverse bleed duct to both the working gas flowpath of the turbomachine and the cold side bleed assembly for a first amount of time; and actuating the flow control valve of the CCA system to distribute the airflow from the reverse bleed duct to just the working gas flowpath of the turbomachine for a second amount of time after the first amount of time.

A gas turbine engine comprising: a turbomachine comprising a compressor section, a combustion section defining a compressor discharge cavity, and a turbine section collectively defining in part a working gas flowpath, the turbomachine further comprising; a reverse bleed system comprising a reverse bleed duct and an RBS blower in fluid communication with the reverse bleed duct, the reverse bleed duct in fluid communication with the working gas flowpath; and an active clearance control (ACC) system comprising an inlet, a heat transfer assembly arranged around the turbine of the turbine section, and an ACC duct assembly extending from the inlet to the heat transfer assembly, the inlet of the ACC system in fluid communication with the reverse bleed duct.

The gas turbine engine of any preceding clause, wherein the reverse bleed system further comprises a flow control valve, wherein the inlet of the ACC system is in fluid communication with the reverse bleed duct through the flow control valve.

The gas turbine engine of any preceding clause, wherein the turbine is a first turbine and wherein the heat transfer assembly is a first heat transfer assembly, wherein the turbine section further comprises a second turbine and wherein the ACC system further comprises a second heat transfer assembly arranged around the second turbine, wherein the ACC duct assembly extends to both the first heat transfer assembly and the second heat transfer assembly.

The gas turbine engine of any preceding clause, wherein the ACC duct assembly comprises a first portion that extends to the first heat transfer assembly, a second portion that extends to the second heat transfer assembly, and an upstream portion that extends from the inlet of the ACC system to the first portion and the second portion.

The gas turbine engine of any preceding clause, wherein the ACC system comprises one or more flow control valves operable with the first portion of the ACC duct assembly, the second portion of the ACC duct assembly, the upstream portion of the ACC duct assembly, or a combination thereof.

The gas turbine engine of any preceding clause, wherein the ACC duct assembly comprises a first portion that extends to the first heat transfer assembly and is in fluid communication with the reverse bleed duct at a first location along the reverse bleed duct, wherein the ACC duct assembly further comprises a second portion that extends to the second heat transfer assembly and is in fluid communication with the reverse bleed duct at a second location along the reverse bleed duct.

The gas turbine engine of any preceding clause, wherein the RBS blower is in fluid communication with the reverse bleed duct at a third location between the first location and the second location.

The gas turbine engine of any preceding clause, wherein the reverse bleed system comprises a flow control valve, wherein the flow control valve is a variable three-way valve.

The gas turbine engine of any preceding clause, wherein the reverse bleed system further comprises a flow control valve at the second location along the reverse bleed duct, wherein the second portion is in fluid communication with the reverse bleed duct through the flow control valve.

The gas turbine engine of any preceding clause, wherein the ACC system further comprises a flow control valve downstream of the second location, and wherein the reverse bleed system further includes an RBS flow control valve downstream of the second location.

The gas turbine engine of any preceding clause, wherein the reverse bleed system comprises a check valve at a location downstream of the inlet of the ACC system, wherein the check valve is positioned to prevent an airflow from an outlet of the Reverse bleed duct toward the blower.

The gas turbine engine of any preceding clause, wherein the compressor section, the combustion section, or both defines a compressor bleed plenum, wherein the reverse bleed duct is in fluid communication with the working gas flowpath across the compressor bleed plenum.

The gas turbine engine of any preceding clause, wherein the reverse bleed duct is further in in fluid communication with a cold location of the gas turbine engine as an airflow source for the reverse bleed system.

The gas turbine engine of any preceding clause, further comprising: a bifurcation connected to the turbomachine, wherein the cold location of the gas turbine engine is a flowpath surface of the bifurcation.

The gas turbine engine of any preceding clause, wherein the gas turbine engine defines a bypass passage over the turbomachine, and wherein the cold location is the bypass passage, the working gas flowpath through a low pressure compressor, the working gas flowpath between the low pressure compressor and a high pressure compressor, or a combination thereof.

The gas turbine engine of any preceding clause, wherein the turbomachine comprises an operability bleed assembly defining an operability bleed duct extending between an inlet in fluid communication with the working gas flowpath at a location between the low pressure compressor and the high pressure compressor and an outlet, wherein the inlet of the reverse bleed system is in fluid communication with the operability bleed duct.

The gas turbine engine of any preceding clause, wherein the outlet of the operability bleed duct is in fluid communication with the bypass passage, wherein the cold location is the working gas flowpath between the low pressure compressor and the high pressure compressor when the gas turbine engine is in an operating condition, and wherein the cold location is the bypass passage when the gas turbine engine is in a shutdown operating condition.

The gas turbine engine of any preceding clause, wherein the blower is a variable speed blower.

The gas turbine engine of any preceding clause, further comprising: a fan section having a fan driven by the turbomachine, wherein the fan defines a fan pressure ratio less than or equal to 1.6 when the engine is operated at a cruise condition.

The gas turbine engine of any preceding clause, wherein the gas turbine engine is an open rotor gas turbine engine.

A gas turbine engine comprising: an accessory system; and a turbomachine comprising a compressor section, a combustion section defining a compressor discharge cavity, and a turbine section collectively defining in part a working gas flowpath, the turbomachine further comprising: a reverse bleed system comprising a reverse bleed duct and an RBS blower in fluid communication with the reverse bleed duct, the reverse bleed duct in fluid communication with the working gas flowpath; and an accessory cooling system comprising a cooling duct defining an inlet in fluid communication with the reverse bleed duct, the accessory cooling duct comprising a cooling tip oriented towards the accessory system to provide an airflow onto the accessory system.

The gas turbine engine of any preceding clause, wherein the accessory cooling system further comprises a flow control valve, wherein the inlet of the accessory cooling system is in fluid communication with the reverse bleed duct through the flow control valve The gas turbine engine of any preceding clause, wherein the flow control valve is a variable three-way valve.

The gas turbine engine of any preceding clause, wherein the gas turbine engine further includes a plurality of accessory systems, wherein the accessory system is a first accessory system of the plurality of accessory systems, wherein the accessory cooling system further comprises a plurality of cooling tips, wherein the cooling tip is a first cooling tip of the plurality of cooling tips, wherein cooling duct comprises a plurality of branches, wherein each of the plurality of branches defines a respective one of the plurality of cooling tips, and wherein each cooling tip of the plurality of cooling tips is oriented towards to a respective accessory system of the plurality of accessory systems to provide an airflow onto the respective accessory system.

The gas turbine engine of any preceding clause, wherein the accessory system is a first accessory system, wherein the gas turbine engine further comprises a second accessory system, wherein the cooling duct comprises a first portion that extends towards the first accessory system and is in fluid communication with the reverse bleed duct at a first location along the reverse bleed duct, wherein the cooling duct further comprises a second portion that extends towards the second accessory system and is in fluid communication with the reverse bleed duct at a second location along the reverse bleed duct.

The gas turbine engine of any preceding clause, wherein the accessory cooling system further comprises a flow control valve at the second location along the reverse bleed duct, wherein the second portion is in fluid communication with the reverse bleed duct through the flow control valve.

The gas turbine engine of any preceding clause, wherein the accessory cooling system further comprises a flow control valve downstream of the second location along the reverse bleed duct, wherein the second portion is in fluid communication with the reverse bleed duct through the flow control valve, and wherein the reverse bleed system further includes an RBS flow control valve downstream of the second location.

The gas turbine engine of any preceding clause, wherein the RBS blower is in fluid communication with the reverse bleed duct at a location upstream of the inlet of the cooling duct.

The gas turbine engine of any preceding clause, wherein the reverse bleed system comprises a check valve at a location downstream of the inlet of the accessory cooling system, wherein the check valve is positioned to prevent an airflow from an outlet of the Reverse bleed duct toward the blower.

The gas turbine engine of any preceding clause, wherein the compressor section, the combustion section, or both defines a compressor bleed plenum, wherein the reverse bleed duct is in fluid communication with the working gas flowpath across the compressor bleed plenum.

The gas turbine engine of any preceding clause, wherein the reverse bleed duct is further in in fluid communication with a cold location of the gas turbine engine as an airflow source for the reverse bleed system.

The gas turbine engine of any preceding clause, further comprising: a bifurcation connected to the turbomachine, wherein the cold location of the gas turbine engine is a flowpath surface of the bifurcation.

The gas turbine engine of any preceding clause, wherein the gas turbine engine defines a bypass passage over the turbomachine, and wherein the cold location is the bypass passage, the working gas flowpath through a low pressure compressor, the working gas flowpath between the low pressure compressor and a high pressure compressor, or a combination thereof.

The gas turbine engine of any preceding clause, wherein the turbomachine comprises an operability bleed assembly defining an operability bleed duct extending between an inlet in fluid communication with the working gas flowpath at a location between the low pressure compressor and the high pressure compressor and an outlet, wherein the inlet of the reverse bleed system is in fluid communication with the operability bleed duct.

The gas turbine engine of any preceding clause, wherein the outlet of the operability bleed duct is in fluid communication with the bypass passage, wherein the cold location is the working gas flowpath between the low pressure compressor and the high pressure compressor when the gas turbine engine is in an operating condition, and wherein the cold location is the bypass passage when the gas turbine engine is in a shutdown operating condition.

The gas turbine engine of any preceding clause, wherein the gas turbine engine defines an overall pressure ratio greater than or equal to 50:1 and less than or equal to 70:1 when operated at a rated speed during standard day operating conditions.

The gas turbine engine of any preceding clause, further comprising: a fan section having a fan driven by the turbomachine, wherein the fan defines a fan pressure ratio less than or equal to 1.6 when the engine is operated at a cruise condition.

The gas turbine engine of any preceding clause, wherein the gas turbine engine is an open rotor gas turbine engine.

The gas turbine engine of any preceding clause, wherein the gas turbine engine is a turbofan engine.

The gas turbine engine of any preceding clause, wherein the turbomachine defines a core mass flow entering the compressor section during an operating condition of the gas turbine engine, wherein the CCA system is configured to receive a bleed airflow greater than or equal to 0.3% and less than or equal to 13.5% of the core mass flow during the operating condition of the gas turbine engine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine, comprising:
a bifurcation; and
a turbomachine comprising:
    a compressor section,
    a combustion section defining a compressor discharge cavity,
    a turbine section, the turbomachine defining a working gas flowpath, and an engine cooling system, the engine cooling system comprising:
        a first side bleed assembly having an inlet positioned to be in fluid communication with an airflow over the bifurcation;
        a heat exchanger providing a compressed airflow to cool a sump, the heat exchanger being in thermal communication with the first side bleed assembly downstream of the inlet of the first side bleed assembly,
        a second side bleed assembly having an inlet in fluid communication with the working gas flowpath through the compressor section, at the compressor discharge cavity, or both to receive the compressed airflow, the second side bleed assembly in thermal communication with the heat exchanger to cool the compressed airflow through the second side bleed assembly, the second side bleed assembly further in thermal communication with a component of the turbomachine to cool the component of the turbomachine; and
        an accessory system cooling system comprising a cooling system inlet on the bifurcation and a duct in fluid communication with the cooling system inlet, wherein the inlet to the first side bleed assembly is in fluid communication with the duct of the accessory system cooling system at a location downstream of the cooling system inlet.

2. The gas turbine engine of claim 1, wherein the inlet to the first side bleed assembly is located on a flowpath surface of the bifurcation.

3. The gas turbine engine of claim 2, wherein the first side bleed assembly comprises a scoop at the inlet to the first side bleed assembly.

4. The gas turbine engine of claim 2, wherein the first side bleed assembly comprises a variable geometry component at the inlet to the first side bleed assembly.

5. The gas turbine engine of claim 2, wherein the bifurcation is an upper bifurcation of the gas turbine engine.

6. The gas turbine engine of claim 5, wherein the gas turbine engine is turbofan engine comprising a fan driven by the turbomachine and an outer nacelle surrounding the fan and defining a bypass passage with the turbomachine, wherein the upper bifurcation extends between the turbomachine and the outer nacelle.

7. The gas turbine engine of claim 1, wherein the accessory system cooling system is an environmental control system.

8. The gas turbine engine of claim 1, wherein the engine cooling system further comprises a flow control valve, wherein the flow control valve is located at the inlet to the first side bleed assembly to control a split of the airflow between the duct of the accessory system cooling system and the first side bleed assembly.

9. The gas turbine engine of claim 1, wherein the turbine section comprises a high pressure turbine, and wherein the component is the high pressure turbine.

10. The gas turbine engine of claim 1, wherein the component is a rotor bore of a turbine of the turbine section, an airfoil of the turbine, a rotor bore of the compressor section, an airfoil of the compressor section, a turbine mid-frame, a turbine rear frame, or a combination thereof.

11. The gas turbine engine of claim 1, wherein the turbomachine defines an under-cowl cavity, and wherein the heat exchanger is located in the under-cowl cavity of the turbomachine.

12. The gas turbine engine of claim 1, wherein the bifurcation defines a bifurcation cavity, wherein the turbomachine defines an under-cowl cavity, and wherein the heat exchanger is located in the under-cowl cavity of the turbomachine, the bifurcation cavity of the bifurcation, or both.

13. The gas turbine engine of claim 1, wherein the heat exchanger is a first heat exchanger, wherein the engine cooling system further comprises a second heat exchanger, wherein the first side bleed assembly comprises a first portion and a second portion arranged in parallel flow, wherein the first portion is in thermal communication with the first heat exchanger and the second portion is in thermal communication with the second heat exchanger.

14. The gas turbine engine of claim 13, wherein the second side bleed assembly comprises a first portion and a second portion arranged in parallel flow, wherein the first portion is in thermal communication with the first heat exchanger and the second portion is in thermal communication with the second heat exchanger.

15. The gas turbine engine of claim 1, wherein the engine cooling system further comprises a flow control valve in operable communication with the first side bleed assembly.

16. The gas turbine engine of claim 1, wherein the engine cooling system further comprises a flow control valve in operable communication with the second side bleed assembly.

17. The gas turbine engine of claim 1, wherein the gas turbine engine defines an overall pressure ratio greater than or equal to 50:1 and less than or equal to 70:1 when operated at a rated speed during standard day operating conditions.

18. The gas turbine engine of claim 1, wherein the inlet of the second side bleed assembly is in fluid communication with the working gas flowpath at the compressor discharge cavity.

19. A gas turbine engine comprising:
an extension; and
a turbomachine comprising:
    a compressor section,
    a combustion section defining a compressor discharge cavity,
    a turbine section, the turbomachine defining a working gas flowpath and an engine cooling system, the extension coupled to the turbomachine and extending outwardly from the turbomachine, the engine cooling system comprising:
    a first side bleed assembly having an inlet positioned to be in fluid communication with an airflow over the extension;
    a heat exchanger providing a compressed airflow to cool a sump, the heat exchanger being in thermal communication with the first side bleed assembly downstream of the inlet of the first side bleed assembly;

a second side bleed assembly having an inlet in fluid communication with the working gas flowpath through the compressor section, at the compressor discharge cavity, or both, to receive the compressed airflow, the second side bleed assembly in thermal communication with the heat exchanger to cool the compressed airflow through the second side bleed assembly, the second side bleed assembly further in thermal communication with a component of the turbomachine to cool the component of the turbomachine; and an accessory system cooling system comprising a cooling system inlet on the extension and a duct in fluid communication with the cooling system inlet, wherein the inlet to the first side bleed assembly is in fluid communication with the duct of the accessory system cooling system at a location downstream of the cooling system inlet.

\*   \*   \*   \*   \*